(12) United States Patent
Apostolopoulos

(10) Patent No.: US 6,577,679 B1
(45) Date of Patent: *Jun. 10, 2003

(54) METHOD AND APPARATUS FOR TRANSCODING CODED PICTURE SIGNALS FROM OBJECT-BASED CODING TO BLOCK-BASED CODING

(75) Inventor: John G. Apostolopoulos, Mountain View, CA (US)

(73) Assignee: Hewlett-Packard Development Company LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/409,935

(22) Filed: Sep. 30, 1999

(51) Int. Cl.⁷ .............. H04B 1/66; H04N 7/12; G06K 9/36; G06K 9/46
(52) U.S. Cl. .............. 375/240.12; 375/240.08; 382/243; 348/420.1
(58) Field of Search ............. 375/240.24, 240.25, 375/24.12, 240.09, 240.02, 240.16, 240.08; 382/242, 243, 235, 241, 239; 386/109, 111; 348/399.1, 420.1, 441, 390.1

(56) References Cited

U.S. PATENT DOCUMENTS

| | | | | |
|---|---|---|---|---|
| 5,748,789 A | * | 5/1998 | Lee et al. ............... | 382/243 |
| 6,130,913 A | * | 10/2000 | Yamaguchi et al. ... | 375/240.25 |
| 6,167,084 A | * | 12/2000 | Wang et al. ........... | 375/240.02 |
| 6,188,728 B1 | * | 2/2001 | Hurst .................... | 375/240.16 |
| 6,275,536 B1 | * | 8/2001 | Chen et al. ............ | 375/240.25 |
| 6,404,814 B1 | * | 6/2002 | Apostolopoulos ...... | 375/240.12 |

* cited by examiner

Primary Examiner—Gims S. Philippe

(57) ABSTRACT

A coded object-based picture signal representing a picture is transcoded to a coded block-based picture signal representing the picture by culling signal portions that represent objects not visible in the picture from the coded object-based picture signal to generate a culled object-based picture signal. Portions of the culled object-based picture signal are partially decoded and from them are generated blocks of a partially-coded block-based picture signal in which the blocks have different coding states. Finally, the blocks of the partially-coded block-based picture signal are re-encoded to generate the coded block-based picture signal in which the blocks have a uniform coding state.

22 Claims, 21 Drawing Sheets

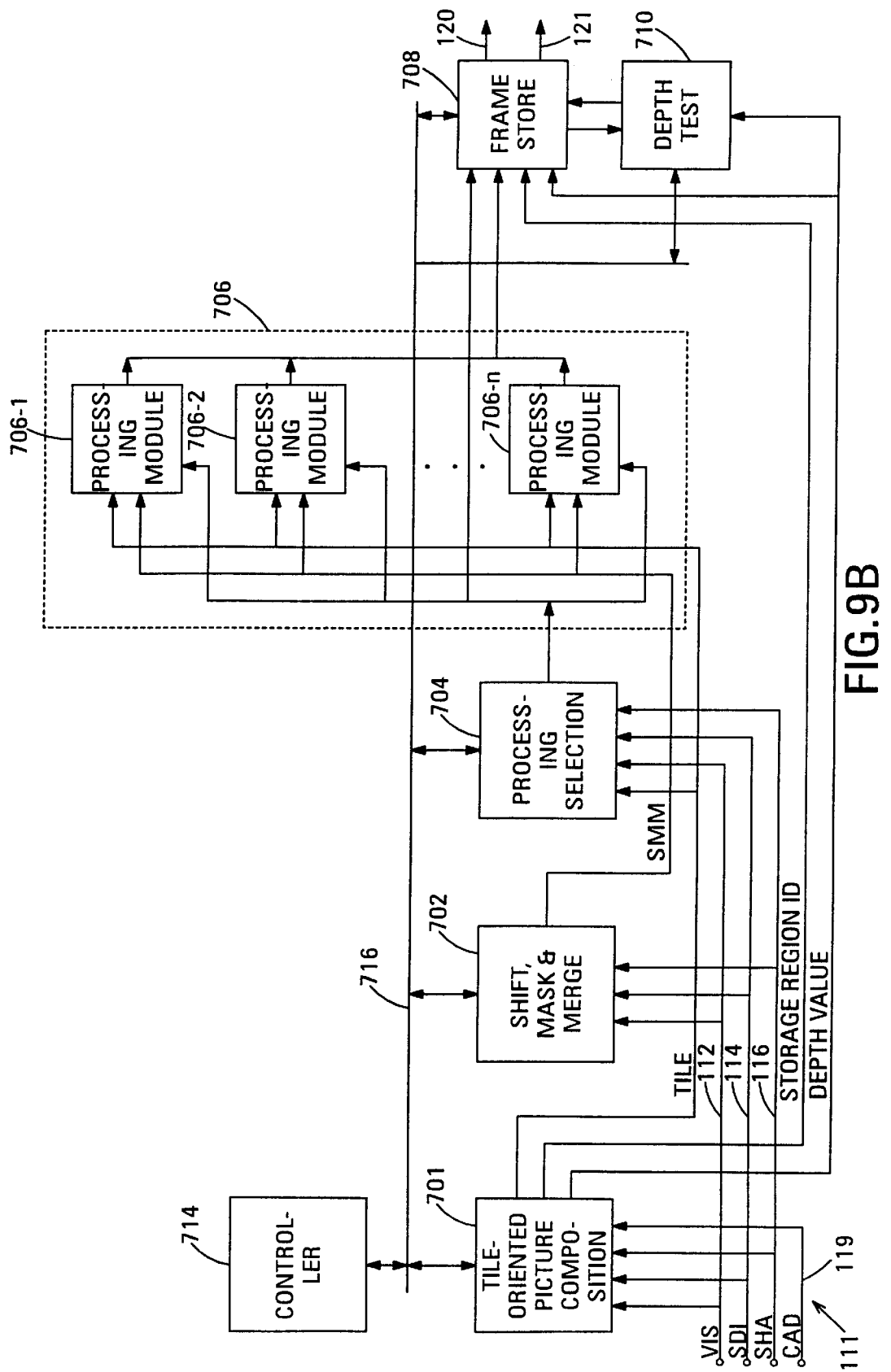

METHOD AND APPARATUS FOR TRANSCODING CODED PICTURE SIGNALS FROM OBJECT-BASED CODING TO BLOCK-BASED CODING

FIELD OF THE INVENTION

The invention relates to coded signals that represent pictures using fewer bits than conventional picture signals and, in particular, to a transcoding method and transcoder that transcodes coded object-based picture signals to coded block-based picture signals to allow a conventional block-based picture signal decoder to decode the coded object-based picture signals.

BACKGROUND OF THE INVENTION

Communication using picture signals that electronically represent still and moving pictures is becoming ubiquitous, together with the use of signal coding to increase the efficiency with which such signals can be transmitted and stored. Signal coding is crucial to overcome the many limitations that exist on transmission bandwidth and storage capacity. Most of the popular and successful conventional picture signal coding techniques, such as those known as JPEG, MPEG-1, MPEG-2, ITU H.261 and ITU H.263, code the original picture signal by subjecting it to block-based processing. In block-based processing, each picture is expressed as an array of picture elements (pixels), e.g., an array of 640×480 pixels, each of which has a pixel value. The pixel values collectively constitute the picture signal. The picture is divided into regularly-sized and located square or rectangular blocks of pixels. Processing, such as block discrete cosine transforms (block-DCT), block-based motion estimation and block-based motion compensation is then individually applied to the corresponding blocks of pixel values to code the picture signal. The picture is divided into blocks regardless of the sizes and shapes of the objects represented by the picture.

Recently, techniques have been developed for generating object-based picture signals that represent the picture as a number of objects arranged to form a scene. Techniques have also been proposed for coding such object-based picture signals, the foremost example of which is that embodied in the emerging MPEG-4 standard. In an object-based picture signal, a picture, which may be a single still picture, or one of a group of sequential still pictures constituting a moving picture, is decomposed into objects having arbitrary shapes, unlike the regularly-sized and located blocks of current block-based representations. Each object is represented by a portion of the picture signal. This technique provides a more natural decomposition of the picture signal that may enable a number of new functionalities, such as user interaction with the objects in the picture, greater content-creation flexibility, and potentially improved coding efficiency and fidelity. These advantages of representing pictures using object-based picture signals is likely to especially appeal to content creators.

Object-based picture signals require object-based coding techniques such as MPEG-4 to code, manipulate, and distribute them. However, an MPEG-4 decoder, which is required to decode a coded object-based picture signal, is inherently more complex than conventional block-based MPEG-1 or MPEG-2 decoders. Moreover, the spread of DVD, Digital TV and HDTV has put MPEG-2 decoders into widespread use. JPEG still picture decoders are also widely used. Therefore, for users who already have a JPEG or MPEG-2 decoder, and who do not want or cannot afford the additional functionalities offered by an object-based picture signal, the need arises to transcode the MPEG-4 object-based picture signal to an MPEG-2 block-based picture signal. A similar need exists with respect to still pictures. Moreover, while program content may be developed using object-based picture signals, it may be desirable to distribute the object-based content to people who only have conventional block-based decoders, such as the MPEG-2 decoders used in DVD, satellite and terrestrial digital television. Consequently, a need exists to be able to transcode coded object-based picture signals to coded block-based picture signals that are compatible with the standard decoders of such block-based coding techniques as JPEG, MPEG-1, MPEG-2, H.261 and H.263.

FIG. 1 is a block diagram of a conventional transcoder 10 capable of transcoding an MPEG-4 or similar coded object-based picture signal to an MPEG-2 or similar coded block-based picture signal. The system is composed of the MPEG-4 decoder 12 and the MPEG-2 encoder 14. The output 18 of the MPEG-4 decoder is connected to the input 20 of the MPEG-2 encoder. The output 22 of the MPEG-2 decoder provides a coded block-based picture signal that is compliant with the standard MPEG-2 decoder.

The input 16 of the MPEG-4 decoder receives a coded object-based picture signal that is compliant with the MPEG-4 standard decoder. The MPEG-4 decoder decodes the coded object-based picture signal to generate a conventional picture signal, which it feeds to its output 18. The conventional picture signal may be a set of RGB signals, a set of YIQ or YUV signals or some other suitable form of conventional picture signal.

The MPEG-2 encoder receives the conventional picture signal at its input 20 and applies conventional block-based coding thereto. The MPEG-2 encoder delivers a coded block-based picture signal that is compliant with the MPEG-2 standard decoder to its output 22.

The conventional transcoder 10, although simple in concept, is complex in execution. The coding processing performed by the MPEG-2 encoder is complex and requires substantial computational resources to perform in real time. Furthermore, the decoding and subsequent encoding performed by the transcoder 10 often degrades the quality of the picture. An alternative approach is to attempt to perform the transcoding in the coded domain. This would eliminate the need to perform at least part of the re-encoding. Transcoding in the coded domain has the potential to reduce significantly the processing complexity, and also to eliminate partially or completely the generation loss suffered by conventional transcoding.

Some approaches to transcoding conventional block-based picture signals in the coded domain are described by S. F. Chang and D. Messerschmitt in *Manipulation and Compositing of MC-DCT Compressed Video*, 13 IEEE J. ON SELECTED AREAS IN COMMUNICATIONS(1995 January); B. Natarajan and B. Vasudev in *A Fast Approximate Algorithm for Scaling Down Digital Images in the DCT Domain*, Proc. IEEE INTL. Conf. on Image Processing (WASHINGTON D.C.) (1995 October); N. Merhav and B. Vasudev, *Fast Algorithms for DCT-Domain Image Down Sampling and for Inverse Motion Compensation*, 7 IEEE Trans. on Circuits and System for Video Technology, 468–475 (1997 June); B. Shen and I. Ishwar in Block-based Manipulations on Transform-Compressed Images and Videos, 6 MULTIMEDIA SYSTEMS (1998 March); S. Wee and B. Vasudev in *Splicing MPEG Video Streams in the*

*Compressed Domain*, Proc. IEEE INTL. Conf. on Multimedia Signal Processing (PRINCETON, N.J.) (1997 June).

However, none of the above-cited references describes a coded domain transcoder capable of transcoding a coded object-based picture signal to a coded block-based picture signal. What is needed, therefore, is a coded-domain transcoder capable of transcoding in real-time a coded object-based picture signal representing a still or moving picture into a corresponding coded block-bas based picture signal. What is also needed is such a coded-domain transcoder having modest and affordable hardware requirements.

SUMMARY OF THE INVENTION

The invention provides a transcoder for transcoding a coded object-based picture signal that represents a picture to a coded block-based picture signal that also represents the picture. The coded object-based picture signal may be an MPEG-4 picture signal, for example, and the coded block-based picture signal may be an MPEG-2 picture signal, for example. The transcoder comprises a culling module, a picture composer and a partial encoder. The culling module receives the coded object-based picture signal and culls signal portions from the coded object-based picture signal to generate a culled object-based picture signal. The signal portions culled are those that represent objects not visible in the picture. The picture composer receives the culled object-based picture signal, partially decodes selected portions of the culled object-based picture signal and generates from them blocks of a partially-coded block-based picture signal in which the blocks have different coding states. The partial encoder receives the partially-coded block-based picture signal and encodes the blocks of the partially-coded block-based picture signal to generate the coded block-based picture signal in which the blocks have a uniform coding state. The coded block-based picture signal is capable of being decoded by a conventional block-based decoder.

The culling module may include an object culling module that culls, from the coded object-based picture signal, signal portions that represent objects that are not present in the picture and signal portions that represent objects that are present in the picture but are hidden.

The object-based picture signal may include a scene descriptor that describes the arrangement of the objects in the picture and may additionally include a coded shape descriptor for each of the objects. The object culling module may use the scene descriptor to identify the signal portions that represent the objects not present in the picture and may decode the coded shape descriptors of the objects identified as being present in the picture to identify the signal portions that represent the objects that are present in the picture, but are hidden.

The object-based picture signal may additionally include, for each of the objects, an object descriptor comprising a coded amplitude descriptor including interior tiles and boundary tiles. The culling module may additionally include a tile culling module that culls, from the object-based picture signal, signal portions that represent interior tiles and boundary tiles that are hidden in the picture.

The culled object-based picture signal may include a culled amplitude descriptor for each object visible in the picture, and the picture composer may include a tile-oriented picture composition module, a shift, mask and merge module, processing modules and a processing selection module. The culled amplitude descriptor comprises tiles representing portions of the object visible in the picture. The tile-oriented picture composition module receives the culled object-based picture signal and identifies, for each tile of the culled amplitude descriptors, at least one block of the partially-coded block-based picture signal to which the tile contributes. The shift, mask and merge module calculates shift, mask and merge parameters for each tile. The processing modules are each capable of receiving the tile or tiles contributing to each block of the partially-coded block-based picture signal and of decoding the tile or tiles to the extent that allows the block-generating processing defined by the shift, mask and merge parameters to be applied to them. The processing modules are also capable of applying the block-generating processing defined by the respective shift, mask and merge parameters to the tile or tiles to generate the block. The processing modules are each capable of decoding the tile or tiles contributing to the block to a coding state that differs among the processing modules. The processing selection module selects one of the processing modules to generate the block of the partially-coded block-based picture signal and, hence, selects the coding state in which the block is generated.

Alternatively, the culled object-based picture signal may include an amplitude descriptor for each object visible in the picture and the picture composer may include a block-oriented picture composition module, a shift, mask and merge module, processing modules and a processing selection module. Each amplitude descriptor comprises tiles. The block-oriented picture composition module receives the culled object-based picture signal and identifies, for each block of the partially-coded picture signal, the tile or tiles of the culled object-based picture signal that contribute to the block. The shift, mask and merge module calculates shift, mask and merge parameters for tile that contributes to the block. The processing modules are each capable of receiving the tile or tiles that contribute to each block of the partially-coded block-based picture signal and of partially decoding the tile or tiles and applying thereto the respective shift, mask and merge parameters to generate the block. The processing modules are each capable of decoding the tile or tiles contributing to the block to a coding state that differs among the processing modules. The processing selection module selects one of the processing modules to generate the block of the partially-coded block-based picture signal, and, hence, the coding state in which the block is generated.

The invention also provides a method for transcoding a coded object-based picture signal representing a picture to a coded block-based picture signal representing the picture. In the method, signal portions that represent objects not visible in the picture are culled from the coded object-based picture signal to generate a culled object-based picture signal. Portions of the culled object-based picture signal are partially decoded and from them are generated blocks of a partially-coded block-based picture signal in which the blocks have different coding states. Finally, the blocks of the partially-coded block-based picture signal are re-encoded to generate the coded block-based picture signal in which the blocks have a uniform coding state.

Finally, the invention provides a computer-readable medium in which is fixed a computer program that instructs a computer to perform a transcoding operation in which a coded object-based picture signal representing a picture is transcoded to a coded block-based picture signal representing the picture. In the transcoding operation, signal portions that represent objects not visible in the picture are culled from the coded object-based picture signal to generate a culled object-based picture signal. Portions of the culled object-based picture signal are partially decoded and from them are generated blocks of a partially-coded block-based picture signal in which the blocks have different coding states. Finally, the blocks of the partially-coded block-based picture signal are re-encoded to generate the coded block-based picture signal in which the blocks have a uniform coding state.

Culling the signal portions that represent objects not visible in the picture may include culling signal portions that represent objects that are not present in the picture and culling signal portions that represent objects that are present in the picture, but are hidden.

The object-based picture signal may include a scene descriptor that describes an arrangement of the objects in the picture and may additionally include a coded shape descriptor for each object. Culling the signal portions that represent objects that are not present in the picture may include identifying, using the scene descriptor, the signal portions that represent the objects not present in the picture, and decoding the coded shape descriptors of the objects that the identifying operation identifies as present in the picture to generate respective shape descriptors. In culling the signal portions that represent objects that are present in the picture, but are hidden, the shape descriptors are used to identify the signal portions that represent the objects that are present in the picture, but are hidden.

The object-based picture signal may include an object descriptor for each object. The object descriptor comprises a coded amplitude descriptor including interior tiles and boundary tiles. Culling the signal portions that is represent objects that are present in the picture, but are hidden, may include culling, from the object-based picture signal, signal portions that represent interior tiles and boundary tiles that are hidden in the picture.

The culled object-based picture signal may include a culled amplitude descriptor for each object visible in the picture. The culled amplitude descriptor for each object comprises tiles that represent the portions of the object that are visible in the picture. In this case, in partially decoding portions of the culled object-based picture signal and generating from them the blocks of the partially-coded block-based picture signal, the at least one block of the partially-coded block-based picture signal to which each tile of the culled amplitude descriptors contributes is identified. Shift, mask and merge parameters are calculated for each tile. One of a predetermined number of coding states in which to generate each block of the partially-coded block-based picture signal is selected as a selected coding state. Finally, the tile or tiles that contribute to each block of the partially-coded block-based picture signal are decoded to the selected coding state and the block-generating processing defined by the respective shift, mask and merge parameters is applied to the tile or tiles in the selected coding state to generate the block in the selected coding state.

Alternatively, the culled object-based picture signal may include an amplitude descriptor for each object visible in the picture. The amplitude descriptor comprises tiles. In partially decoding selected portions of the culled object-based picture signal and generating from them the blocks of the partially-coded block-based picture signal, for each block of the partially-coded picture signal, the tile or tiles of the culled object-based picture signal that contribute to the block are identified. Shift, mask and merge parameters are calculated for each of the tile or tiles that contribute to the block. One of a predetermined number of coding states in which to generate each block of the partially-coded block-based picture signal is selected as a selected coding state. Finally, the tile or tiles contributing to the block of the partially-coded block-based picture signal are decoded to the selected coding state and the block-generating processing defined by the respective shift, mask and merge parameters is applied to the tile or tiles in the selected coding state to generate the block in the selected coding state.

The transcoder and transcoding method according to the invention and the transcoding program fixed in the computer-readable medium according to the invention cull portions of the coded object-based picture signal that represent objects that are not visible in the picture before generating the coded block-based picture signal. Compared with conventional transcoders, transcoding methods and transcoding programs, this reduces the processing resources required to process the coded object-based picture signal to generate the coded block-based picture signal, or enables other constraints, such as processing time, to be met more easily since the culled portions of the object-based picture signal are not processed further. Moreover, the transcoder, transcoding method and transcoding program according to the invention process the culled object-based picture signal to generate at least a fraction of the blocks of the coded block-based picture signal in a partially-coded state. Compared with conventional transcoders, transcoding methods and transcoding programs, this further reduces the processing resources required to generate the coded block-based picture signal, or enables other constraints, such as processing time, to be met even more easily. The transcoder, transcoding method and transcoding program according to the invention perform less decoding of the coded object-based picture signal, and perform less encoding to generate the coded block-based picture signal. Moreover, the reduced decoding and encoding applied to the coded object-based picture signal preserve more of the original encoding of the coded object-based picture signal in the block-based picture signal. This reduces the generational quality loss compared with conventional transcoders, transcoding methods and transcoding programs.

BRIEF DESCRIPTION OF THE DRAWINGS

FIG. 9B is a block diagram of the second embodiment of the block-based picture composer of the first embodiment of the transcoder according to the invention.

DETAILED DESCRIPTION OF THE INVENTION

Before describing the invention in detail, the ways in which coded block-based and coded object-based picture signals represent still and moving pictures will be briefly described. The basics of a coder for encoding a picture signal representing a gray-scale still picture are described first. Then the additional processing needed to code a picture signal representing a color still picture will be described, followed by the processing required to code moving pictures. The coders to be described operate on a digital picture signal that represents a still picture, or a sequence of still pictures constituting a moving picture. Each picture is divided into a rectangular array of picture elements (pixels). For example, each frame of a conventional NTSC television signal is divided into an array of 640×480 pixels. The digital picture signal includes a grey-scale value, which is typically an eight-bit number, for each pixel. The grey scale values are conventionally arranged in raster-scan order starting at the top left-hand corner of the picture.

A conventional block-based coder for a gray-scale picture signal receives the digital picture signal and derives from the digital picture signal a coded picture signal that represents the picture using fewer bits. A conventional block-based coder for a gray-scale picture signal transforms the digital picture signal to another domain in which most of the signal energy is concentrated in a small fraction of the coefficients. Most commonly, the digital picture signal is partitioned into two-dimensional blocks of 8×8 pixels and the two-dimensional discrete cosine transform (DCT) of each block is calculated. This transform is often referred to as an 8×8 Block DCT. Other popular spatial transforms, such as lapped transforms and wavelet transforms, can alternatively be used.

Figure 1:
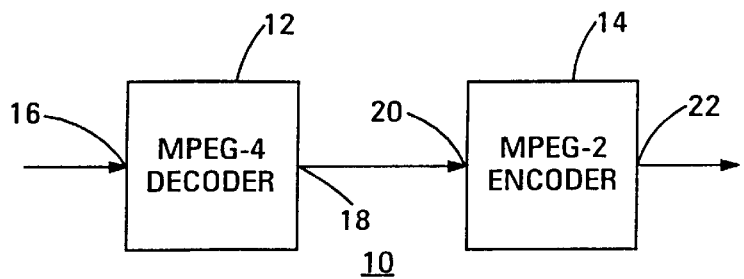
FIG. 1 is a block diagram of a conventional transcoder for transcoding a coded object-based picture signal to a coded block-based picture signal.
Figure 2A:
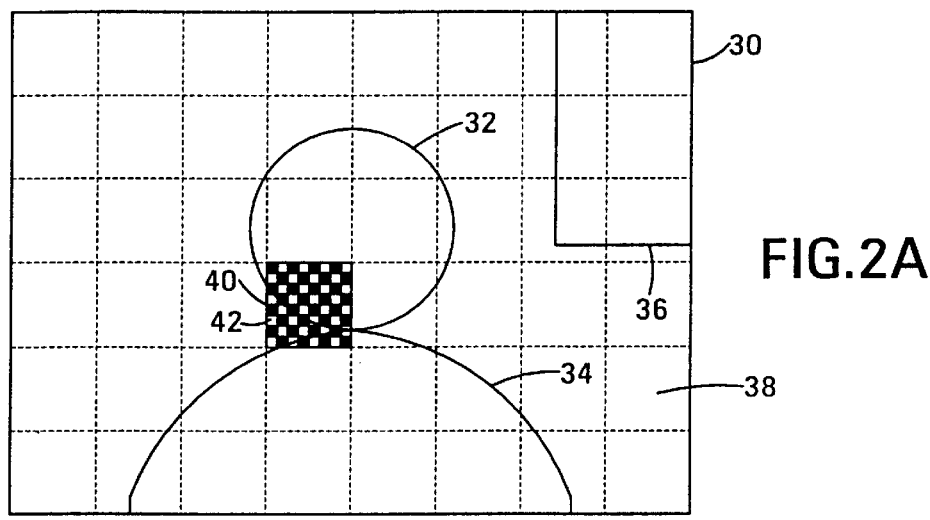
FIG. 2A illustrates the way in which an exemplary picture would be encoded by a block-based encoder.

The conventional block-based coder divides the digital picture signal into 8×8 blocks regardless of the content of the picture. FIG. 2A shows the picture 30 that includes the person's head 32, the person's body 34, the window 36 and the background 38. An exemplary block of 8×8 pixels is shown at 40 and an exemplary pixel in the block 40 is shown at 42. The pixels of the other blocks are not shown to simplify the drawing. It can be seen that the block 40 includes parts of the three different objects 32, 34 and 38.

The block transform processing applied to each 8×8 block of the digital picture signal generates an 8×8 block of transform coefficients. The blocks of transform coefficients are then subject to quantizing and to entropy coding that includes run-length coding and Huffman coding. The transform coefficients are quantized by scaling each coefficient by an appropriate factor to account for the psycho-visual characteristics of the human vision system (HVS) and the number of bits available to represent the picture in its coded state. After scaling, each transform coefficient is quantized, which reduces the value of many of the coefficients to zero.

Runlength coding exploits the fact that the majority of the transform coefficients are quantized to zero, and reduces the number of bits required to represent the block of quantized transform coefficients by coding only the locations and amplitudes of the non-zero quantized coefficients. For example, the array of quantized transform coefficients is typically scanned in zig-zag order, and the number (i.e., the runlength) of consecutive zero-level coefficients before a non-zero level coefficient is coded. The runlength is followed by a code that represents the level of the non-zero coefficient.

Finally, the Huffman coding applied to the run-level pairs resulting from the runlength coding exploits the statistical properties of these quantities to reduce further the number of bits required to represent the blocks of quantized transform coefficients.

The processing just described can usually represent the blocks of the picture signal using substantially fewer bits than those required to represent the original blocks. However, the processing is less effective when applied to blocks, such as the block 40, that include two or more unrelated objects.

Block-based coding is typically applied to a digital picture signal representing a color picture first by transforming the digital picture signal from the component color space, i.e., red, green, and blue (RGB) color space, to a luminance/chrominance color space. Examples of a luminance/chrominance color space include YIQ and YUV color spaces. This transformation reduces the correlation among the three color components and also enables subsequent processing to exploit the different response of the HVS to luminance and chrominance components. For example, the spatial resolution of each of the color difference components may be reduced to be one-half, vertically and horizontally, of that of the luminance component. Each of the luminance and chrominance components is then coded using an appropriately-tuned grayscale picture signal coder as described above.

A picture signal representing a moving picture represents a sequence of still pictures that are acquired and displayed in rapid succession to give the impression of continuous motion. The high picture rate necessary to achieve the illusion of smooth motion usually results in considerable temporal redundancy among consecutive pictures. Specifically, consecutive pictures may typically contain the same information physically displaced between adjacent pictures. To reduce the temporal redundancy, predictive processing is typically applied. In this, a previous picture is used as the basis for encoding the current picture so that the current picture can be coded by coding only the differences between the current picture and the previous picture.

The accuracy of the prediction, and hence the differences that need coding, is greatly improved by accounting for the motion between consecutive pictures. The motion between the previous picture and the current picture is estimated, and then the reference picture that forms the basis for coding the current picture is formed by compensating the previous picture for the motion between the two pictures. The process of estimating the motion between the pictures is called motion estimation, or ME, and the process of forming a prediction of the current picture by applying motion compensation to the previous picture is called motion-compensated prediction, or MC-P.

The errors resulting from applying motion-compensated prediction to the current picture, called the MC-residual, is coded using a block-based picture signal coder of the type described above. However, different techniques are used to quantize the MC-residual to account for the different spectral distributions in a block of transform coefficients derived from a block of a digital picture signal and one derived from a block of the MC-residual.

ME/MC-P is typically applied to a picture signal representing a moving picture by partitioning each picture into square blocks of pixel values and applying ME/MC-P to each block. Each block, called a macroblock, typically has twice the linear dimensions of the blocks to which the DCT is applied. ME is a computationally intensive process since it involves performing matching operations between the current macroblock in the current picture, and all macroblocks located within ±n pixels of the corresponding position in the previous picture. Some techniques extend the matching operation to synthesized macroblocks displaced by one-half of a pixel from the actual macroblocks. The matching operations determine the location of the macroblock in the previous picture that is most similar to the current macroblock. Even when n is as small as one, this involves nine matching operations, and the number of matching operations increases rapidly as n increases above one.

In a picture signal representing a moving picture composed of a group of sequentially-acquired pictures each represented by a portion of the picture signal, the picture signal portion representing the first picture in the group is normally coded as a still picture. In other words, the coding applied to this picture signal portion is independent of the coding applied to the picture signal portions representing any of the other pictures in the group. The resulting coded picture signal is then decoded, and the resulting decoded picture signal represents a reference picture that is used to apply predictive MC processing to the picture signal portions representing the remaining pictures in the group. Bi-directional MC-processing can be used in addition to the forward MC-processing just described. In bi-directional MC-processing, coded picture signal portions representing pictures earlier and later in the sequence than the current picture are used as reference pictures to apply bi-directional MC-processing to the current picture. Regardless of whether forward or bidirectional prediction is used, if coding the MC-residual requires more bits than independently coding the original picture signal portion, then the MC-processing is turned off and the picture signal portion is coded as a still picture with no prediction. Alternatively, MC-processing may be turned off only for those macroblocks that require more bits to code than the number of bits required to code them independently.

More detailed descriptions and analysis can be found in a number of sources, e.g., J. L. Mitchell, W. Pennebaker, C. Fogg and D. LeGall, MPEG VIDEO COMPRESSION STANDARD, Chapman & Hall (1997). The techniques described above form the basis for a number of international standards for coding picture signals representing still and moving pictures. These standards include the JPEG still picture coding standard and the MPEG-1, MPEG-2, CCITT H.261, and ITU H.263 moving picture coding standards.

The coding techniques described above for picture signals representing still and moving picture involve block-based or overlapped block-based processing. Each picture is partitioned into blocks, which may overlap, and each block is processed independently. All conventional block-DCT, lapped transform, and wavelet based coding techniques for picture signals representing still and moving pictures can be regarded as being block-based or overlapped block-based. Block-based processing is advantageous in that it provides acceptable performance and is architecturally simple to implement. However, block-based coding schemes do not exploit, and in fact totally neglect, the actual content of the picture. In effect, block-based coding schemes implicitly assume that the original picture is composed of still or moving square blocks, which is unlikely in practice. Consequently, block-based coding schemes impose an artificial structure on the picture and then try to code this structure, as opposed to recognizing the structure inherent in the picture and attempting to exploit this structure to increase the efficiency with which the picture signal representing the picture is coded.

Figure 2B:
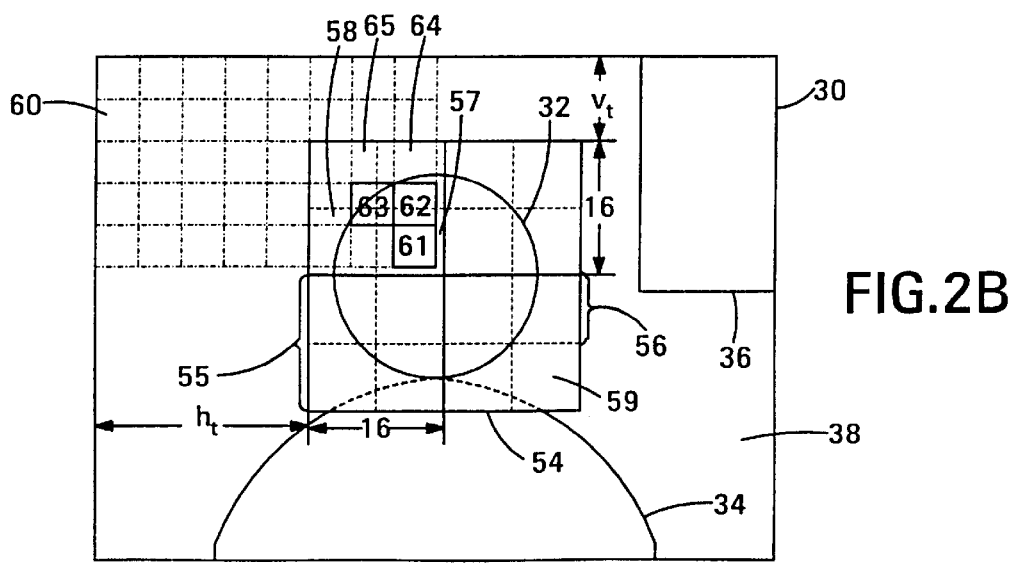
FIG. 2B illustrates the way in which the exemplary picture would be encoded by an object-based encoder.

The efficiency with which a picture signal is coded may be improved by identifying and efficiently representing the inherent structure of the picture. For example, since pictures usually contain objects, the picture may be represented in terms or two- or three-dimensional objects, which may be still or moving. This approach usually represents the actual structure of the picture more accurately than the block-based coding schemes described above. FIG. 2B shows an example of an object-based representation of the picture shown in FIG. 2A. In this representation, the still picture 30 is decomposed into a number of two-dimensional objects or regions. In this example, the objects correspond to the person's head 32, the person's body 34, the window 36 and the background 38.

A moving picture can be decomposed into 3-D objects or regions in a number of different ways. One way identifies the 3-D objects in the scene and tracks each 3-D object with time, but this approach is typically complex to implement. An alternative way identifies the 2-D objects or regions in a single picture at the start of the group of pictures, and tracks the evolution of the 2-D objects with time. A more practical way tracks the evolution with time of a signal representing a 2-D object, and specifically tracks how both the amplitude in the region and the shape of the region change with time.

Representing the picture 30 in terms of the objects it contains provides the ability to represent the picture in a more natural way. Moreover, and more importantly, representing the picture this way can provide new functionalities. For example, when a still or moving picture is represented by an object-based picture signal, the individual objects or regions in the picture can be individually extracted and manipulated, and different processing can be applied to each. This is an important functionality, since it facilitates interaction between the user and the picture.

An object-based representation of a picture also provides the ability to code the object-based picture signal with an improved coding efficiency. For example, object-based representation provides a highly-accurate definition of each object's shape and motion in a group of sequentially-acquired pictures. This can provide a significant gain in MC-prediction performance. If the interior of an object has homogeneous characteristics, the homogeneity may be exploited to increase the efficiency with which the interior of the object is coded. Also, the artifacts that result from decoding a coded object-based picture signal may be less visible than the highly-structured and artificial blocking and mosquito noise artifacts that occur when a coded block-based picture signal is decoded.

Coding schemes for coding object-based picture signals are currently the topic of considerable research both within the general research community and within the MPEG-4 standardization process, see, for example, 7 IEEE Trans. on Circuits and Systems for Video Techology: Special Issue on MPEG-4 (1997 February), and MPEG-4 Overview at http://drogo.stst.it/mpeg/standards-/mpeg-4/mpeg-4.htm (1999 March).

While several different coding schemes for object-based picture signals may co-exist in the future, current standardization efforts are focused on the emerging MPEG-4 standard. MPEG-4 defines a standard for coding object-based picture signals representing still and moving pictures. Although the standard is not yet fully defined, a basic framework has been decided. The attributes of the basic framework of the proposed MPEG-4 standard can be summarized as follows. In a manner analogous to MPEG-1 and MPEG-2, the proposed MPEG-4 standard only specifies the bitstream of the coded picture signal and the characteristics of a standard decoder, and does not specify the encoder. For example, the way segmentation is applied to picture signal representing a still or moving picture to divide the picture into objects is not defined in the standard.

In the proposed MPEG-4 standard, each picture is expressed as a number of 2-D objects having arbitrary, i.e., non-rectangular, shapes. The objects are arranged in a scene. The picture may depict all of the scene, but, when the picture is a moving picture, or when interactivity is provided, the picture will more likely depict only part of the scene. The picture signal representing the picture is composed of two main portions, a scene descriptor and, for each object in the scene, an object descriptor. The scene descriptor lists the objects in the scene and describes how the objects are arranged in the scene. Each object in the scene is described by a respective object descriptor. In a still picture, the object descriptor has two main components, a shape descriptor that defines the shape of the object and an amplitude descriptor that describes the amplitude of the object, i.e., the appearance of the object. For example, in the object-based picture 30 shown in FIG. 2B, the person's head 32 is represented by a shape descriptor and an amplitude descriptor. In a moving object-based picture, the object descriptor additionally includes a third component, namely, a motion descriptor that describes the motion of the object. Also in a moving picture, both the shape descriptor and the amplitude descriptor of an object can differ between consecutive pictures. All of the descriptors may be coded to reduce the number of bits required to represent them.

To simplify the processing, each arbitrarily-shaped object is placed in a bounding rectangle that has sides that are integral multiples of 16 pixels. The shape descriptor and the amplitude descriptor of the object are expressed in terms of the coordinate system of the bounding rectangle. The coordinate system of the bounding rectangle may be the same as, but is more often different from, the coordinate system of the picture. The position of the bounding rectangle in the picture is defined by a translation expressed in the coordinate system of the picture. FIG. 2B shows the bounding rectangle 54 of the person's head 32 in the object-based picture 30. Each of the objects in the scene depicted in the picture has its own bounding rectangle, but the bounding rectangles of the person's body 34, the window 36 and the background 38 are omitted to simplify the drawing. The translation of the bounding rectangle 54 in the picture is indicated by $h_r$ and $v_r$ in the coordinate system of the picture. The blocks of the coded block-based picture signal that will be derived from the coded object-based picture signal are also defined in the coordinate system of the picture 30. An exemplary block is shown at 60. Most of the blocks are omitted to simplify the drawing.

In the object descriptor, the shape descriptor represents the shape of an object in terms of a mask applied to the bounding rectangle 54. The type of mask applied depends on whether the object is opaque or partially transparent. The shape descriptor of an opaque object is a binary alpha mask, which is a 1-bit-per-pixel bitmap that covers the bounding rectangle. The state of each bit defines whether the corresponding object pixel is located inside or outside the support of the object. The support of an object is the region in which the object is defined, and may encompass one, two or three dimensions. In the proposed MPEG-4 standard, each object is defined in two dimensions, so that the support of an MPEG-4 object is two-dimensional. The shape descriptor of a transparent object is a grey-scale alpha mask, which is an n-bit-per-pixel bitmap that covers the bounding rectangle. The value of each word is a multiplier that defines the visibility of the corresponding object pixel. Outside the support of the object, each word has a value corresponding to a visibility of zero.

The shape descriptor may be coded in a number of different ways. One way partitions the bounding rectangle into separate 16×16-pixel macroblocks. First, each macroblock is classified as an exterior macroblock, an interior macroblock or a boundary macroblock respectively located entirely outside, entirely inside, and part-inside and part-outside the support of the object. The interior blocks are all opaque if the object is opaque and the exterior blocks are all transparent, and can be efficiently coded as such. The boundary blocks are coded using a context-based arithmetic coder. In the example shown, all of the 16-pixel macroblocks located in the boundary rectangle 54, e.g., the macroblock 55, are boundary blocks.

In a moving picture, the evolution of the object's shape descriptor from one picture to the next can be coded by applying motion compensation to the shape descriptor using a field of shape motion vectors followed by a context-based arithmetic coder with an appropriately chosen context.

The amplitude descriptor of the object inside its support can be coded in a number of different ways. For example, the bounding rectangle 54 may be divided into 8×8-pixel blocks that are coded using a block-DCT. To distinguish the blocks of the amplitude descriptor from the blocks of the block-based picture signal, the blocks of the amplitude descriptor will be called tiles. An exemplary tile is shown at 56. Interior tiles, which are tiles such as the tile 57 located entirely inside the support of the object, may be conventionally coded using the block-DCT. Boundary tiles, such as the tile 58, may be processed in a number of ways. For example, the amplitude of the object inside the boundary tile may be first extrapolated to fill the tile. Then the tile may be coded using an 8×8 block DCT. Alternatively, the boundary tiles may be coded with the so-called shape-adaptive DCT (SADCT). As further alternatives, the amplitude of the entire object may be coded with a wavelet or shape-adaptive wavelet transform (SAWT). Exterior tiles, such as the tile 59, are located entirely outside the support of the object and are not coded. While the final MPEG-4 standard may allow the amplitude descriptor to be coded in a number of different ways, it is likely that applying block-DCT coding to the interior and boundary tiles will be most prevalent in practice.

FIG. 2B shows the block 61 of the block-based picture signal entirely overlaying only the interior tile 57, the block 62 partially overlaying the interior tile 57 and the boundary tile 64 and the block 63 partially overlaying the interior tile 57, the boundary tiles 58, 64 and 65 and one or more tiles (not shown) of the background 38. Thus, when the coded object-based picture signal is transcoded to generate the coded block-based picture signal, the block-generating processing generates the block 61 from the portion of the tile 57 it overlays, the block 62 from the portions of the tiles 57 and 64 it overlays and the block 63 from the portions of the tiles 57, 58, 64, 65 and the one or more tiles of the background it overlays.

The evolution of the object's amplitude in a moving picture can be coded using motion-compensated prediction as in block-based moving picture signal coding. MC-P can be performed using block-based motion estimation or using parametric motion estimation, which is more sophisticated. In an exemplary type of block-based motion estimation, the bounding rectangle is divided into 16×16-pixel macroblocks and a motion estimation operation is performed on each macroblock to identify the appropriate prediction macroblock in the object in the previous picture. To improve the MC-P performance, the object in the previous picture can be extrapolated to fill the bounding rectangle. Additional features may include the ability to switch from motion estimation using 16×16 macroblocks to motion estimation using 8×8 blocks, and may additionally include the ability to use overlapped-block MCP.

Block-based motion estimation models the moving picture as an array of moving square blocks in which the translation of each block is uniform throughout the block. Parametric motion estimation recognizes that the way the appearance of the object changes from one picture to the next can involve changes more complex than uniform translation. Such changes may include rotation, scaling, and perspective, in addition to translation. The parametric motion estimation capability of MPEG-4 enables the motion of the object to be described using more sophisticated motion models, such as affine or perspective. In this case, the object in the previous picture is transformed using the appropriate motion model, appropriate interpolation to the sampling grid is performed, and then prediction is performed using the transformed object as the reference. Parametric motion models may be applied to the entire object, or the object may be partitioned into separate regions and an appropriate motion model is applied to each region.

Parametric motion models may arise naturally in a number of cases. For example, when a moving picture is synthesized, as can be done using computer graphics, the change in an object from one picture to the next may be explicitly defined by a warping function. The warping function and its parameters may be communicated directly to the coder or the coder may estimate the warping function. In another example, in some sequences of moving pictures, the same background may be common to many pictures. However, the appearance of the background may change as the result of camera motion and occlusions by objects located between the camera and the background. In these cases, it can be beneficial to code the background, which is often called a sprite; to transmit the picture signal portion representing the background only once at the beginning of the sequence and to code the picture-to-picture changes in the background using a motion model that takes account of the camera motion. Using the appropriate motion model can greatly increase the effectiveness of the motion estimation, and, hence, the coding efficiency.

The proposed MPEG-4 standard is designed to allow some operations to be performed in the coded domain. For example, individual objects may be added or deleted by modifying the scene descriptor, and by adding or dropping the portion of the MPEG-4 bitstream that represents the object description of the object. However, the proposed MPEG-4 standard does not allow many other operations that it would be desirable to perform in the coded domain to be performed in the coded domain. Such operations include transcoding between MPEG-4 and MPEG-2 or other block-based standards.

This disclosure will describe embodiments of a transcoder, a transcoding method and a transcoding program that transcode an MPEG-4 picture signal representing a single picture to an MPEG-2 picture signal that represents the single picture. However, the embodiments described herein can easily be adapted to transcode an MPEG-4 picture signal to other types of coded block-based picture signal, to transcode other types of coded object-based picture signal to an MPEG-2 picture signal, and to transcode other types of coded object-based picture signals to other types of block-based picture signals.

Figure 3:
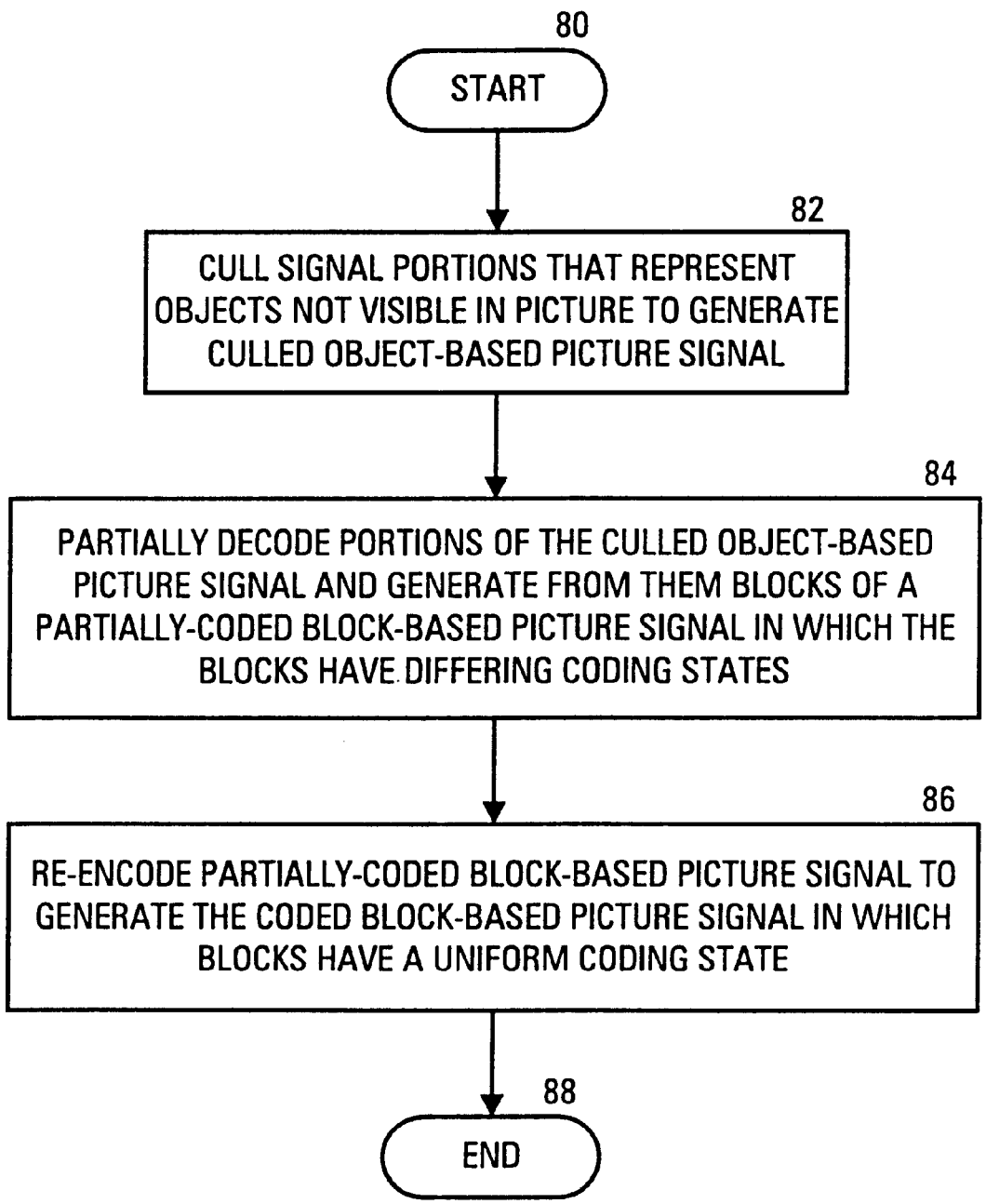
FIG. 3 is a flow chart illustrating the transcoding method according to the invention.

FIG. 3 is a flow chart that illustrates the transcoding method according to the invention. The transcoding method according to the invention is also practiced by the illustrative embodiments of the transcoders according to the invention to be described below with reference to FIGS. 4 and 12, and by a computer that executes the transcoding program fixed in the computer readable medium according to the invention.

The method according to the invention starts at step 80. In step 82, the coded object-based picture signal is processed to detect and discard portions of the coded object-based picture signal that represent objects that are not visible in the picture. Such signal portions represent objects that are not present in the picture and objects that are present in the picture, but are hidden. Detecting and discarding such portions of the coded object-based picture signal will be called culling in this disclosure, and results in a culled object-based picture signal. Culling the coded object-based picture signal results in a substantial reduction in the processing resources required to transcode the coded object-based picture signal, or enables other constraints, such as processing time, to be met more easily, since the portions of the coded object-based picture signal that are not required to generate the coded block-based picture signal are not processed further.

In step 84, portions of the culled object-based picture signal are partially decoded and block-generating processing is applied to them in their partially-decoded state to generate the blocks of a partially-coded block-based picture signal. The portions of the culled object-based picture signal are decoded, if at all, only to the extent that allows the block-generating processing to be applied to them. The block-generating processing that is used to generate a given block from the object-based picture signal depends on many factors, to be described below, and may differ from block-to-block. For example, certain block-generating processing can be performed on portions of the culled object-based picture signal that are minimally decoded, or even undecoded, whereas other block-generating processing requires that the portions of the culled object-based picture signal be substantially fully decoded. As a result of the differing block-generating processing, the blocks of the partially-coded block-based picture signal have differing coding states. Decoding the portions of the culled object-based picture signal only to the extent that allows the block-generating processing to be applied to them reduces the processing resources required to transcode the coded object-based picture signal, or enables other constraints, such as processing time, to be met more easily, since less decoding is performed than in the conventional transcoder.

In step 86, the partially-coded block-based picture signal is re-encoded to generate the coded block-based picture signal in which all the blocks have a uniform coding state. Different amounts of coding are applied to the blocks of the partially-coded block-based picture signal since the blocks differ in their coding state. This again reduces the processing resources required to transcode the coded object-based picture signal, or enables other constraints, such as processing time, to be met more easily, since many of the blocks of the partially-coded block-based picture signal are in a partially-coded state, and therefore require less encoding than in the conventional transcoder in which a full encoding operation is performed on all blocks of the block-based picture signal.

The transcoding method ends at step 88.

Figure 4:
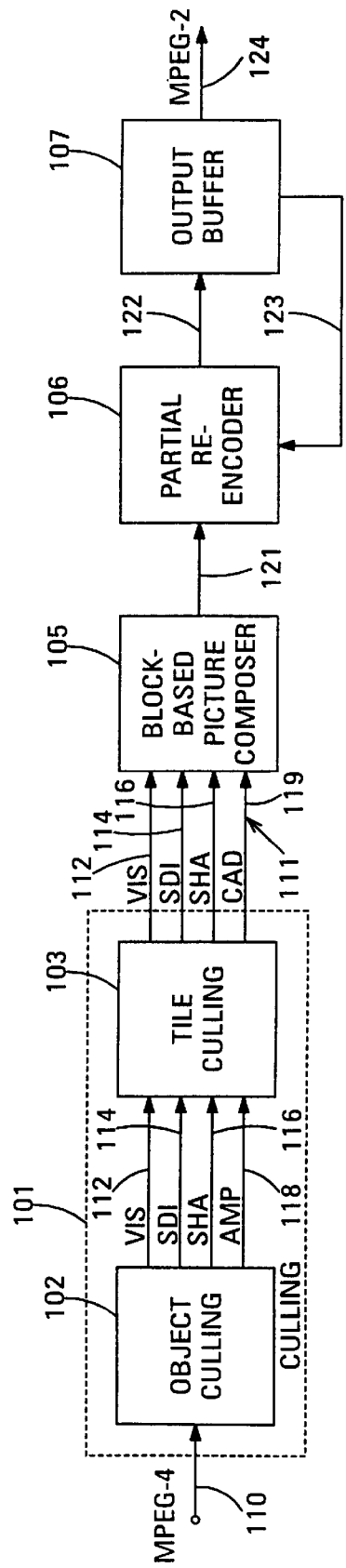
FIG. 4 is a block diagram of a first embodiment of a transcoder according to the invention.

FIG. 4 is a block diagram showing a first embodiment 100 of a transcoder according to the invention. The transcoder also performs the method according to the invention. The transcoder 100 is composed of the culling module 101, the block-based picture composer 105, the partial re-encoder 106 and the output buffer 107. In this first embodiment, the culling module is composed of the object culling module 102 and the tile culling module 103. The transcoder 100 transcodes the MPEG-4 object-based picture signal 110 to generate the MPEG-2 block-based picture signal 124, which is compliant with the standard MPEG-2 decoder. Decoding the MPEG-2 picture signal 124 using a standard MPEG-2 decoder will generate a picture signal that presents the same picture as that obtained by decoding the MPEG-4 picture signal 110 using a standard MPEG-4 decoder.

The transcoder 100 operates according to the following basic principles:

1. Only the portions of the MPEG-4 picture signal that represent objects visible in the picture are processed to generate the MPEG-2 picture signal;
2. The portions of the MPEG-4 picture signal that are processed are decoded only to the extent that allows the block-generating processing that generates the respective blocks of the MPEG-2 picture signal to be applied to them; and
3. The different types of tile constituting part of the MPEG-4 picture signal are adaptively decoded using the type of decoding most appropriate for the type of tile.

An MPEG-4 object-based picture signal often includes a substantial amount of additional information beyond that required to generate a given picture. For example, the MPEG-4 picture signal may include signal portions that represent objects that are not visible in the picture. Such objects include objects that are present in the scene but are not present in the picture, and objects or parts of objects that are present in the picture but are hidden by other objects. User interaction can cause such objects to become visible by bringing the objects into the picture, by changing the location of the picture in the scene or by moving the objects that hide the hidden objects, for example. Block-based picture signals do not offer interactivity, and only represent the objects and parts of objects that are actually visible in the picture. To save having to expend processing resources on transcoding the portions of the MPEG-4 picture signal that represent objects and parts of objects that are not visible, the transcoder 100 includes the culling module 101. This module can substantially reduce the processing resources required to transcode the MPEG-4 picture signal to an MPEG-2 picture signal by detecting and discarding the portions of the MPEG-4 picture signal that represent objects and parts of objects that are not visible in the picture. The process of detecting and discarding such portions of the MPEG-4 picture signal will be called culling.

The culled MPEG-4 picture signal 111 generated by the culling module 101 is composed of the signal portions that are required to generate the block-based picture signal. The block-based picture composer 105 processes the culled MPEG-4 picture signal to generate the partially-coded block-based picture signal 121.

A block-based picture signal, such as an MPEG-2 picture signal, represents a picture in terms of a fixed two-dimensional array of pixel blocks, as described above. The objects defined by an object-based picture signal, such as an MPEG-4 picture signal, are also expressed in terms of blocks of pixels. Such blocks, and blocks of parameters such as DCT coefficients derived from such blocks, will be called tiles in this disclosure to distinguish them from the blocks of the block-based picture signal. However, each object represented by a portion of the MPEG-4 picture signal can have its own coordinate system and pixel size that are rarely congruent with the coordinate system and pixel size of the picture as represented by the block-based picture signal.

Composing the block-based picture signal involves identifying the block, blocks or part of a block to which each tile of the culled MPEG-4 picture signal contributes and performing operations such as translating, scaling, and rotating to transfer the tiles from the coordinate systems of the objects to which they belong to the coordinate system of the picture. Moreover, when a block includes contributions from more than one tile, which especially occurs when the tile is a boundary tile or a partly-hidden interior tile, additional operations such as masking and merging are applied to the tiles to generate the block with the respective contributions from each of the tiles.

In this disclosure, references to tiles of the object-based picture signal contributing to a block of the block-based picture signal will be understood to encompass the case in which a single tile contributes the entire block, and references to identifying the blocks of the block-based picture signal to which a tile of the object-based picture signal contributes will be understood to encompass the case in which the tile contributes to a single block. Moreover, references to a block of the block-based picture signal being generated from tiles of the object-based picture signal will be understood to encompass the case in which the block is generated from a single tile.

To perform the processing required to transcode the MPEG-4 picture signal to the MPEG-2 picture signal with the least demand for processing resources or to comply with other constraints such as processing time, the block-based picture composer 105 examines each tile of the culled MPEG-4 picture signal to identify the blocks of the block-based picture signal to which the tile contributes, at least in part. The block-based picture composer also calculates the parameters, called shift, mask and merge (SMM) parameters, to be applied to the tile to generate each of the blocks. Finally, the block-based picture composer selects one of the different processing schemes available in the block-based picture composer to apply the block-generation processing to the tiles contributing to each block of the block-based picture signal to generate the block. In particular, the processing scheme chosen is that which decodes the tiles only to the extent that allows the block generating processing to be applied to them to generate the block. In other words, the block-based picture composer applies adaptive processing to the tiles of the culled MPEG-4 picture signal to generate blocks of the MPEG-2 picture signal.

The block-based picture composer 105 then uses the selected processing scheme to generate the block by decoding the tiles of the culled object-based picture signal that contribute to the block to the extent that allows the block-generating processing defined by the SMM parameters to them and applying to the tiles the block-generating processing defined by the respective SMM parameters to generate the block. The block generated is a block of the partially-coded block-based picture signal 121. The block-based picture composer reduces the demand for processing resources by generating most of the blocks of the partially-coded block-based picture signal in a partially-coded state.

The partially-coded block-based picture signal 121 generated by the block-based picture composer 105 passes to the partial re-encoder 106, where it is re-encoded to the extent that generates the fully-coded block-based picture signal 122. The fully-coded block-based picture signal is composed of blocks having a uniform coding state. The blocks of the partially-coded block-based picture signal have different coding states, depending on the extent of the decoding that the block-based picture composer 105 applied to the tiles of the MPEG-4 picture signal from which the blocks were respectively generated. This requires the partial re-encoder to apply different amounts of re-encoding to the blocks of the partially-coded block-based picture signal to generate the fully-coded block-based picture signal with all its blocks in the same coding state.

Finally, the fully-coded block-based picture signal 122 generated by the partial re-encoder 106 is fed to the output buffer 107, which generates the MPEG-2 picture signal 124 that is compliant with the standard MPEG-2 decoder and also generates the step-size control signal 123.

The embodiments of the transcoders and the modules thereof described in this disclosure may be constructed from discrete components, small-scale or large-scale integrated circuits, suitably-configured ASICs and other suitable hardware. Alternatively, the embodiments of the transcoder and the modules thereof may be constructed using a digital signal processor, microprocessor, microcomputer or computer with internal or external memory operating in response to a program such as the transcoding program fixed in the computer-readable medium according to the invention. In computer- and DSP-based embodiments, the various modules shown herein may be ephemeral, and may only exist temporarily as the program executes. In such embodiments, the transcoding program could be conveyed to the hardware on which it is to run by embodying the program in a suitable computer-readable medium, such as a set of floppy disks, a CD-ROM, a DVD-ROM, or could be transmitted to such hardware by a suitable data link. Moreover, the modules shown in this disclosure may operate autonomously, in which case, the various controllers shown may be unnecessary. The modules may also include memory, or may operate with a common memory. In these cases, the various cache memories shown may be unnecessary.

Figure 5A:
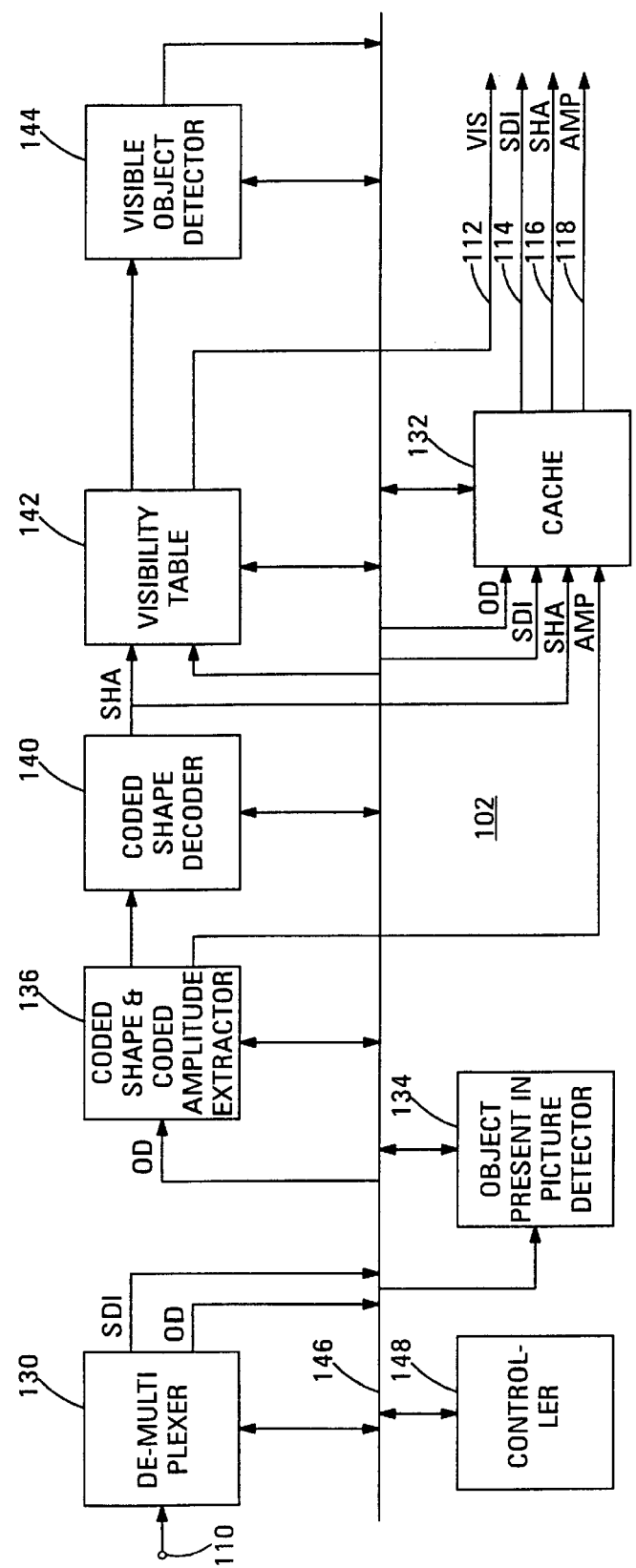
FIG. 5A is a block diagram of the object culling module of the first and second embodiments of the transcoder according to the invention.

The modules of the transcoder 100 will now be described in greater detail. FIG. 5A is a block diagram of an embodiment of the object culling module 102 that forms part of the culling module 101. As noted above, the object culling module reduces the processing resources required by itself and the other modules of the transcoder by detecting and discarding the portions of the MPEG-4 picture signal 110 that represent objects not visible in the picture.

The object culling module 102 is composed of the demultiplexer 130, the cache 132, the object present in picture detector 134, the coded shape and coded amplitude extractor 136, the coded shape decoder 140, the visibility table 142 and the visible object detector 144. Operation of the object culling module is controlled by the controller 148, which may be shared with the other modules of the transcoder 100. The bus 146 interconnects the controller and the modules so that data and commands can pass among the modules and between the controller and the modules. Operation of the modules 132–136 and 140–144 will be described below with reference to FIG. 5B.

The visibility table 142 is a table that stores information that enables the visible object detector 144 to identify the objects present in the picture that are actually visible. The picture is divided into a number of equal-sized spatial locations. The spatial locations may correspond to the pixels of the picture, for example. Alternatively, and preferably, the spatial locations correspond to the smallest blocks into which the block-based representation divides the picture. Specifically, the spatial locations may correspond to blocks of 8×8 pixels, or macroblocks of 16×16 pixels, aligned with the blocks and macroblocks into which the block-based representation divides the picture.

The visibility table 142 is composed of an entry for each of the spatial locations into which the picture is divided. The entry contains a list of information relating to all the objects present at the corresponding spatial location in the picture. Examples of the information that may constitute each entry include:

- a list of identifiers identifying all the objects present at the spatial location,
- depth information for each object, or other information useable to determine which of the objects is closest to the camera, and
- information indicating whether each object exists over the entire spatial location or if the object exists only over part of the spatial location.

In some applications, it may be advantageous for the visibility table additionally to include an auxiliary visibility table for each object. The auxiliary visibility table includes, for each of the spatial locations in the picture, an entry composed of a single bit whose state indicates whether or not the object is visible at the corresponding spatial location. The spatial locations correspond to those represented by the main visibility table. Such information is implicitly included in the main visibility table, but it may be useful to create a separate auxiliary visibility table for each object where this information is explicitly available. The auxiliary visibility table can be generated as each object is being processed. The auxiliary visibility table itself is relatively small, since each entry can be composed of a single bit.

The visible object detector 144 is described below as operating after the information from the shape descriptors of all the objects present in the picture has been added to the visibility table 142 since the objects visible in the picture cannot finally be determined until this has been done. Alternatively, the visible object detector may operate in a "decode as you go" mode in which the objects are processed serially. A determination of whether the object is visible is made. If the object is not visible, it is immediately discarded. If the object is visible, at least in part, the information from its shape descriptor is added to the visibility table.

Figure 5B:
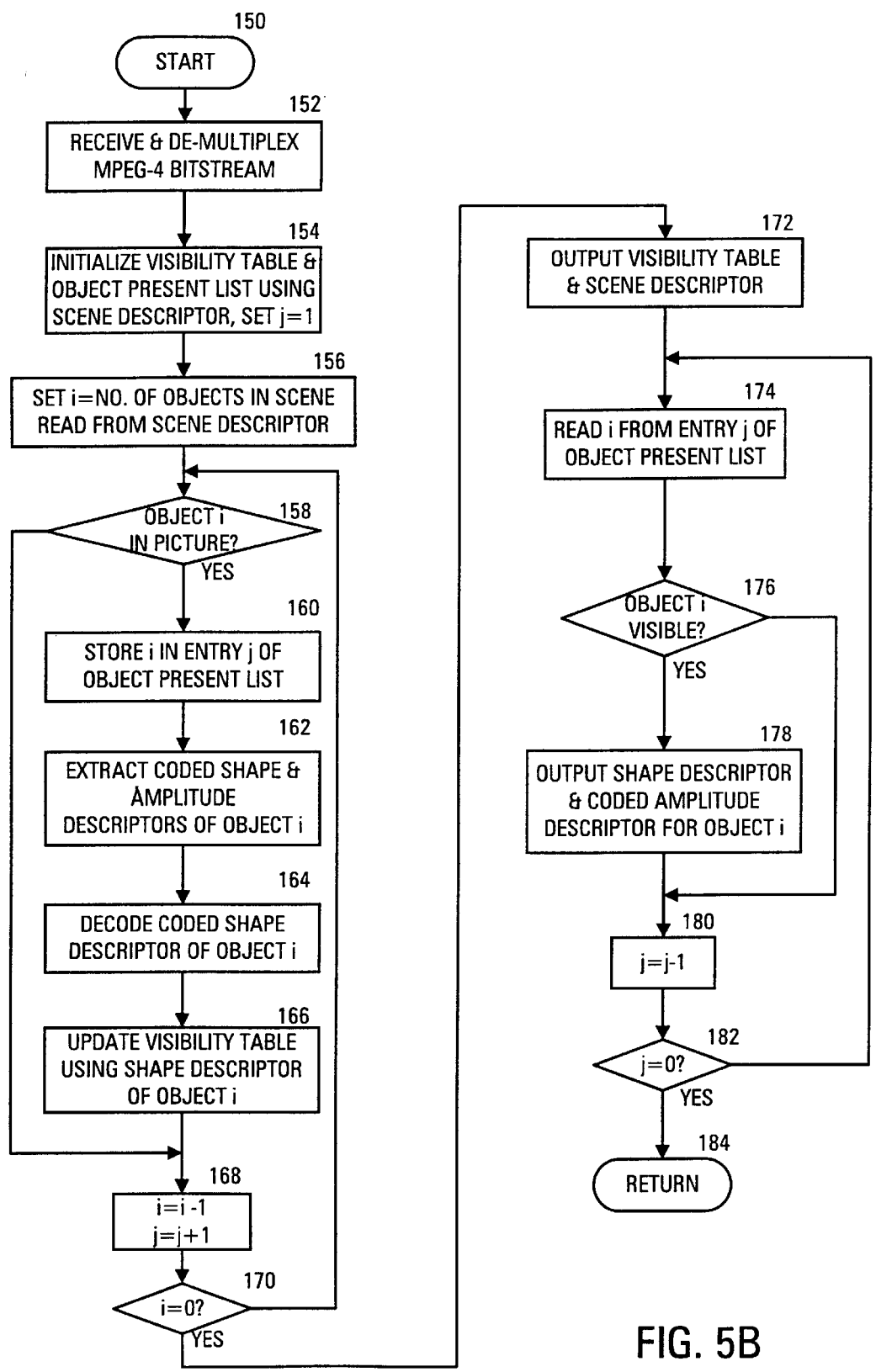
FIG. 5B is a flow chart illustrating the operation of the object culling module shown in FIG. 5A.

The processing performed by the embodiment of the object culling module 102 illustrated in FIG. 5A will now be described with reference to FIGS. 5A and 5B.

Processing starts at step 150. In step 152, the multiplexer 130 receives the MPEG-4 picture signal 110 and demultiplexes the MPEG-4 picture signal into its principal components, namely, the scene descriptor SDI and a coded object descriptor OD for each object in the scene. The scene descriptor and object descriptors are temporarily stored in the cache 132. If the scene descriptor is coded, it is decoded before being stored.

In step 154, the controller 148 initializes the visibility table 142 and an object present list (not shown) in response to the scene descriptor read from the cache 132. The controller additionally initializes the index j for the object present list to one.

In step 156, the controller 148 initializes the object index i to a value equal to the number of objects in the scene. This number is determined from the scene descriptor.

In step 158, the object present in picture detector 134 performs a test to determine whether the object indicated by the index i, i.e., the object i, is located in the scene such that it is present in the picture. The location of the object i in the scene and the position of the picture are defined by the scene descriptor. If the test result is NO, and the object is not present in the picture, processing advances to step 168, which will be described below. Otherwise, processing advances to step 160.

In step 160, the controller 148 stores the value of the index i as the j-th entry in the object present list.

In step 162, the controller 148 transfers the coded object descriptor for the object i, which is present in the picture, from the cache 132 to the coded shape and coded amplitude extractor 136. The coded shape and coded amplitude extractor demultiplexes the coded object descriptor into its principal components, namely, a coded shape descriptor and a coded amplitude descriptor AMP. The coded amplitude descriptor passes to the cache 132, where it is temporarily stored and the coded shape descriptor passes to the coded shape decoder 140.

In step 164, the coded shape decoder 140 decodes the coded shape descriptor of the object i to provide the shape descriptor SHA of the object i. The shape descriptor of the object i passes to the cache 132, where it is temporarily stored.

In step 166, the controller 148 updates the visibility table 142 in accordance with the shape descriptor of the object i by adding the information relating to the object i to the entry of the visibility table corresponding to each spatial location in the picture where the shape descriptor indicates the object i is present.

In step 168, the controller 148 decrements the index i by one, and increments the index j by one.

In step 170, the controller 148 performs a test to determine whether the index i is equal to zero. If the test result is YES, indicating that the object present in picture detector 134 has determined whether each of the objects in the scene is present in the picture, execution advances to step 172. Otherwise, execution returns to step 158 where the object present in picture detector 134 determines whether the object with the new value of the index i is present in the picture.

In step 172, the controller 148 transfers the visibility table VIS from the visibility table 142 to the bus 112 and transfers the scene descriptor SDI from the cache 132 to the bus 114.

In step 174, the controller 148 reads the object index i from the entry in the object present list indicated by the index i and transfers the object index to the visible object detector 144.

In step 176, the visible object detector 144 examines the visibility table 142 to determine whether object i is visible in the picture. Object i is at least partly visible if its depth value is the smallest of all the opaque objects appearing in at least one of the entries in the visibility table in which information relating to the object i appears. This assumes a depth convention in which the depth value increases with increasing distance from the camera. If the test result is NO, and object i is not visible in the picture, execution advances to step 180, which will be described below. Execution advancing to step 180 has the effect of discarding the portion of the MPEG-4 picture signal that defines the object i because it bypasses step 178 in which the shape descriptor and coded amplitude descriptor of the object i are transferred from the cache 132 to the busses 116 and 118, respectively. If the test result is YES, and object i is visible in the picture, processing advances to step 178.

In step 178, the controller 148 transfers the shape descriptor SHA and the coded amplitude descriptor AMP for the object i from the cache 132 and to the busses 116 and 118, respectively.

In step 180, the controller 148 decrements the index j of the object present list by one.

In step 182, the controller 148 performs a test to determine whether the index j is equal to zero. If the test result is YES, indicating that the visible object detector 144 has determined of the visibility of all the objects present in the picture, execution advances to step 184, where it returns to the main routine. If the test result is NO, execution returns to step 174, where the visible object detector determines the visibility of the object with an object index i based corresponding to the new value of the index j of the object present list.

Figure 6A:
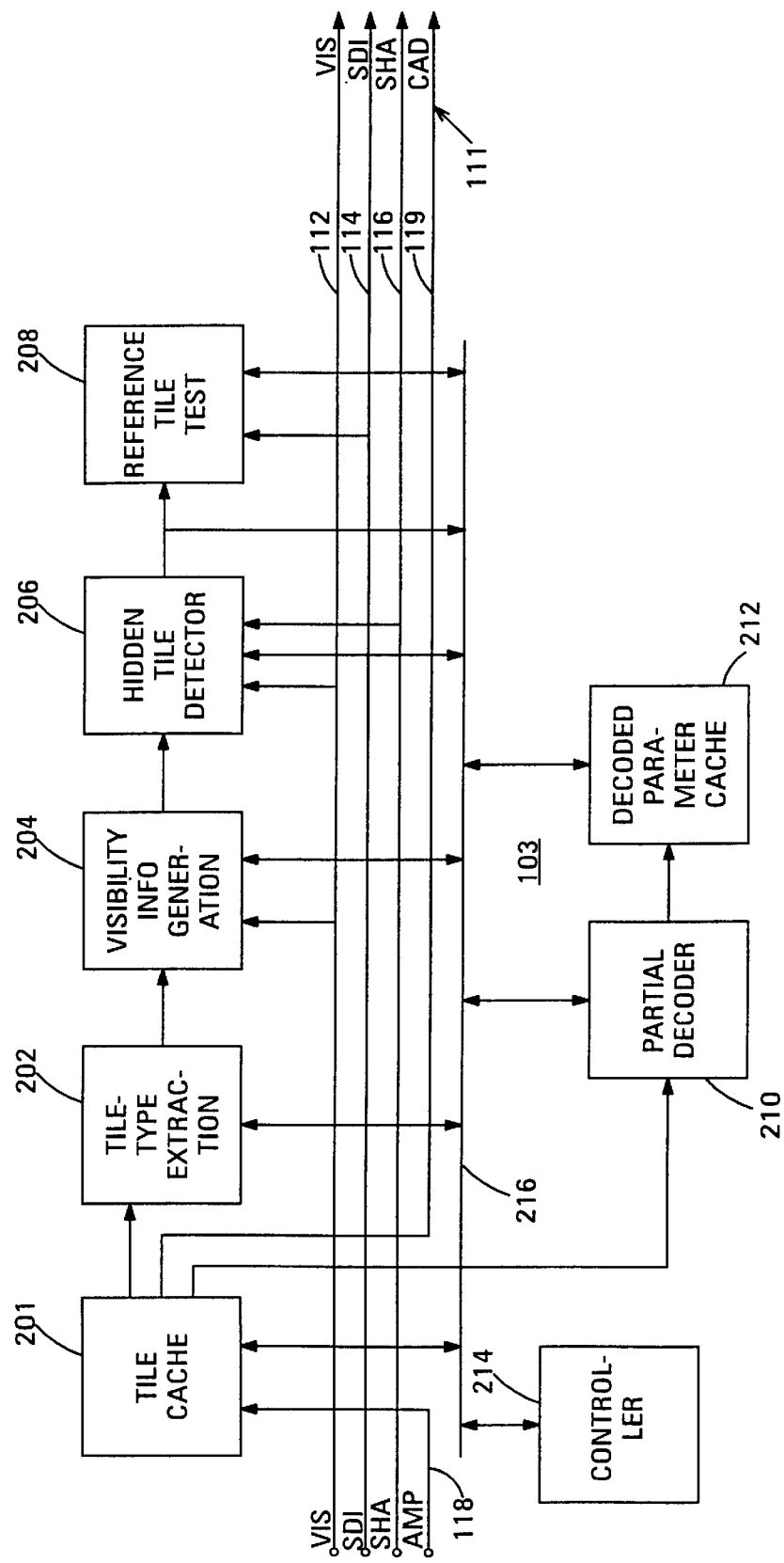
FIG. 6A is a block diagram of the tile culling module of the first embodiment of the transcoder according to the invention.

FIG. 6A is a block diagram of an exemplary embodiment of the tile culling module 103 that forms part of the culling module 101. The tile culling module receives from the object culling module 102 the visibility table VIS, the scene descriptor SDI and the decoded shape descriptors SHA and coded amplitude descriptors AMP of the objects determined by the object culling module to be visible, at least in part, in the picture. For each object visible in the picture, the tile culling module detects and discards the hidden tiles of the coded amplitude descriptor AMP, except for hidden tiles that are needed as reference tiles to generate other tiles that represent parts of the object that are visible in the picture. Hidden are tiles of the object not visible in the picture. By culling the hidden tiles of objects that are partially visible in the picture, the tile culling module further reduces the processing resources required to transcode the coded object-based picture signal because the culled tiles are not processed further.

The tile culling module 103 is composed of the tile cache 201, the tile-type extraction module 202, the visibility information extraction module 204, the hidden tile detector 206, the reference tile test module 208, the partial decoder 210 and the decoded parameter cache 212. The tile culling module is controlled by the controller 214, which may be shared with the other modules of the transcoder 100. The bus 216 interconnects the controller and the modules so that data and commands can pass among the modules and between the controller the modules.

The tile cache 201 temporarily stores each tile constituting the coded amplitude descriptors AMP received from the object culling module 102. Tiles that are needed to generate the block-based picture signal, as decided by the tile culling module 103, are later read out of the tile cache as a culled amplitude descriptor CAD for each object present in the picture. Tiles not read out from the tile cache as tiles of the culled amplitude descriptor are effectively culled from the amplitude descriptor. The tiles culled from the amplitude descriptor are external tiles, i.e., tiles located entirely outside the object; most hidden internal tiles, i.e., hidden tiles located entirely inside the object; and most hidden boundary tiles, i.e., hidden tiles located part-inside and partoutside the object. Hidden tiles are tiles that are hidden by another object and are not needed to generate the block-based picture signal.

The tile-type extraction module 202 determines the tile-type of each tile constituting the coded amplitude descriptors AMP. The tile-type extraction module may make this determination by reading tile-type information included in each tile. If the tile does not include tile-type information, the tile-type extraction module determines the tile-type from the shape descriptor SHA of the corresponding object. The tile-type of a tile indicates whether the tile is an internal tile, an external tile or a boundary tile.

The visibility information generator 204 generates, for each tile, visibility information that indicates which other objects, if any, are located closer to the camera than the tile, and the extent that such other objects overlap the tile. The visibility information generator passes the visibility information to the hidden tile detector 206.

The hidden tile detector 206 tests the visibility information for each tile received from the visibility information extraction module 204 to determine whether the tile is a hidden tile, i.e., whether none of the tile is visible. When the tile is not a hidden tile, the hidden tile detector generates its output signal in a state that inhibits operation of the reference tile test module 208 and causes the tile cache 201 to transfer the tile to the bus 119 as a tile of the culled amplitude descriptor CDA of the corresponding object. In this embodiment, the culled amplitude descriptors form part of the culled object-based picture signal 111. When the hidden tile detector 206 determines that the tile is a hidden tile, it generates its output signal in a state that enables the reference tile test module and inhibits the tile cache.

The reference tile test module 208 operates in response to information included in a visible tile located in the raster scan immediately to the right or below the current tile. This information indicates that the hidden tile is a reference tile needed to generate the visible tile to the right or below. When it determines that the hidden tile is a reference tile, the reference tile test module feeds its output signal via the bus 216 to the partial decoder 210 and to the tile cache 201. The output signal is in a state that causes the tile cache to feed the hidden tile to the partial decoder 210 and that activates the partial decoder.

The partial decoder 210 operates in response to the output signal received from the reference tile test module 208 to decode partially the hidden tile received from the tile cache 201.

The decoded parameter cache 212 receives the parameters resulting from partially decoding the hidden tile from the partial decoder 210 and stores them. The parameters are later used to generating the tiles that use the hidden tile from which the parameters were derived as a reference tile. The parameters decoded from the hidden tile require significantly less storage than the hidden tile itself.

Figure 6B:
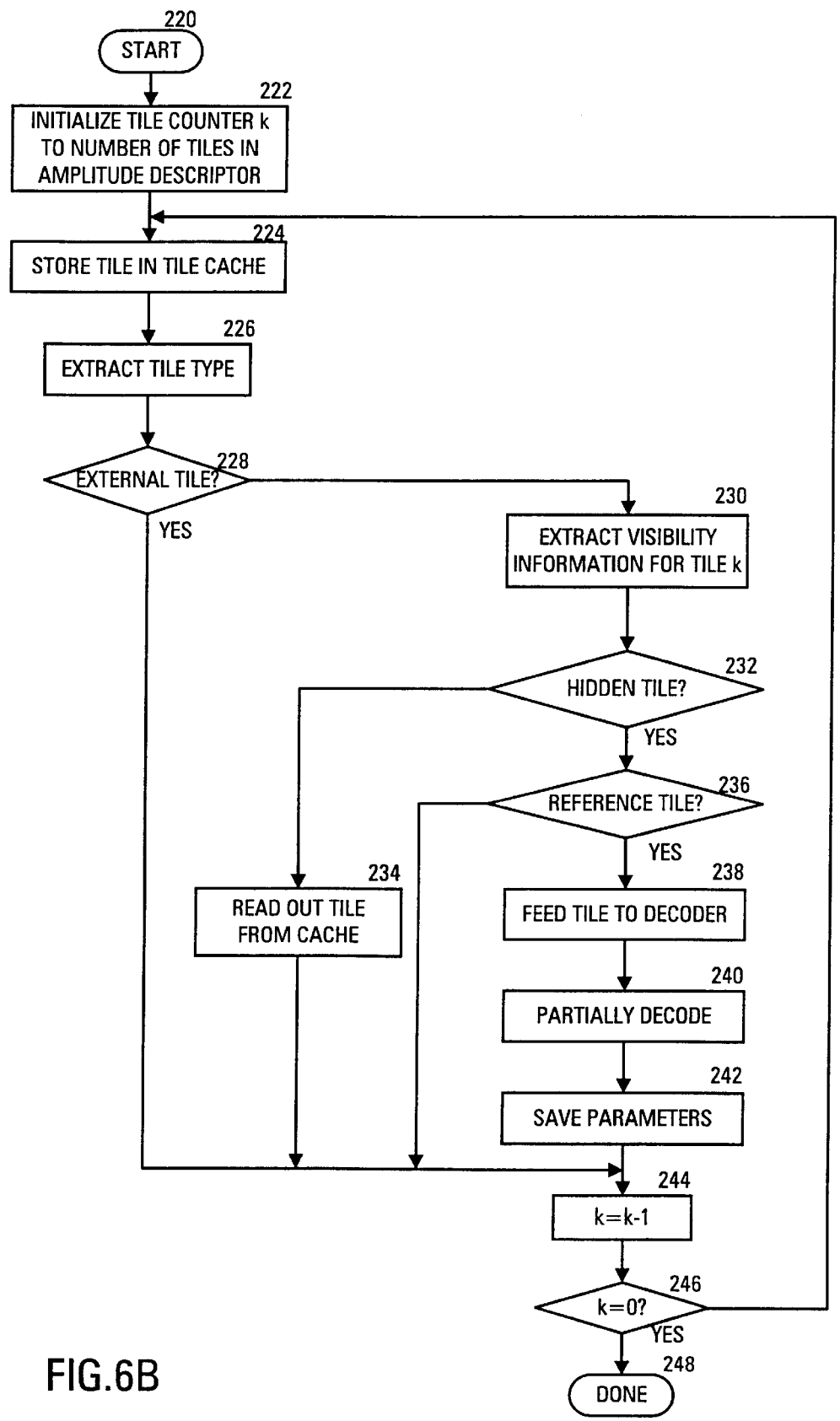
FIG. 6B is a flow chart illustrating the operation of the tile culling module shown in FIG. 6A.

FIG. 6B is a flow chart illustrating the processing performed by the embodiment of the tile culling module 103 shown in FIG. 6A to process the coded amplitude descriptor of the object i. The tile culling performs similar processing on the amplitude descriptors of the other objects present in the picture. Housekeeping operations that keep track the objects present in the picture to ensure that the amplitude descriptors of all such objects are processed are omitted to simplify the description. Execution starts at step 220.

In step 222, the controller 214 examines the decoded shape descriptor SHA of the object i to determine the number of tiles in the coded amplitude descriptor of the object, and initializes the tile counter k to a value equal to the number of tiles. Alternatively, this step may initialize the tile counter to zero, the tile counter may be incremented in step 244, and a test to determine whether any tiles of the coded object descriptor remain unprocessed may be performed in step 246.

In step 224, the tile indicated by the value of the tile counter k is temporarily stored in the tile cache 201.

In step 226, the tile-type extraction module 202 determines the tile type of the tile k, as described above.

In step 228, the controller 214 tests the tile-type of the tile k to determine whether the tile k is an external tile. If the test result is YES, execution advances to step 244. This has the effect of discarding the tile k from the coded amplitude descriptor since the tile is never read out of the tile cache, and is overwritten in the tile cache next time step 224 executes. If the test result is NO, indicating that the tile k is an internal or boundary tile, execution advances to step 230.

In step 230, the visibility information generating module 204 generates the visibility information for the tile k from the entry in the visibility table VIS corresponding to the tile k of the object i, and also from the scene descriptor SDI and the shape descriptor SHA of the object i, as described above.

In step 232, the hidden tile detector 206 tests the visibility information for the tile k received from the visibility information generator 204 to determine whether any opaque objects located closer to the camera than the tile k singly or collectively completely overlap the tile k, so that such other objects hide the tile k in the picture. If the test result is NO, indicating that the tile k is not a hidden tile, execution advances to step 234. If the test result is YES, execution advances to step 236, which will be described below.

In step 234, the NO result generated by the hidden tile detector 206 causes the tile cache 201 to transfer the tile k to the bus 119 as the tile k of the culled amplitude descriptor CAD of the object i. Execution then advances to step 244, which will be described below.

In step 236, the reference tile test module 208 operates when the hidden tile detector 206 generates a YES result, indicating that the tile is a hidden tile. The reference tile test module looks ahead to the tiles located in the raster scan immediately to the right and below the tile k in the amplitude descriptor of the object i to determine whether either of these tiles needs the tile k as a reference tile. If the test result is NO, execution advances to step 244, which will be described below. If the test result is YES, execution advances to step 238.

In step 238, the YES result generated by the reference tile test module causes the tile cache 201 to transfer the tile k to the partial decoder 210 via the bus 216. This has the effect of omitting the tile k from the culled amplitude descriptor CAD of the object i, since this tile is never transferred to the bus 119 as a tile of the culled amplitude descriptor of the object i. However, this tile is not discarded completely, since is partially decoded and the resulting parameters are stored in the decoded parameter cache 212, as will be described next.

In step 240, the partial decoder 210 partially decodes the tile k to generate a set of partially-decoded tile parameters. Such parameters may include the DC transform coefficient, a motion vector, if applicable, and quantizing parameters.

In step 242, the decoded parameter cache 212 temporarily stores the partially-decoded tile parameters generated by the partial decoder 210 for use in generating other tiles constituting the culled amplitude descriptor CAD of the object i.

In step 244, the controller 214 decrements the tile counter k by one.

In step 246, the controller 214 performs a test to determine whether the value of the tile counter k is equal to zero. If the test result is YES, indicating that all of the tiles of the coded amplitude descriptor AMP of the object i have been subject to culling, execution advances to step 248, where execution returns to the main routine until the tile culling module 103 processes the coded amplitude descriptor of another of the objects visible in the picture. If the test result is NO, execution returns to step 224, where the tile having a tile index equal to the new value of k set in step 244 is stored in the tile cache 201.

Figure 7A:
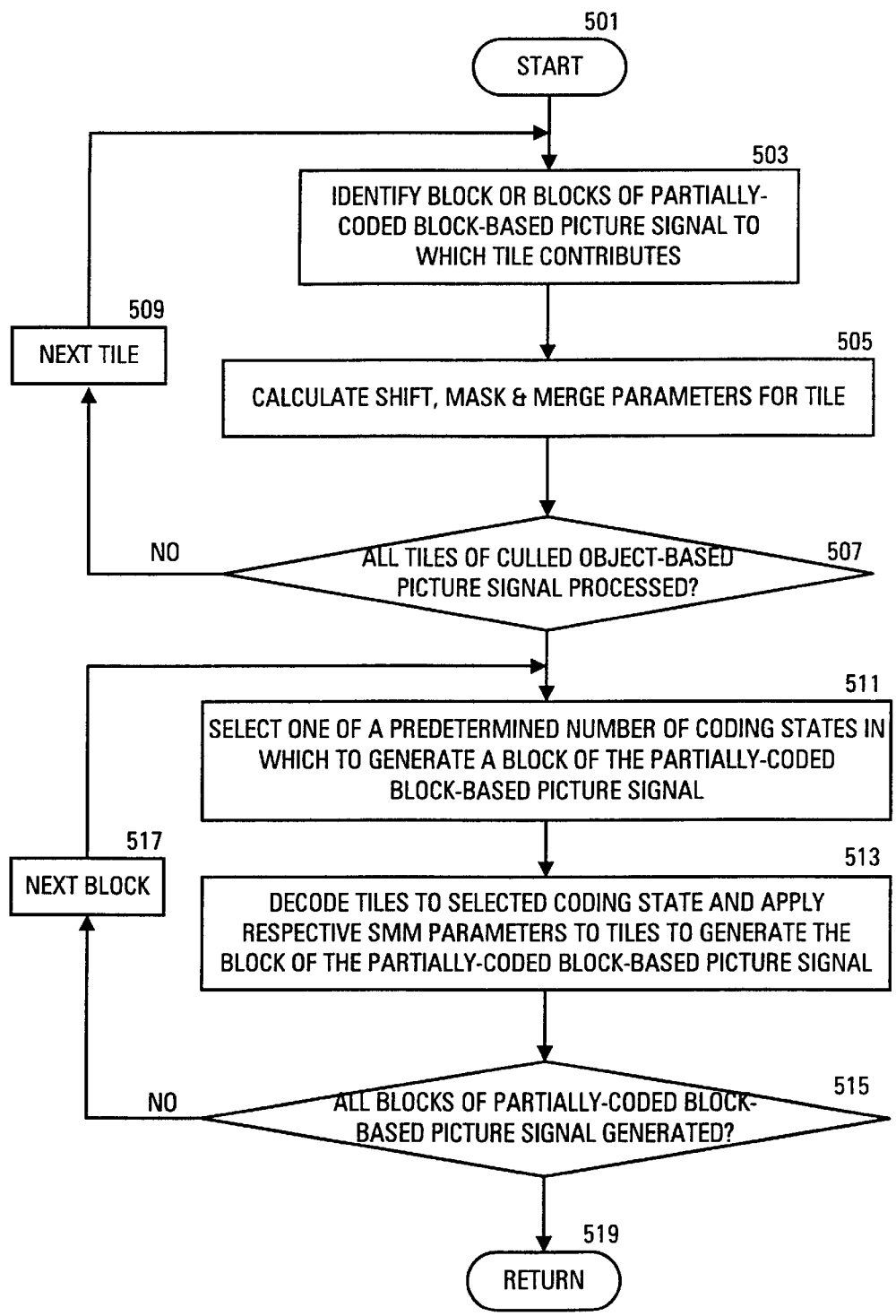
FIG. 7A is a flow chart illustrating the processing performed by a first embodiment of the block-based picture composer of the first embodiment of the transcoder according to the invention.

FIG. 7A is a flow chart that illustrates the tile-oriented processing performed by the block-based picture composer 105. Execution starts in step 501.

In step 503, the block or blocks of the block-based picture signal to which a tile of the culled object-based picture signal contributes are identified.

In step 505, shift, mask and merge (SMM) parameters are calculated for the tile. The SMM parameters, to be described in more detail below, define the block-generating processing that generates the identified block or blocks, at least in part, from the tile.

In step 507, a test is performed to determine whether all the tiles of the culled object-based picture signal have been processed. If the test result is NO, execution returns to step 503 via step 509. Step 509 causes step 503 to be performed on the next tile of the culled object-based picture signal. If the test result is YES, execution advances to step 511.

In step 511, one of a number of different coding states is selected in which to generate a block of the block-based picture signal from the tiles that contribute to the block. The coding state selected is that which involves the least decoding of the tiles, but which allows the block-generating processing defined by the SMM parameters to be applied to the tiles to generate the block.

In step 513, the tiles contributing to the block are decoded to the selected coding state and the block-generating processing defined by the SMM parameters is applied to them to generate the block of the partially-coded block-based picture signal. The block is generated in the selected coding state. The coding state of the block will normally differ from that of others of the blocks of the partially-coded block-based picture signal.

In step 515, a test is performed to determine whether all the blocks of the partially-coded block-based picture signal have been generated. If the test result is NO, execution returns to step 511 via step 517. Step 517 causes step 511 to be performed on the next block of the partially-coded block-based picture signal. If the test result is YES, execution advances to step 519, where it returns to the main routine.

Figure 7B:
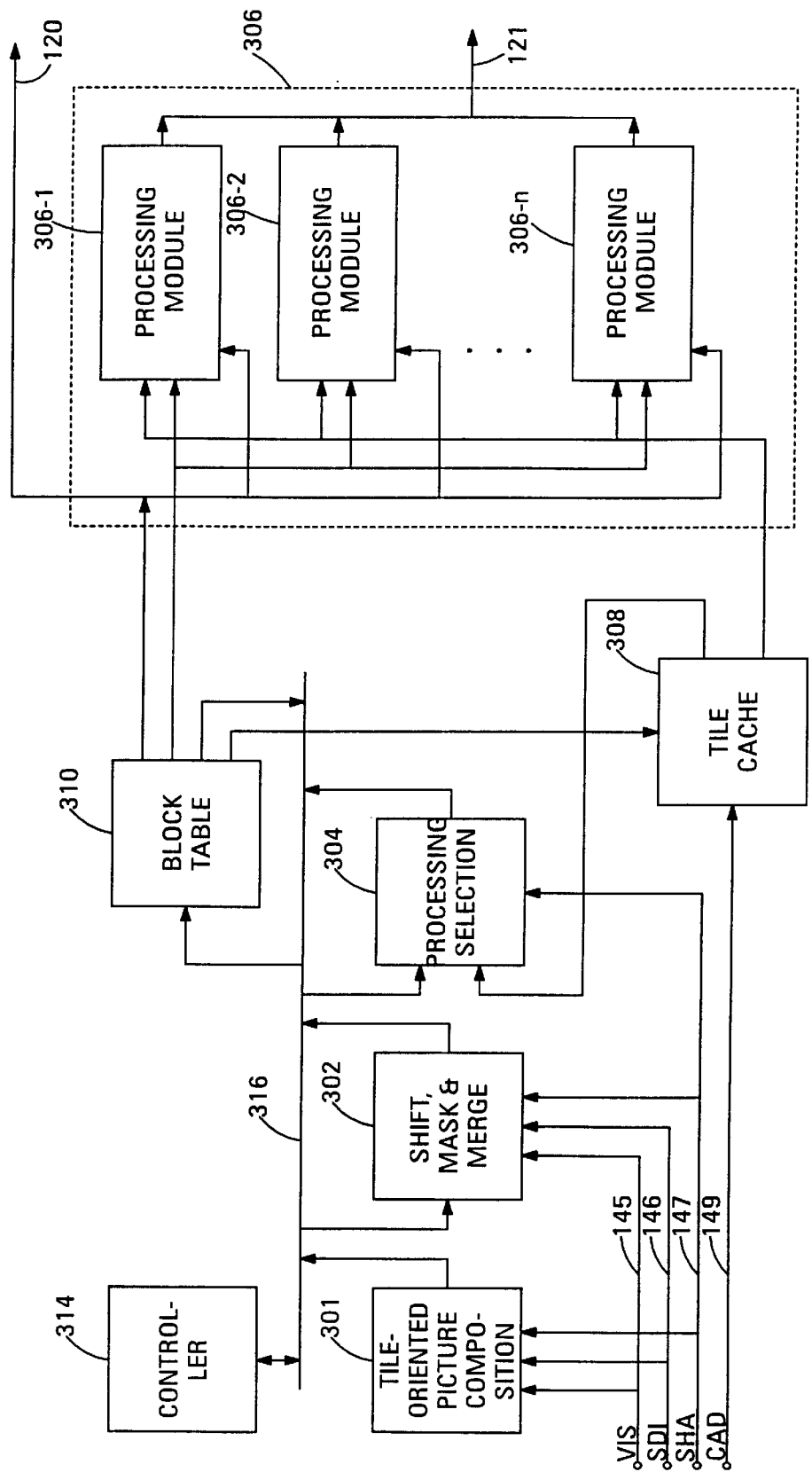
FIG. 7B is a block diagram of the first embodiment of the block-based picture composer of the first embodiment of the transcoder according to the invention.

An exemplary first embodiment of the block-based picture composer 105 will now be described with reference to the block diagram shown in FIG. 7B. This embodiment performs the processing described above with reference to FIG. 7A. The block-based picture composer includes the picture composition module 301, the shift, mask and merge parameter module 302, the processing selection module 304, the processing modules 306, the tile cache 308, and the block table 310. Exemplary processing modules 306-1, 306-2 and 308-n are shown. The block-based picture composer may incorporate fewer or more processing modules than the number shown. The decoding states to which the processing modules decode the tiles of the culled amplitude descriptors before applying the block-generating processing defined by the shift, mask and merge parameters differs among the processing modules. The block-based picture composer is controlled by the controller 314, which may be shared with the other modules of the transcoder 100. The bus 316 interconnects the controller and the modules so that data and commands can pass among the modules and between the controller and the modules.

The block-based picture composer 105 receives the culled object-based picture signal 111 from the culling module 101. The culled object-based picture signal includes the visibility table VIS, the scene descriptor SDI and the shape descriptors SHA and culled amplitude descriptors CAD of the objects present in the picture. The tile cache 308 temporarily stores the tiles constituting the culled amplitude descriptors.

In this embodiment, the picture composition module 301 is tile-oriented in that, for each tile of the culled amplitude descriptors CAD forming part of the culled object-based picture signal 111, the picture composition module identifies the block or blocks of the partially-coded block-based picture signal 121 to which the tile contributes, at least in part. The picture composition module identifies the block or blocks to which each tile contributes by examining the scene descriptor SDI and the shape descriptor SHA of the object to which the tile belongs. The scene descriptor defines the location in the picture of the object to which the tile belongs and defines the size of the boundary rectangle of the object. The shape descriptor of the object describes the arrangement of the tiles in the boundary rectangle of the object. For each identified block, the picture composition module generates a record for the block table 310 and feeds the record to the block table 310 via the bus 316. The record may include such information as the block number of the identified block, the object number of the object to which the tile belongs, and the tile number of the tile, for example.

The block table 310 includes storage locations corresponding to the blocks into which the block-based representation divides the picture. At each storage location is stored an entry composed of the information that the block-based picture composer 105 needs to generate the block of the partially-coded block-based picture signal 121. Each entry includes a number of records, each of which corresponds to one tile of the culled object-based picture signal 111. The number of records constituting each entry varies from block-to-block, depending on the number of tiles from which the block is generated. Many of the entries will contain four records, but the entries for blocks generated from a single tile will contain a single record. The entries for some blocks to which boundary tiles, tiles partially hidden by another object and multiple interior tiles (as occurs when the object is highly scaled) contribute may contain more than four records.

The block table 310 receives each record generated by the picture composer 301, refers to the block number that forms part of the record, and stores the record as part of the entry stored at the storage location corresponding to the block number.

After the picture composition module 301 has identified the block or blocks of the block-based picture signal to which each tile of the culled object-based picture signal 111 contributes, at least in part, the controller 314 causes the block-table 310 to transfer each entry stored therein to the shift, mask and merge module 302 via the bus 316. The shift, mask and merge parameter module additionally receives the visibility table VIS, the scene descriptor SDI and the shape descriptors SHA for the objects present in the picture. The entry received from the block table for each block contains at least one record identifying a tile of the culled object-based picture signal 111. The shift, mask and merge module uses the scene descriptor and the shape descriptor of the object identified by each record in the entry to calculate the shift, mask and merge (SMM) parameters that define the shifting, masking and merging operations to be applied to the tile identified by the record to generate the corresponding block, or block component. The shift, mask and merge module calculates the SMM parameters by referring to the scene descriptor, which defines the location of the object in the picture and the size of the boundary rectangle of the object, and the shape descriptor, which describes the arrangement of the tiles in the boundary rectangle. The shift, mask and merge module appends the SMM parameters to each record in the entry, and returns the entry to its location in the block table. Alternatively, the shift, mask and merge module may otherwise augment each record in the entry stored in the block table with the respective calculated SMM parameters.

If the entry processed by the shift, mask and merge module 302 contains only one record, indicating that only one tile contributes-to the block, the shift, mask and merge module generates SMM parameters that define only the translation, scaling and rotation to be applied to the tile to generate the block of the block-based picture signal. If the entry contains two or more records, indicating that two or more tiles contribute to the block, the shift, mask and merge module generates SMM parameters for each of the tiles. The SMM parameters define any translation, scaling and rotation to be applied to each of the tiles. In addition, the SMM parameters define the masking operations to be applied to each of the tiles to define the part of the each tile that will contribute to the block. Finally, the SMM parameters that define the merging operation to be applied to the tiles to generate the block with the appropriate contribution from each tile. For some of the tiles, any or all of the translation, scaling and rotation amounts specified by the SMM parameters may be zero.

The processing selection module 304 selects one of the processing modules 306 available in the block-based picture composer 105 to process the tiles identified by the entry in the block table for each block of the partially-coded block-based picture signal 121 to generate the respective block. The coding states to which the processing modules decode the tiles differ among the processing modules so that the blocks are generated in different coding states depending on the processing module used to generate them. The selected processing module applies to the identified tiles the block-generating processing defined by the shift, mask and merge (SMM) parameters calculated for the tiles and stored in the entry. In selecting one of the available processing modules, the processing selection module may take all or some of the following factors into account:

1. Information on the hardware and software resources available to process the tiles, for example:
   (a) The hardware resources available in the block-based picture composer 105 and the partial re-encoder 106, e.g., such resources as computational power and available memory. In a hardware-based embodiment, the hardware resources may define the types of operation that the block-based picture composer and the partial re-encoder are capable of performing.
   (b) Whether the hardware resources include special functional units, such as multi-media extensions, that make certain operations (e.g., performing DCTs and IDCTs) easier to perform than if such resources were not available.
   (c) The software resources available in the block-based picture composer 105 and the partial re-encoder 106. These software resources can define the types of operations that the block-based picture composer and the partial re-encoder are capable of performing.
2. Information on performance and standards constraints, for example:
   (a) The time available for the block-based picture composer 105 to generate the partially-coded block-based picture signal and for the partial re-encoder 106 to re-encode the partially-coded block-based picture signal.
   (b) The required quality of the picture presented by decoding the coded block-based picture signal.
3. Information relating to the tiles that contribute to the block, for example:
   (a) The tile-types of the tiles, i.e., whether the tiles are interior tiles, boundary tiles or a mixture thereof, and whether the tiles are wholly or partly visible in the picture. The processing selection module 304 determines the tile-type of the tile using tile-type information appended to each tile, or from the shape descriptor of the object to which the tile belongs, as described above.
   (b) The sparsity and characteristics of the non-zero DCT coefficients in the tiles, e.g., the number and location of the non-zero coefficients in the tile. The processing selection module determines these properties of the tiles by examining the tiles.
   (c) The masking applied to the tiles, e.g., binary or gray-scale alpha mask; the number of masks applied to each of the tiles; and whether the masks divide the tiles into arbitrary shapes or regular shapes, e.g., whether the mask divides the tile into two equal, rectangular sub-tiles. The shift, mask and merge parameters generated by the shift, mask and merge module indicate any masking to be applied to the tiles.
   (d) The alignment of the tiles with respect to the coordinate system of the block-based representation of the picture. The shift, mask and merge parameters SMM generated by the shift, mask and merge module indicate any translation, scaling and rotation to be applied to the tile.
   (e) The relationship between the luminance/chrominance format of the tile, e.g., 4:2:0, 4:2:2 or 4:4:4 and the desired luminance/chrominance format of the block-based picture signal, e.g., 4:2:0, 4:2:2 or 4:4:4.

After the shift, mask and merge module 302 has determined the SMM parameters for each of the tiles of the culled object-based picture signal 111, and the SMM parameters for each tile have been stored in the record forming at least part of the entry or entries in the block table 310 of the block or blocks to which the tile contributes, the controller 314 causes the block table to transfer each entry stored therein to the processing selection module 304 and the tile cache 308 via the bus 316. The processing selection module receives the scene descriptor SDI and the shape descriptors SHA and receives from the tile cache the tiles identified in each entry in the block table. From these data, the processing selection module generates a processing selection for each block of the partially-coded block-based picture signal. The processing selection indicates the one of the processing modules 306 that is to be used to process the one or more tiles identified by the block's entry in the block table to generate the block. The processing selection module appends the processing selection to the block's entry, and returns the entry to the block table, or otherwise augments the block's entry in the block table with the processing selection.

Figure 7C:
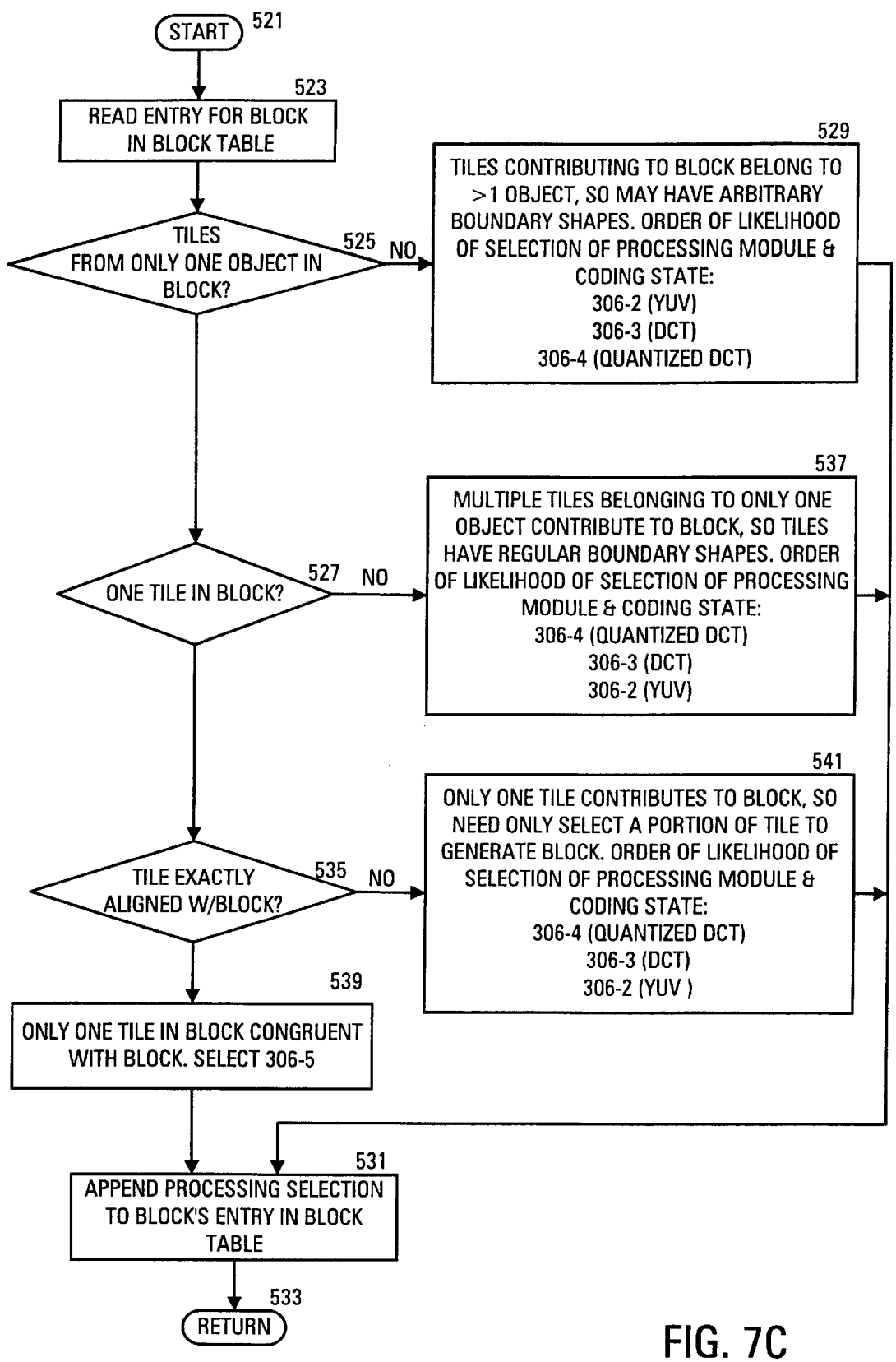
FIG. 7C is a flow chart illustrating part of the processing performed by the processing selection module of the embodiments of the block-based picture composer shown in FIGS. 7B and 12B.

FIG. 7C shows an example of the basic selection processing performed by the processing selection module 304 for each block of the partially-coded block-based picture signal 121. The basic selection processing selects the one of the processing modules 306 that will be used to generate the block. This in effect determines the coding state to which the tile or tiles contributing to each block of the partially-coded block-based picture signal will be decoded prior to applying the block-generating processing to the tile or tiles to generate the block. Housekeeping operations that keep track of the blocks processed to ensure that a processing selection is appended to every entry in the block table are omitted to simplify the description.

Processing starts at step 521. At step 523, the entry in the block table 310 for the block is read to gather the, information that will be used in part to make the processing selection.

In step 525, a test is performed to determine whether the tiles that contribute to the block belong to only one object. The test is performed on the tile identifiers of the tiles identified in the block's entry in the block table 310 as contributing to the block. When the test result is YES, execution advances to step 527, which will be described below. When the test result is NO, execution advances to step 529.

In step 529, the one of the processing modules 306 that will be used to generate the block is chosen. Step 529 is performed when the test performed in step 523 indicates that the tiles that contribute to the block belong to more than one object. Tiles that belong to more than one object generally have arbitrary boundary shapes. Generating a block from tiles that have arbitrary boundary shapes is most likely to be achieved using the processing module 306-2, which generates the block as a block of YUV pixel values and will be described below with reference in FIG. 8B. However, the tiles may have regular boundaries, or may be sparse, or other factors, such as those listed above, may enable the block to be generated using fewer processing resources, or may enable other constraints, such as processing time, to be met more easily, by the processing module 306-3, or even by the processing module 306-4. The processing module 306-3 will be described below with reference to FIG. 8C and generates the block as a block of DCT coefficients. The processing module 306-4 will be described below with reference to FIG. 8D and generates the block as a.block of quantized DCT coefficients.

The processing performed in step 529 evaluates the factors described above with reference to FIG. 7B to select the one of the processing modules that requires the least processing resources to generate the block. Execution then advances to step 531, where the processing selection is appended to the block's entry in the block table, and then to step 533, whence it returns to the main routine.

In step 527, a test is performed to determine whether only one tile contributes to the block. The test is performed on the block's entry in the block table 310 and determines whether the entry is composed of only one record. This indicates that only one tile contributes to the block. When the test result is YES, execution advances to step 535, which will be described below. When the test result is NO, execution advances to step 537.

In step 537, the one of the processing modules 306 that will be used to generate the block is chosen. Step 537 is performed when the test performed in step 527 indicates that more than one tile contributes to the block. However, the tiles all belong to the same object, since the test performed in step 527 is only performed in the event of a YES result being obtained in the test performed in step 525. When the tiles that contribute to the block all belong to the same object, the tiles generally have regular boundary shapes. A block generated from tiles that have regular boundary shapes can often be generated using the least processing resources by the processing module 306-4, which generates the block as a block of quantized DCT coefficients. However, factors, such as those described above with reference to FIG. 7B, may cause the least processing resources to be required when the block is generated by the processing module 306-3, which generates the block as a block of DCT coefficients, or even by the processing module 306-2, which generates the block as a block of YUV pixel values.

The processing performed in step 537 evaluates the above-mentioned factors to select the one of the processing modules that requires the least processing resources to generate the block. Execution then advances to steps 531 and 533, as described above.

In step 535, a test is performed to determine whether the tile is congruent with the block. The test is performed on the tile's shift, mask and merge parameters. When the test result is YES, execution advances to step 539, which will be described below. When the test result is NO, execution advances to step 541.

In step 541, the one of the processing modules 306 that will be used to generate the block is chosen. Step 541 is performed when the test performed in step 535 indicates that the tile that contributes to the block is not congruent with the block. However, since only one tile contributes to the block, the block can simply be generated by selecting the relevant portion of the tile. A block generated by selecting a portion of a tile can often be generated using the least processing resources by the processing module 306-4, which generates the block as a block of quantized DCT coefficients. However, factors, such as those listed above, may mean that the least processing resources are required when the block is generated by the processing module 306-3, which generates the block as a block of DCT coefficients, or even by the processing module 306-2, which generates the block as a block of YUV pixel values.

The processing performed in step 541 evaluates the factors described above with reference to FIG. 7B to select the one of the processing modules that requires the least processing resources to generate the block. Execution then advances to steps 531 and 533, as described above.

In step 539, the processing module 306-5 is chosen. The processing module 306-5 will be described below with reference to FIG. 8E, and generates the block as a set of non-zero DCT coefficients and runlengths. The processing module 306-5 generates the block using the least processing resources when the tile is congruent with the block. Execution then advances to steps 531 and 533, as described above.

In rare circumstances, the processing selection processing performed in steps 529, 537 and 541 may select the processing module 306-1 when it is determined that using this module will generate the block using the least processing resources. The processing module 306-1 will be described below with reference in FIG. 8A, and generates the block as a block of RGB pixel values.

After the processing selection module 304 has selected one of the processing modules 306 for processing one or more tiles to generate each block of the partially-coded block-based picture signal 121, and the processing selection has been stored in the block's entry in the block table 310, the controller 314 causes the block table to transfer each entry stored therein to the processing modules 306 and to the tile cache 308 via the bus 316. The entry for each block identifies the one or more tiles and the one of the processing modules that will be used to process the tiles, and includes the shift, mask and merge parameters that the processing module will apply to process each tile. Each of the tile identifiers included in the entry causes the tile cache to feed the corresponding tile to the processing modules 306. The processing selection included in the entry activates one of the processing modules 306 to decode the tile or tiles to the extent that allows the block-generating processing defined by the SMM parameters to be applied to them, and to apply to the tile or tiles the block-generating processing defined by the respective SMM parameters.

The one of the processing modules 306 activated by the processing selection processes each of the tiles received from the tile cache 308 by decoding the tiles to the extent that allows the block-generating processing to be applied to the tiles and by applying to each decoded tile the block-generating processing defined by the tile's SMM parameters to generate the block of the partially-coded block-based picture signal 121. As noted above, most of the processing modules apply the block-generating processing to the tiles with the tiles in a partially-coded state so that most of the blocks are generated in a corresponding partially-coded state.

Examples of embodiments of the processing modules 306 will now be described with reference to FIGS. 8A–8E and additionally with reference to FIG. 7B. The processing modules shown in FIGS. 8A–8D each generate a block BLK of the partially-coded block-based picture signal 121 by processing the tiles to apply any or all of translation, scaling and rotation operations, collectively a shifting operation, to the tiles. In addition, except when a single, fully-visible interior tile is congruent with the block, the processing modules shown in FIGS. 8A–8D additionally subject each individual tile to a masking operation to define the portion of the tile that contributes to the block. Moreover, except when the block is generated from a single tile, the processing modules perform a merge operation to merge the contributions of two or more tiles to generate the block. The processing module shown in FIG. 8E is used when a single, fully-visible interior tile contributes exclusively to the block and is spatially congruent with the block, as will be described in greater detail below.

Each of the processing modules 306-1 to 306-5 shown in FIGS. 8A–8E, respectively, includes the tile input 320 through which it receives the tile or tiles that contribute to the block, and also includes the SMM parameter input 326 through which it receives the shift, mask and merge parameters SMM for each of the identified tiles. Each of the tiles is identified, and its SMM parameters are included, in a record in the block's entry in the block table 310. Each of the processing modules 306-1 to 306-5 generates the block BLK of the block-based picture signal 121 from the tile or tiles it receives, and feeds the block to the partial re-encoder 106.

Each of the processing modules 306-1 to 306-4 shown in FIGS. 8A–8D, respectively, is composed of a number, n, of identical, parallel sub-modules, each of which processes one of the tiles that contributes to the block in response to the tile's SMM parameters to generate a respective block component. Each of the processing modules additionally includes a merge module that merges the block components generated by the sub-modules to generate the block BLK. The number of sub-modules in each processing module depends on a trade-off between speed and complexity/cost. When the number of tiles contributing to the block is not more than the number of parallel sub-modules, the block can be generated in a single pass. When the number of tiles exceeds the number of parallel sub-modules, at least one of the sub-modules must be re-used to process the remaining tiles. This increases the time required to generate the block. A typical value of n, the number of sub-modules in each processing module, is four, since four is the most likely number of tiles contributing to the block.

Figure 8A:
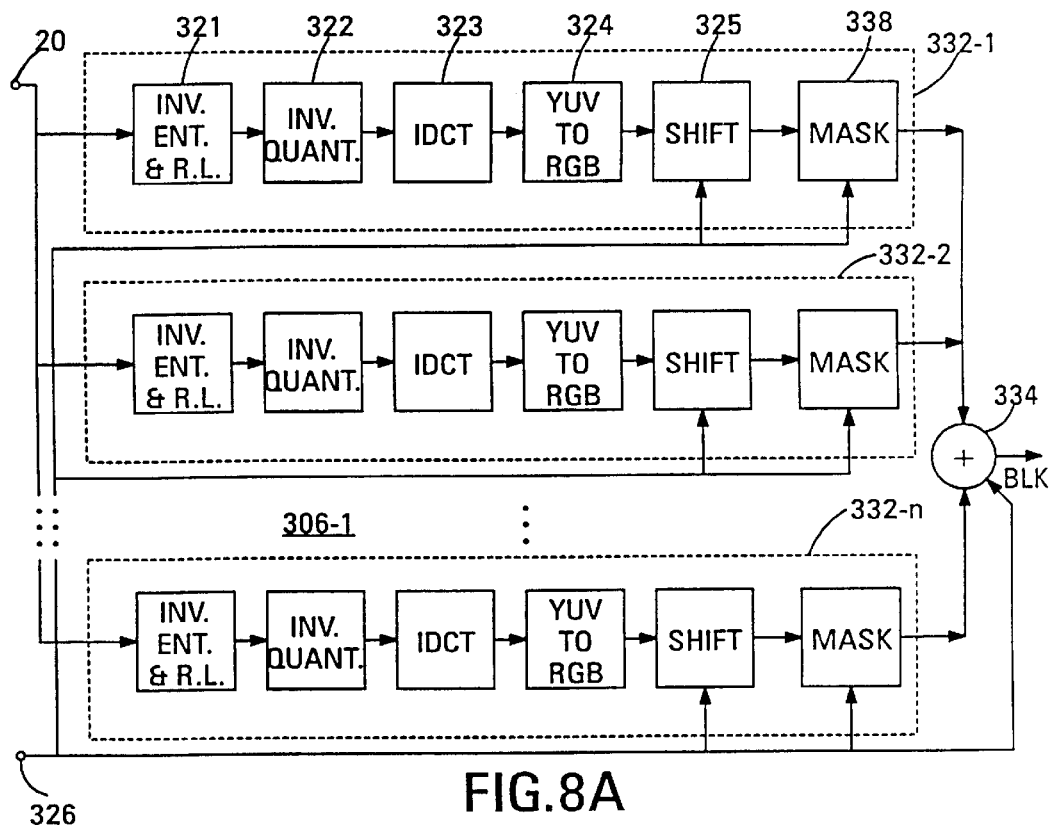
FIGS. 8A–8E are block diagrams showing examples of the processing modules of the first embodiment of the block-based picture composer of the first embodiment of the transcoder according to the invention and of the block-based picture composer of the second embodiment of the transcoder according to the invention.
Figure 8B:
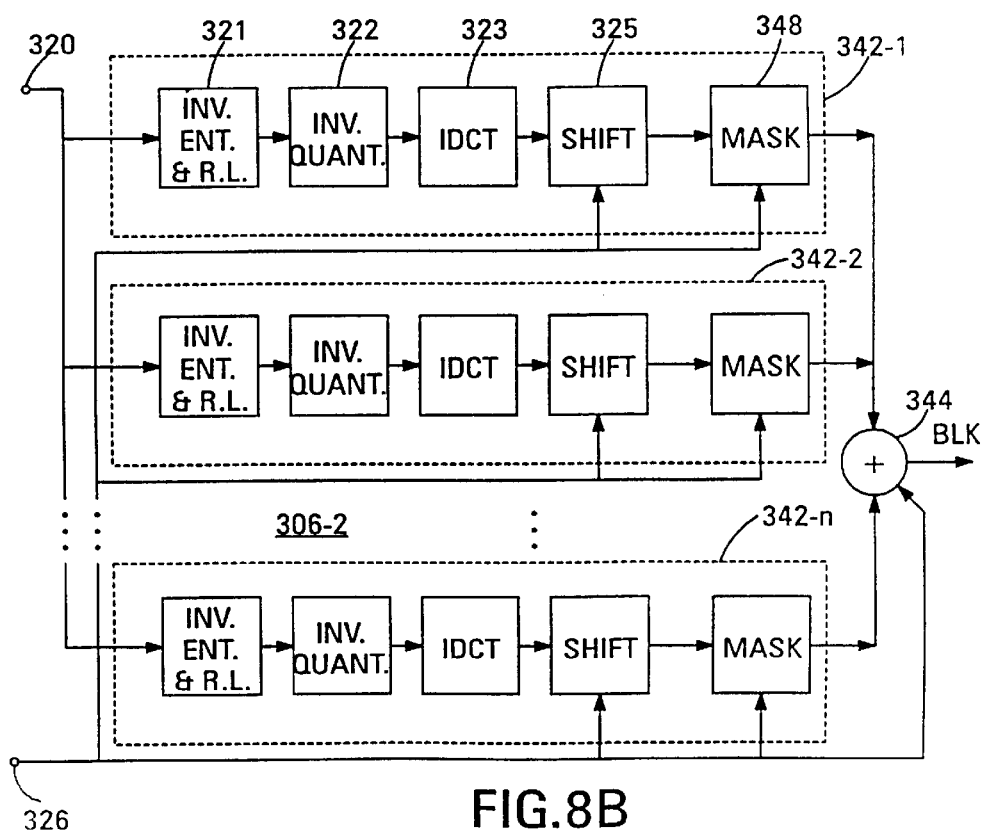
Figure 8C:
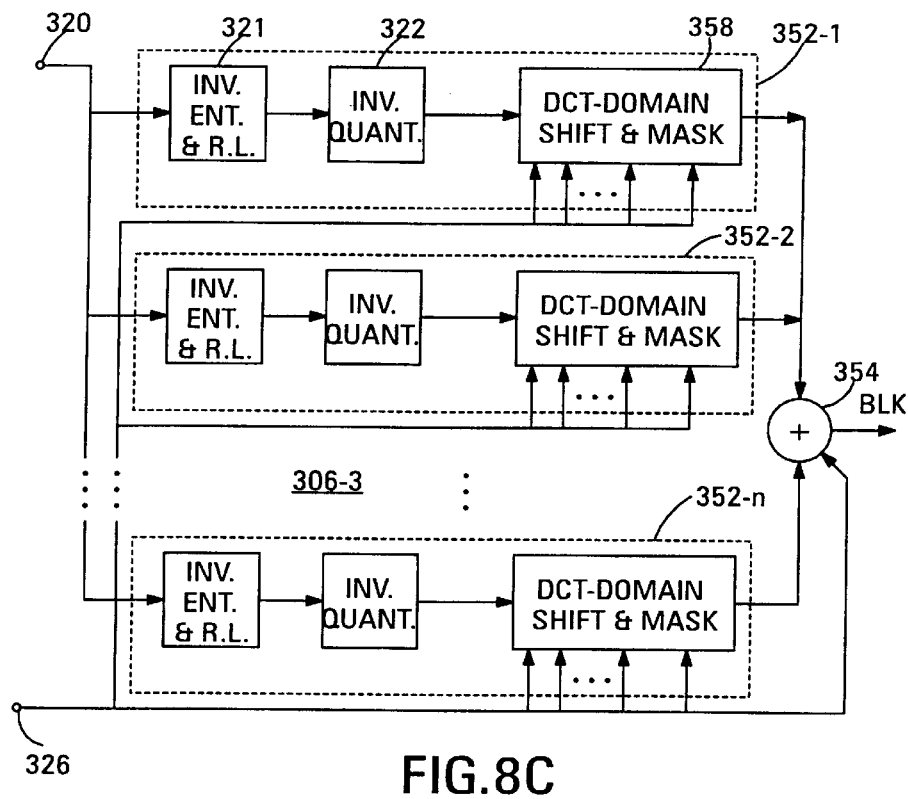
Figure 8D:
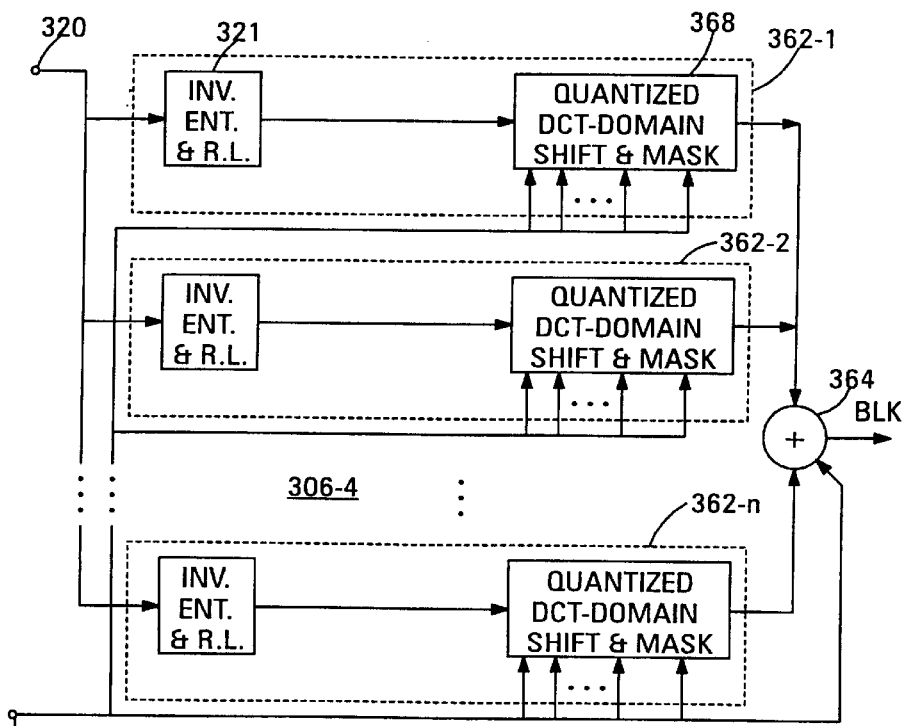
Figure 8E:
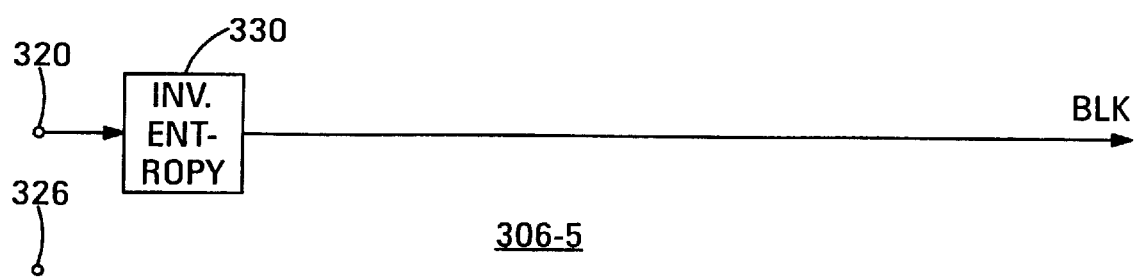

The processing module 306-5, shown in FIG. 8E, is composed of a single sub-module since it generates the block BLK by processing only a single tile. The other processing modules may process single or multiple tiles.

In the processing modules 306-1 to 306-4, each sub-module includes a tile input connected to the tile input 320 of the processing module and an SMM parameter input connected to the SMM parameter input 326 of the processing module. The processing module distributes each tile received at the tile input 320 and the tile's SMM parameters received at the SMM input 326 to the tile input and SMM parameter input, respectively, of a different one of the sub-modules, or of a subset of the sub-modules if fewer than n tiles contribute to the block.

The processing modules 306-1 to 306-5 differ in the extent to which they decode the tiles of the culled object-based picture signal before applying the shift, mask and merge parameters. The processing module 306-1 shown in FIG. 8A fully decodes the tiles to recover RGB pixel values, the processing module 306-2 shown in FIG. 8B partially decodes the tiles to recover full-resolution or sub-sampled YUV pixel values, the processing module 306-3 shown in FIG. 8C partially decodes the tiles to recover the DCT coefficients, the processing module 306-4 shown in FIG. 8D decodes the tiles to recover the quantized DCT coefficients and the processing module 306-5 shown in FIG. 8E minimally decodes the tiles to recover the non-zero quantized DCT coefficients and runlengths.

The processing module 306-1 shown in FIG. 8A fully decodes the coded DCT coefficients constituting each identified tile to recover the RGB pixel values, and applies RGB-domain block-generating processing to the RGB pixel values decoded from each tile in accordance with the tile's SMM parameters to generate a block of RGB pixel values as the block BLK. The processing module 306-1 is composed of a parallel arrangement of the sub-modules 332-1, 332-2, . . . 332-n, each of which, or a subset thereof, receives one of the tiles that contributes to the block. The outputs of the sub-modules are connected to the merge module 334, which generates the block BLK.

The sub-module 332-1 will now be described. The remaining sub-modules are identical and therefore will not be described. The sub-module 332-1 is composed of a serial arrangement of the inverse entropy and runlength coder 321, the inverse quantizer 322, the inverse discrete cosine transform (IDCT) processor 323, the YUV-to-RGB decoder 324, the RGB-domain shift module 325 and the RGB-domain mask module 328. The input of the inverse entropy and runlength coder receives the tile from the tile input 320. The inverse entropy and runlength coder, the inverse quantizer, the IDCT processor and the YUV-to-RGB decoder fully decode the tile to generate a tile of RGB pixel values.

The inverse entropy and runlength coder 321, the inverse quantizer 322 and the IDCT processor 323 are conventional and will not be described here. The YUV-to-RGB decoder 324 is also conventional, and may convert either full-resolution or subsampled YUV pixel values to RGB pixel values. As used in this disclosure, the term YUV-to-RGB decoder encompasses decoders that convert sub-sampled YUV pixel values to RGB pixel values in addition to those that convert full-resolution YUV pixel values to RGB pixel values.

The shift module 325 receives the tile of RGB pixel values generated by the YUV-to-RGB decoder 324, and additionally receives from the SMM parameter input 326 the shift parameters that form part of the tile's shift, mask and merge (SMM) parameters. The shift parameters define the amounts by which the shift module will translate, scale and rotate the tile of RGB pixel values. The shift module operates in the RGB-domain to translate, scale and rotate the tile of RGB pixel values in accordance with the tile's shift parameters to generate a shifted tile of RGB pixel values.

The mask module 338 receives the shifted tile of RGB pixel values from the shift module. 325, and additionally receives from the SMM parameter input 326 the mask parameters that form part of the tile's SMM parameters. The mask parameters define the portion of the shifted tile of RGB pixel values that contributes to the block BLK. The mask module operates in the RGB-domain to apply masking to the shifted tile of RGB pixel values in accordance with the tile's mask parameters to generate a block component composed of RGB pixel values. The block component is a block of RGB pixel values in which the pixel values are non-zero only in the region of the block in which the object to which the tile belongs is visible. The mask module feeds the block component generated from the tile to the merge module 334.

The merge module 334 receives the block components generated by those of the sub-modules 332-1 to 332-n that receive a tile and its SMM parameters. The merge module also receives from the SMM parameter input 326 the merge parameters, if any, that form part of the SMM parameters of the tiles that contribute to the block. The merge module merges the block components by adding corresponding pixel values. A block component derived from a tile that belongs to a transparent object and the block component of any object located behind the transparent object are multiplied by the transparent tile's merge parameters before the addition is performed. When none of the objects overlaying the block is transparent, the merge module can merge the block components simply by selecting pixel values. The merge module feeds the resulting complete block of RGB pixel values to the partial re-encoder 106 as the block BLK. The block BLK is in a fully-decoded state.

The processing module 306-2 shown in FIG. 8B partially decodes the coded DCT coefficients constituting each identified tile to recover the YUV pixel values, and applies YUV-domain block-generating processing to the YUV pixel values decoded from each tile in accordance with the tile's SMM parameters to generate a block of YUV pixel values as the block BLK. The processing module 306-2 is composed of a parallel arrangement of the sub-modules 342-1, 342-2, . . . 342-n, each of which, or a subset of which, receives one of the tiles that contributes to the block. The outputs of the sub-modules are connected to the merge module 344, which generates a block of full-resolution or sub-sampled YUV pixel values as the block BLK.

The sub-module 342-1 will now be described. The remaining sub-modules are identical and therefore will not be described. The sub-module 342-1 is composed of a serial arrangement of the inverse entropy and runlength coder 321, the inverse quantizer 322, the inverse discrete cosine transform (IDCT) processor 323, the YUV-domain shift module 327 and the YUV-domain mask module 348. The input of the inverse entropy and runlength coder receives the tile from the tile input 320. The inverse entropy and runlength coder, the inverse quantizer and the IDCT processor partially decode the tile to generate a tile of YUV pixel values. The YUV pixel values may be full-resolution or sub-sampled YUV pixel values. The inverse entropy and runlength coder, the inverse quantizer and the IDCT processor are conventional and will not be described further.

The shift module 327 operates in the full-resolution or sub-sampled YUV domain. Operating in the sub-sampled YUV domain is preferred because it requires fewer computational resources and less memory. It requires fewer computational resources since it does not perform the upsampling processing that would be required to convert the sub-sampled YUV pixel values to full-resolution YUV pixel values. In addition, sub-sampled YUW pixel values require less memory than full-resolution YUV pixel values. The shift module receives the tile of YUV pixel values generated by the IDCT processor 323, and also receives from the SMM parameter input 326 the shift parameters that form part of the tile's shift, mask and merge parameters SMM. The shift module operates in the YUV-domain to translate, scale and rotate the tile of YUV pixel values in accordance with the tile's shift parameters to generate a shifted tile of YUV pixel values.

The mask module 348 receives the shifted tile of YUV pixel values from the shift module 327, and additionally receives from the SMM parameter input 326 the mask parameters that form part of the tile's SMM parameters. The mask parameters define the portion of the shifted tile of YIN pixel values that contributes to the block BLK. The mask module operates in the YUV-domain to apply masking to the shifted tile of YIV pixel values in accordance with the tile's mask parameters to generate a block component composed of YIV pixel values. The mask module feeds the block component generated from the tile to the merge module 344.

The merge module 344 receives the block components generated by those of the sub-modules 342-1 to 342-n that receive a tile and its SMM parameters. The merge module also receives from the SMM parameter input 326 the merge parameters, if any, that form part of the SMM parameters of the tiles that contribute to the block. The merge module operates in the YUV domain in response to the merge parameters to merge the block components to form a complete block of YUV pixel values as the block BLK.

Since the processing module 306-2 only partially decodes the tiles to generate the block of YUV pixel values as the block BLK, it is simpler than the processing module 306-1.

The processing module 306-3 shown in FIG. 8C partially decodes the coded DCT coefficients constituting each identified tile to recover the DCT coefficients, and applies DCT-domain block-generating processing to the DCT coefficients of each tile in accordance with the tile's SMM parameters to generate a block of DCT coefficients as the block BLK. The processing module 306-3 is composed of a parallel arrangement of the sub-modules 352-1, 352-2 . . . 352-n, each of which, or a subset of which, receives one of the tiles that contributes to the block. The outputs of the sub-modules are connected to the merge module 354, which operates in the DCT domain to generate the block BLK.

The sub-module 352-1 will now be described. The remaining sub-modules are identical and therefore will not be described. The sub-module 352-1 is composed of a serial arrangement of the inverse entropy and runlength coder 321, the inverse quantizer 322 and the DCT-domain shift and mask module 358. The input of the inverse entropy and runlength coder receives the tile from the tile input 320. The inverse entropy and runlength coder and the inverse quantizer partially decode the tile to generate a tile of DCT coefficients. The inverse entropy and runlength coder and the inverse quantizer are conventional and will not be described further.

The DCT-domain shift and mask module 358 operates in the DCT domain to translate, scale, rotate and mask the tile of DCT coefficients in accordance with the shift and mask parameters to generate a block component composed of DCT coefficients. The shift and mask parameters constitute part of the tile's SMM parameters. The DCT-domain shift and mask module may perform the processing described by N. Merhav and B. Vasudev in *Fast Algorithms for DCT-Domain Image Down Sampling and for Inverse Motion Compensation*, 7 IEEE Trans. on Circuits and Systems for Video Technology, 468–475 (1997 June) or that described by B. Shen, I. Sethi and B. Vasudev in *DCT Convolution for Alpha Blending in the Compressed Domain*, IEEE Trans. on Circuits and Systems for Video Technology, to appear (1999), for example. The mask module feeds the block component generated from the tile to the merge module 354.

The merge module 354 receives the block components generated by those of the sub-modules 352-1 to 352-n that receive a tile and its SMM parameters. The merge module also receives from the SMM parameter input 326 the merge parameters, if any, that constitute part of the SMM parameters of the tiles that contribute to the block. The merge module operates in the DCT domain in response to the merge parameters to merge the block components to form a complete block of DCT coefficients as the block BLK.

Since the processing module 306-3 only partially decodes the tiles to generate the block of DCT coefficients as the block BLK, it is substantially simpler than the processing module 306-1.

The processing module 306-4 shown in FIG. 8D partially decodes the coded DCT coefficients constituting each identified tile to recover quantized DCT coefficients, and applies quantized DCT-domain block-generating processing to the quantized DCT coefficients of each tile in accordance with the tile's SMM parameters to generate a block of quantized DCT coefficients as the block BLK. The processing module 306-4 is composed of a parallel arrangement of the sub-modules 362-1, 362-2 . . . 362-n, each of which, or a subset of which, receives one of the tiles that contributes to the block. The outputs of the sub-modules are connected to the merge module 364, which operates in the quantized DCT domain to generate the block BLK.

The sub-module 362-1 will now be described. The remaining sub-modules are identical and therefore will not be described. The sub-module 362-1 is composed of a serial arrangement of the inverse entropy and runlength coder 321 and the DCT-domain shift and mask module 368. The input of the inverse entropy and runlength coder receives the tile from the tile input 320. The inverse entropy and runlength coder minimally decodes the tile to generate a tile of quantized DCT coefficients. The inverse entropy and runlength coder is conventional and will not be described further.

The quantized DCT-domain shift and mask module 368 operates in the quantized DCT domain to translate, scale, rotate and mask the tile of quantized DCT coefficients in accordance with the shift and mask parameters to generate a block component composed of quantized DCT coefficients. The shift and mask parameters constitute part of the tile's SMM parameters. The quantized DCT-domain shift and mask module may perform the processing described by N. Merhav and B. Vasudev in *Fast Algorithms for DCT-Domain Image Down Sampling and for Inverse Motion Compensation*, 7 IEEE Trans. on Circuits and Systems for Video Technology 468–475 (1997 June), for example, where the processing is modified to account for the quantized DCT coefficients by, for example, appropriately scaling each quantized DCT coefficient to compensate for the quantization scaling. The mask module feeds the block component generated from the tile to the merge module 364.

The merge module 364 receives the block components generated by those of the sub-modules 362-1 to 362-n that receive a tile and its SMM parameters. The merge module also receives from the SMM parameter input 326 the merge parameters, if any, that constitute part of the SMM parameters of the tiles that contribute to the block. The merge module operates in the quantized DCT domain,-in response to the merge parameters to merge the block components to form a complete block of quantized DCT coefficients as the block BLK.

Since the processing module 306-4 minimally decodes the tile to generate a block of quantized DCT coefficients as the block BLK, it is substantially simpler than the processing module 306-1.

The processing module 306-5 shown in FIG. 8E minimally decodes the coded DCT coefficients constituting the single identified tile to recover non-zero quantized DCT coefficients and runlengths as the block BLK. The processing module 306-5 operates only when the tile is spatially congruent with the block BLK, and therefore receives null shift, mask and merge parameters SMM at its SMM parameter input 326. The processing module 306-5 is composed of the inverse entropy coder 330, which receives the tile from the tile input 320. The inverse entry coder is conventional and will not be described further.

Since the processing module 306-5 minimally decodes the tile and applies no block-generating processing to the tile to generate non-zero quantized DCT coefficients and runlengths as the block BLK, it is substantially simpler than the processing module 306-1.

The block-based picture composer 105 may additionally or alternatively include a processing module that is a simplified version of the processing module 306-3 shown in FIG. 5C. This processing module operates in the DCT domain. Such a processing module extracts the DC coefficient and the quantizing parameters from each tile instead of inversely quantizing all of the DCT coefficients. As further additions or alternatives, the block-based picture composer could include processing modules that apply the block-generating processing to the tiles in other partially-decoded states. For example, such processing modules could apply the block-generating processing to the tile in its run-length coded state.

The processing modules 306 in the block-based picture composer 105 may additionally include caching arrangements that store fully- or partially-decoded tiles before the shift, mask and merge-processing is applied. This reduces the processing required in instances in which the tile additionally contributes to a block that is generated after the block for which the tile was first fully or partially decoded. Caching the fully- or partly-decoded tile eliminates the need to decode the tile again. However, some additional encoding or decoding may have to be applied to the cached decoded tile to change its coding state if the processing selection module 304 determines that the later-generated block is to be generated in a different coding state from that of the cached decoded tile.

Figure 9A:
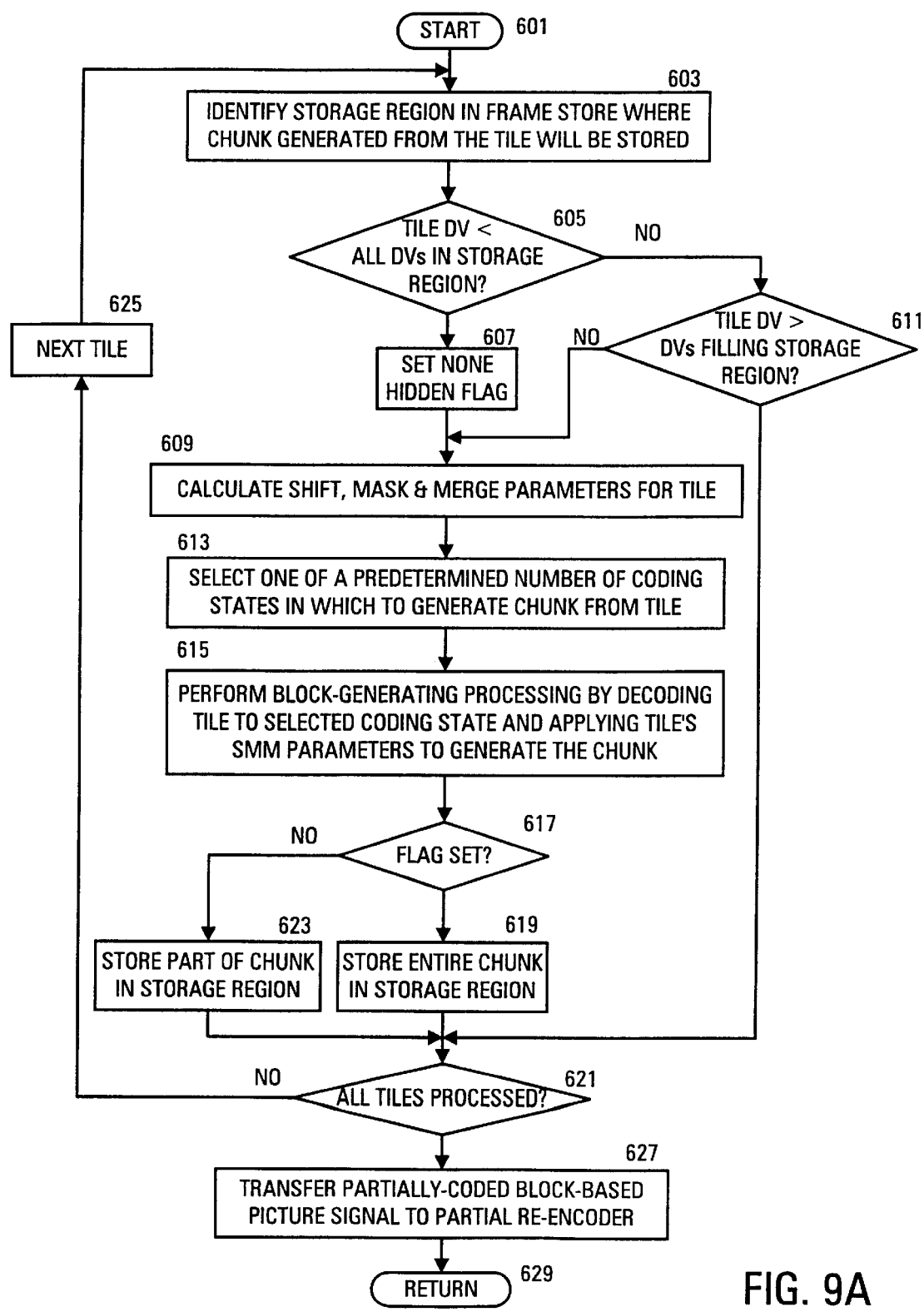
FIG. 9A is a flow chart illustrating the processing performed by a second embodiment of the block-based picture composer of the first embodiment of the transcoder according to the invention.

FIG. 9A is a flow chart that illustrates a second embodiment of the tile-oriented processing performed by the block-based picture composer 105. Unlike the first embodiment of the tile-oriented processing described above with reference to FIG. 7A, the tile-oriented processing shown in FIG. 9A operates in a "decode as you go" mode. The flow chart illustrates the operations performed to process each tile of the culled object-based picture signal 111 to generate from the tile a portion of the partially-coded block-based picture signal 121. The portion of the partially-coded block-based picture signal generated from one tile will be called a chunk of the partially-coded block-based picture signal. Each chunk represents a spatial region of the picture. Occasionally, the chunk generated from one tile will coincide with one block of the partially-coded block-based picture signal. More often, the chunk will constitute part of one block, more than one block, or parts of more than one block of the partially-coded block-based picture signal. For example, the chunks generated from many of the tiles will constitute parts of four blocks.

The processing shown in FIG. 9A is performed on the tiles of the culled object-based picture signal to generate respective chunks that collectively constitute the partially-coded block-based picture signal. Since the chunks generated from the tiles of the culled object-based picture signal rarely coincide with the blocks of the partially-coded block-based picture signal, the chunks are stored in a frame store as they are generated. When all the tiles of the culled object-based picture signal have been processed, the complete partially-coded block-based picture signal is read out of the frame store block-by-block.

Execution starts in step 601.

In step 603, the region of the frame store is identified in which can be stored the chunk of the block-based picture signal that will be generated from the tile of the culled object-based picture signal. Execution then advances to step 605.

In step 605, a test is performed to determine whether the distance value of the tile is less than the distance value of all previously-generated chunks stored at least in part in at least part of the identified storage region. A previously-generated chunk is a chunk generated from a tile processed in an earlier iteration of the process shown in FIG. 9A. The depth value of a chunk is the same as the tile from which it is generated and may be determined from the portion of the scene descriptor SDI that relates to the object to which the tile belongs. A YES result indicates that none of the chunk that will be generated from the tile would be hidden by any previously-generated chunk.

When the test result in step 605 is YES, execution advances to step 607, where a flag is set to indicate that none of the tile is hidden. Execution then advances to step 609, which will be described below.

When the test result in step 605 is NO, execution advances to step 611, where a test is performed to determine whether distance values exist for all locations in the identified storage region of the frame store and, if so, whether the distance value of the tile is greater than all of the distance values. A YES result indicates that one or more previously-generated chunks completely occupy the identified storage region and would completely hide the chunk generated from the tile. A NO result indicates that part of the chunk generated from the tile is hidden by the one or more previously-generated chunk.

When the test result in step 611 is YES, and the chunk generated from the tile would be completely hidden, execution advances to step 621. This saves processing resources by not decoding the tile. Step 621 will be described below. When the test result is NO, execution advances to step 609, which will be described next.

In step 609, the shift, mask and merge (SMM) parameters are calculated for the tile. The SMM parameters define the block-generating processing that will be applied to the tile to generate the chunk of the block-based picture signal. Execution then advances to step 613.

In step 613, one of a number of different coding states is selected in which to generate the chunk from the tile. The coding state selected is that which decodes the tile only to the extent that allows the block-generating processing defined by the SMM parameters to be applied to the tile. Execution then advances to step 615.

In step 615, the block-generating processing is performed by decoding the tile to the selected coding state and applying the tile's SMM parameters to generate the chunk. The chunk is generated in the selected coding state. The coding state of the chunk may differ from that of others of the chunks of the partially-coded block-based picture signal. Execution then advances to step 617.

In step 617, a test is performed to determine whether the "none hidden" flag was set before the chunk was generated in step 615. A YES result indicates that none of the chunk is hidden by a previously-generated chunk. When the test result is YESJ execution advances to step 619, where the entire chunk is stored in the identified storage region of the frame store. Execution then advances to step 621, which will be described below. When the test result is NO, execution advances to step 623, where the portion of the chunk that is not hidden by a previously-generated chunk is stored in the corresponding part of the identified storage region of the frame store. When chunks from more than one tile are stored in different parts of the same storage region, this effectively merges the contributions of the tiles to the partially-coded block-based picture signal. The chunk is stored in such parts of the identified storage region that are not occupied by one or more previously-generated chunks or parts thereof having a smaller depth value than the chunk. Execution then advances to step 621.

In step 621, a test is performed to determine whether all of the tiles of the culled object-based picture signal 111 have been processed and the partially-coded block-based picture signal 121 has therefore been completely generated. When the test result is NO, execution returns to step 603 via step 625, which causes the next iteration of the process shown in FIG. 9A to be performed on the next tile of the culled object-based picture signal 111. When the test result is YES, execution advances to step 627, where the partially-coded block-based picture signal 121 is transferred block-by-block from the frame store to the partial re-encoder 106. Execution then advances to step 629, whence it returns to the main routine.

An exemplary second embodiment 700 of the block-based picture composer 105 will now be described with reference to the block diagram shown in FIG. 9B. This embodiment performs the processing described above with reference to FIG. 9A.

The block-based picture composer 700 includes the picture composition module 701, the shift, mask and merge parameter module 702, the processing selection module 704, the processing modules 706, the frame store 708, and the depth test module 710. Exemplary processing modules 706-1, 706-2 and 706-n are shown. The block-based picture composer may incorporate fewer or more processing modules than the number shown. The decoding states to which the processing modules decode the tiles of the culled object-based picture signal before applying the block-generating processing defined by the shift, mask and merge parameters differs among the processing modules. The block-based picture composer is controlled by the controller 714, which may be shared with the other modules of the transcoder 100. The bus 716 interconnects the controller and the modules so that data and commands can pass among the modules and between the controller and the modules.

In the block-based picture composer 105, the picture composition module 701 receives the culled object-based picture signal 111 from the culling module 101. The culled object-based picture signal includes the visibility table VIS, the scene descriptor SDI and the shape descriptors SHA and culled amplitude descriptors CAD of the objects present in the picture. The picture composition module 701 operates on each tile of the culled object-based picture signal to identify the chunk of the partially-coded block-based picture signal 121 that will be generated from the tile. This also identifies the region of the picture represented by the chunk, and, hence, the storage region of the frame store 708 in which the chunk may be stored. The picture composition module identifies the region of the picture represented by the chunk that will be generated from the tile by examining the scene descriptor SDI and the shape descriptor SHA of the object to which the tile belongs, as described above with reference to FIG. 7B. The picture composition module also determines the depth value of the tile from the portion of the scene descriptor relating to the object to which the tile belongs.

The picture composition module 701 forwards the storage region identification for the tile to the shift, mask and merge parameter module 702 and the processing selection module 704 via the bus 716, and to the frame store 708. The picture composition module also forwards the depth value for the tile to the depth test module 710. Finally, the picture composition module forwards the tile to the processing selection module 704 and the processing modules 706.

The storage region identification generated by the picture composition module 701 identifies the storage region of the frame store 708 where the chunk generated from the tile may be stored. The identified storage region may already be occupied, at least in part, by one or more previously-generated chunks. A previously-generated chunk is a chunk or part of a chunk generated from a tile previously processed by the processing modules 706. The storage region additionally stores, or has linked to it, the depth value of the tile from which was generated each previously-generated chunk stored therein. Alternatively, the storage region may store, or have linked to it, a depth value for each pixel in the storage region. The depth values are initialized to a maximum value.

In response to the storage region identification, the frame store 708 transfers all depth values relating to the identified storage region to the depth test module 710. If more than one previously-generated chunk is stored at least in part in the storage region, a depth value for each previously-generated chunk and an indication of the portion of the storage region occupied by the previously-generated chunk is transferred to the depth test module. The depth test module 710 compares the depth value of the tile with the depth values, if any, received from the frame store 708.

When the depth value of the tile is less than any of the depth values received from the frame store, the depth test module 710 sets an "all visible" flag that indicates that the chunk that will be generated from the tile is completely visible. This means that the entire chunk can be stored in the identified storage region.

When the storage region is completely occupied by a previously-generated chunk having a depth value less than the current block or by parts of a number of previously-generated chunks all having depth values less than the tile, the chunk that would be generated from the tile would be completely hidden by the previously-generated chunk or chunks. In this case, the depth test module 710 causes the controller 714 to inhibit further processing of the tile by the shift, mask and merge module 702, the processing selection module 704 and the processing modules 706, to be described below, and causes the picture composition module 701 to process the next tile.

When the storage region is partly occupied by one or more previously-generated chunks, and one or more of the previously-generated chunks has a depth value less than the tile, the depth test module 710 calculates the portion of the chunk that is not hidden by a previously-generated chunk. This portion of the chunk will be stored in the identified region of the frame store after the chunk is generated. Data indicating the portion is temporarily stored for use later.

The shift, mask and merge module 702 receives the storage region identification for the tile from the picture composition module 701 via the bus 716, and additionally receives the visibility table VIS, the scene descriptor SDI and the shape descriptors SHA for the objects present in the picture. The shift, mask and merge module uses the scene descriptor and the shape descriptor of the object to which the tile belongs to calculate the shift, mask and merge (SMM) parameters that define the shifting, masking and merging operations to be applied to the tile to generate the chunk. The shift, mask and merge module calculates the SMM parameters in a manner similar to that described above with reference to FIG. 7B. The shift, mask and merge module forwards the SMM parameters for the tile to the processing selection module 704 via the bus 716, and additionally forwards the SMM parameters for the tile to the processing modules 706.

The processing selection module 704 receives storage region identification and the SMM parameters via the bus 716 and additionally receives the tile from the picture composition module 701 and receives the scene descriptor SDI and the shape descriptors SHA for all the objects present in the picture. The processing selection module selects one of the processing modules 706 to process the tile to generate the chunk of the partially-coded block-based picture signal 121. In selecting one of the available processing modules, the processing selection module may take all or some of the factors described above with reference to FIG. 7B into account. The processing selection indicates the one of the processing modules 706 that is to be used to process the tile to generate the respective chunk. The processing selection, by identifying the processing module, also indicates the coding state to which the selected processing module will decode the tile prior to performing the block-generating processing that generates the chunk.

Figure 9C:
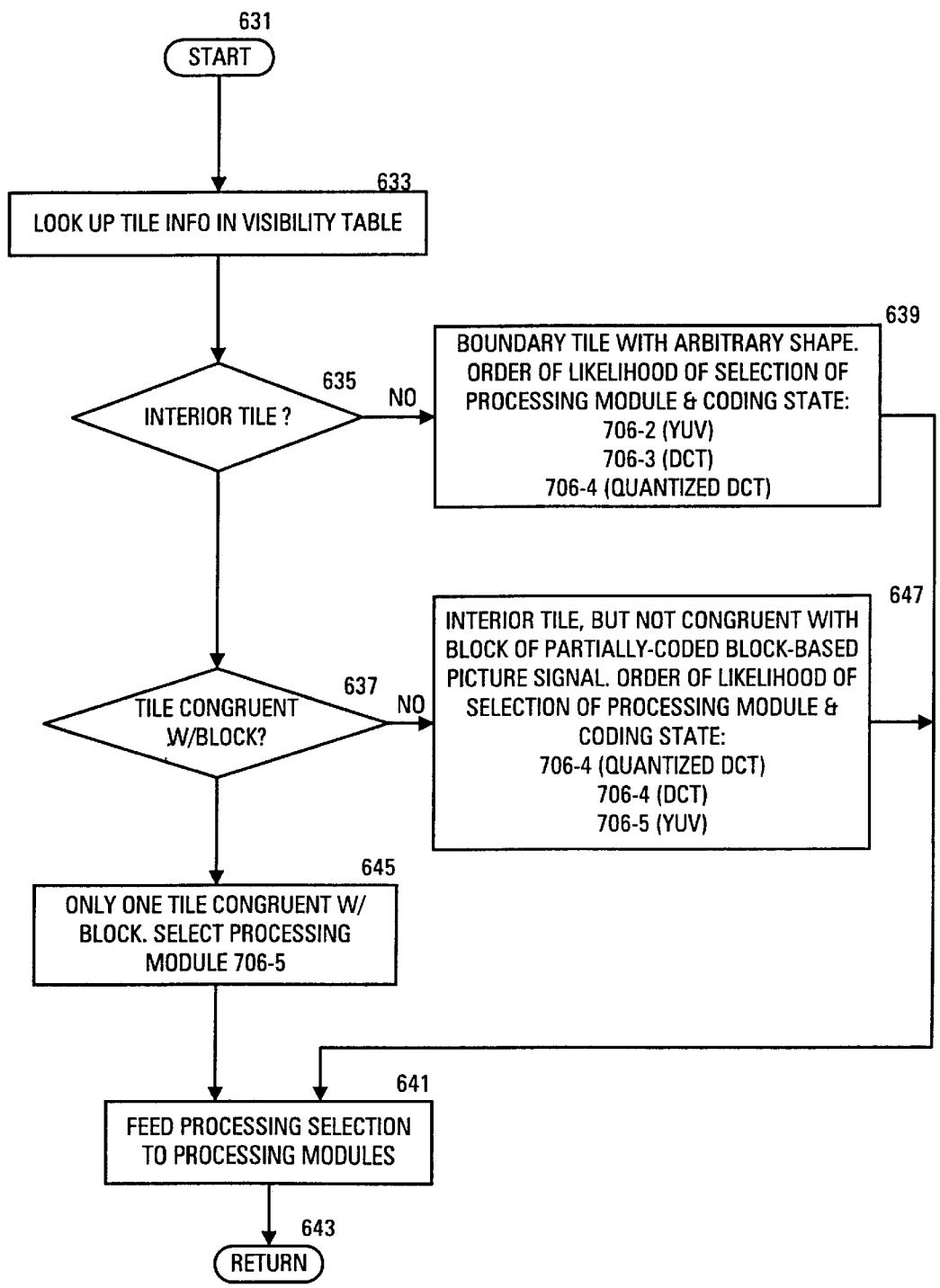
FIG. 9C is a flow chart illustrating part of the processing performed by the processing selection module of the second embodiment of the block-based picture composer shown in FIG. 9B.

FIG. 9C shows an example of the basic selection processing performed for the tile by the processing selection module 704. The basic selection processing selects the one of the processing modules 706 that will be used to process the tile to generate the respective chunk.

Processing starts at step 631. In step 633, the entry for the tile in the visibility table VIS is read to gather the information that will be used in part to make the processing selection.

In step 635, a test is performed on the tile's entry in the visibility table to determine whether the tile is an interior tile. When the test result is YES, execution advances to step 637, which will be described below. When the test result is NO, execution advances to step 639.

In step 639, the one of the processing modules 706 that will be used to process the tile to generate the respective chunk is chosen. Step 639 is performed when the test performed in step 633 indicates that the tile is not an interior tile, and is therefore a boundary tile. A boundary tile generally has an arbitrary boundary shape. Processing a tile having an arbitrary boundary shape is most likely to be achieved using the processing module 706-2. The processing module 706-2 will be described below with reference in FIG. 10B, and generates the chunk as a chunk of YUV pixel values. However, the tile may have a regular boundary shape, or may be sparse, or other factors, such as those described above with reference to FIG. 7B, may enable the chunk to be generated using fewer processing resources by the processing module 706-3, or even by the processing module 706-4. The processing module 706-3 will be described below with reference to FIG. 10C and generates the chunk as a chunk of DCT coefficients. The processing module 706-4 will be described below with reference to FIG. 10D and generates the chunk as a chunk of quantized DCT coefficients.

The processing performed in step 639 evaluates the above-mentioned factors to select the one of the processing modules that requires the least processing resources to process the tile. Execution then advances to step 641, where the processing selection fed to the processing modules 706, and then to step 643, whence it returns to the main routine.

In step 637, a test is performed to determine whether the tile is congruent with a block of the partially-coded block-based picture signal. This test may be performed on the tile's shift, mask and merge parameters, for example. When the test result is YES, execution advances to step 645, which will be described below. When the test result is NO, execution advances to step 647.

In step 647, the one of the processing modules 706 that will be used to generate the chunk is chosen. Step 647 is performed when the test performed in step 637 indicates that the tile is an interior tile, but is not congruent with a block of the partially-coded block-based picture signal. The tile can therefore be processed to generate the chunk using the least processing resources by the processing module 706-4, which generates the block as a block of quantized DCT coefficients. However, factors, such as those described above with reference to FIG. 7B, may mean that the least processing resources are required when the tile is processed by the processing module 706-3, which generates the chunk as a block of DCT coefficients, or even by the processing module 306-2, which generates the chunk as a block of YUV pixel values.

The processing performed in step 647 evaluates the factors described above with reference to FIG. 7B to select the one of the processing modules that requires the least processing resources to generate the chunk. Execution then advances to steps 641 and 643, as described above.

In step 641, the processing module 706-5 is chosen when the tile is congruent with a block of the partially-coded block-based picture signal. The processing module 706-5 will be described below with reference to FIG. 10E, and generates the block as a set of non-zero DCT coefficients and runlengths. Execution then advances to steps 641 and 643, as described above.

The processing selection fed by the processing selection module 704 to the processing modules 706 activates the one of the processing modules 706 to process the tile to generate the identified chunk of the partially-coded block-based picture signal 121. The activated one of the processing modules 706 decodes the tile to the extent that allows the processing defined by the SMM parameters to be applied to it, and applies the processing defined by the SMM parameters. As noted above, most of the processing modules apply the processing to the tile with the tile in a partially-coded state so that most of the chunks are generated in a corresponding partially-coded state.

In certain circumstances, the processing selection operations 639, 645 and 647 may choose the processing modules 706 such that all chunks that contribute to a single block of the partially-coded block-based picture signal are decoded to a common decoding state. Having all the chunks in the same decoding state makes it easy to read the partially-coded block-based picture signal out from the frame store.

In rare circumstances, the processing selection processing performed in steps 631 and 647 may select the processing module 706-1 when it is determined that using this module will generate the chunk using the least processing resources. The processing module 706-1 will be described below with reference-in FIG. 10A, and generates the chunk as a chunk of RGB pixel values.

Examples of embodiments of the processing modules 706 will now be described with reference to FIGS. 10A–10E and additionally with reference to FIG. 9B. The processing modules shown in FIGS. 10A–10D each process a tile of the culled object-based picture signal to generate the respective chunk CHK of the partially-coded block-based picture signal 121. The processing modules apply any or all of translation, scaling and rotation operations, collectively a shifting operation, to the tile. In addition, when the tile is a boundary tile, the processing modules shown in FIGS. 10A–10D additionally subject the block to a masking operation to define the portion of the chunk to which the tile contributes. The processing module shown in FIG. 10E is used when a single, fully-visible interior tile contributes exclusively to a block of the partially-coded block-based picture signal and the tile is spatially congruent with the block, as will be described in greater detail below.

Each of the processing modules 706-1 to 706-5 shown in FIGS. 10A–10E, respectively, includes the tile input 320, through which it receives the tile, and the SMM parameter input 326 through which it receives the tile's shift, mask and merge parameters SMM. Each of the processing modules 706-1 to 706-5 generates the chunk CHK of the block-based picture signal 121 from the tile it receives.

The processing modules 706-1 to 706-5 differ in the extent to which they decode the tile of the culled object-based picture signal before applying the shift, mask and merge parameters. The processing module 307-1 shown in FIG. 10A fully decodes the tiles to recover RGB pixel values, the processing module 706-2 shown in FIG. 10B partially decodes the tiles to recover full-resolution or sub-sampled YUV pixel values, the processing module 706-3 shown in FIG. 10C partially decodes the tiles to recover the DCT coefficients, the processing module 706-4 shown in FIG. 10D decodes the tiles to recover the quantized DCT coefficients and the processing module 706-5 shown in FIG. 10E minimally decodes the tiles to recover the non-zero quantized DCT coefficients and runlengths.

Figure 10A:
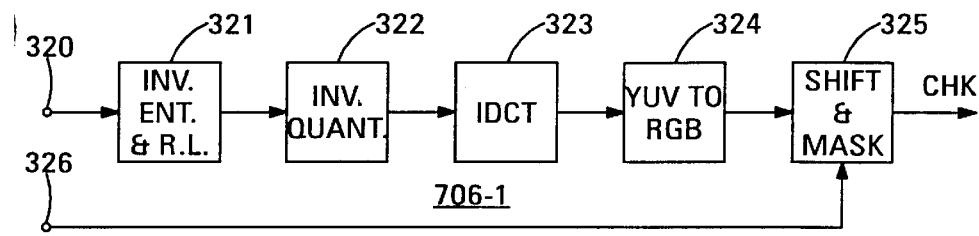
FIGS. 10A–10E are block diagrams showing examples of the processing modules of the second embodiment of the block-based picture composer of the first embodiment of the transcoder according to the invention.

The processing module 706-1 shown in FIG. 10A fully decodes the coded DCT coefficients constituting the tile to recover the RGB pixel values, and applies RGB-domain block-generating processing to the RGB pixel values in accordance with the tile's SMM parameters to generate RGB pixel values as the chunk CHK. The processing module 706-1 is identical to the sub-module 332-1 described above with reference to FIG. 8A, and will not be further described.

Figure 10B:
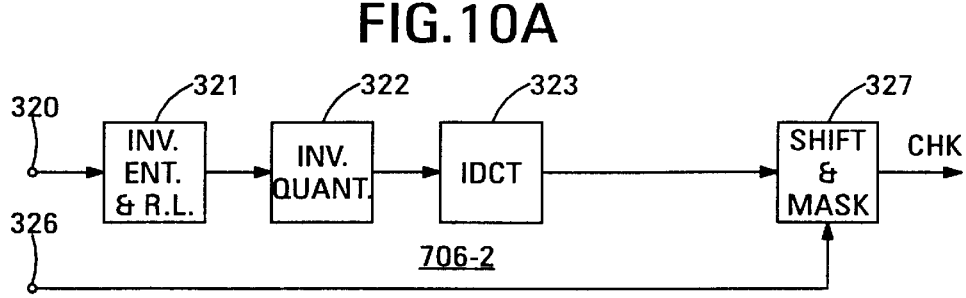

The processing module 706-2 shown in FIG. 10B partially decodes the coded DCT coefficients constituting the tile to recover the YUV pixel values, and applies YUV-domain block-generating processing to the YUV pixel values in accordance with the tile's SMM parameters to generate YUV pixel values as the chunk CHK. The processing module 306-2 is identical to the sub-module 342-1 described above with reference to FIG. 8B, and will not be further described. Since the processing module 706-2 only partially decodes the tile to generate the YUV pixel values as the chunk CHK, it is simpler than the processing module 706-1.

Figure 10C:
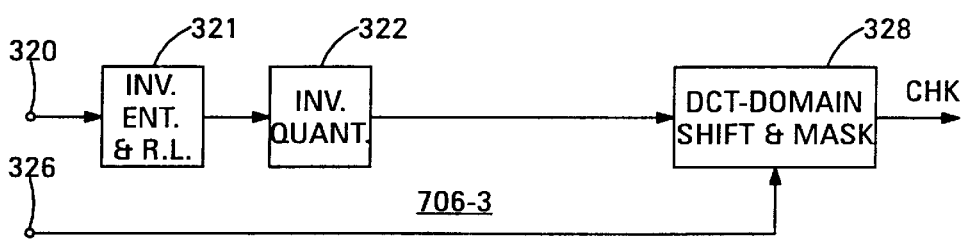

The processing module 706-3 shown in FIG. 10C partially decodes the coded DCT coefficients constituting the tile to recover the DCT coefficients, and applies DCT-domain block-generating processing to the DCT coefficients in accordance with the tile's SMM parameters to generate DCT coefficients as the chunk CHK. The processing module 706-3 is identical to the sub-module 352-1 described above with reference to FIG. 8C, and will therefore not be described further. Since the processing module 706-3 only partially decodes the tile to generate the DCT coefficients as the chunk CHK, it is substantially simpler than the processing module 706-1.

Figure 10D:
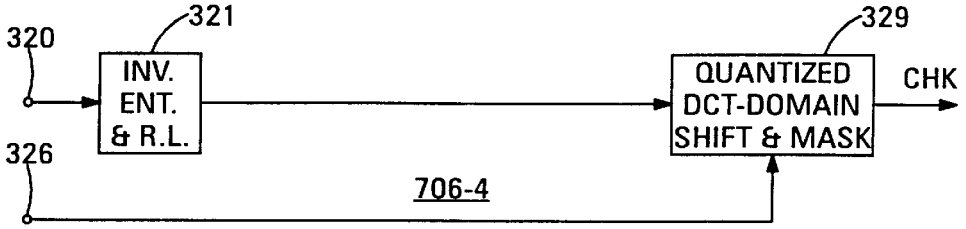
Figure 10E:
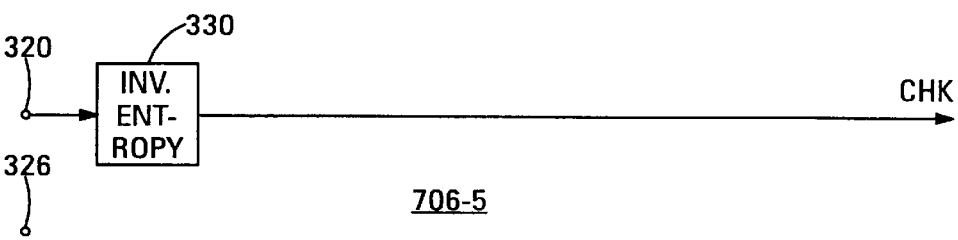

The processing module 706-4 shown in FIG. 10D partially decodes the coded DCT coefficients constituting the tile to recover quantized DCT coefficients, and applies quantized DCT-domain block-generating processing to the quantized DCT coefficients in accordance with the tile's SMM parameters to generate quantized DCT coefficients as the chunk CHK. The processing module 706-4 is identical to the sub-module 362-1 described above with reference to FIG. 8D, and will therefore not be described further. Since the processing module 706-4 minimally decodes the tile to generate quantized DCT coefficients as the chunk CHK, it is substantially simpler than the processing module 706-1.

The processing module 706-5 shown in FIG. 10E minimally decodes the coded DCT coefficients constituting the tile to recover non-zero quantized DCT coefficients and run-lengths as the chunk CHK. The processing module 706-5 operates only when the tile is spatially congruent with a block of the partially-coded block-based picture signal, and therefore receives null shift, mask and merge parameters SMM at its SMM parameter input 326. The processing module 706-5 is identical to the processing module 306-5 described above with reference to FIG. 8E, and will therefore not be described further. Since the processing module 706-5 minimally decodes the tile and applies processing to the tile to generate non-zero quantized DCT coefficients and runlengths as the chunk CHK, it is substantially simpler than the processing module 706-1.

The block-based picture composer 105 may additionally or alternatively include a processing module that is a simplified version of the processing module 706-3 shown in FIG. 10C. This processing module operates in the DCT domain. Such a processing module extracts the DC coefficient, quantizing parameters and possibly a subset of the AC coefficients from the tile instead of inversely quantizing all of the DCT coefficients. As further additions or alternatives, the block-based picture composer 700 could include processing modules that process the tiles in other partially-decoded states. For example, such processing modules could process the tile in its run-length coded state.

Moreover, when the tile is parallel to the blocks of the partially-coded block-based picture signal, the tile can be partially decoded to recover the DCT coefficients or quantized DCT coefficients, and the DCT coefficients or quantized DCT coefficients can be processed using simple row, column processing. Such processing is described by S.F. Chang and D. Messerschmidt in *Manipulation and Compositing CD-DCT Compressed Video*, 13 IEEE J. on Sel. Areas of Communication, (1995 January).

The chunk generated from the tile by the selected one of the processing modules 706 is fed to the frame store 708. As noted above, the frame store also receives the storage location identifier and depth value for the tile from the picture composition module 701, and the processing decision for the tile from the processing selection module 704.

The frame store 708 tests the "all visible" flag that may have been set for the tile by the depth test module 710. When the flag is set, the chunk generated by the processing modules is completely visible. Consequently, the frame store stores the entire chunk in the storage region identified by the storage region identifier. Otherwise, the frame store writes the chunk into the portions of the identified storage region that are not occupied by one or more previously-generated chunks, or parts thereof, having a depth value less than the chunk. Data indicating the portions of the storage region into which the chunk can be written are provided by the depth test module, as described above.

When writing the chunk into the identified storage region, the frame store 708 additionally writes the depth value of the tile from which the chunk was generated and also writes the processing selection for the tile generated by the processing selection module 704. The processing selection indicates the coding state of the chunk. Writing the chunk and the corresponding depth value and processing selection overwrites any previously-generated chunk or part chunk having a depth value greater than the chunk and stored in the identified storage region. Also overwritten are the depth value and processing selection corresponding to the overwritten chunks.

When all of the tiles constituting the culled object-based picture have been processed by the block-based picture composer 700, a complete partially-coded block-based picture signal representing the picture is stored in the frame store 710. The controller 714 then causes the frame store to transfer the partially-coded block based picture signal 121 to the partial re-encoder 106 block-by-block. Also transferred from the frame store to the partial re-encoder is the processing selection for each block as the processing selection signal 120.

Figure 11:
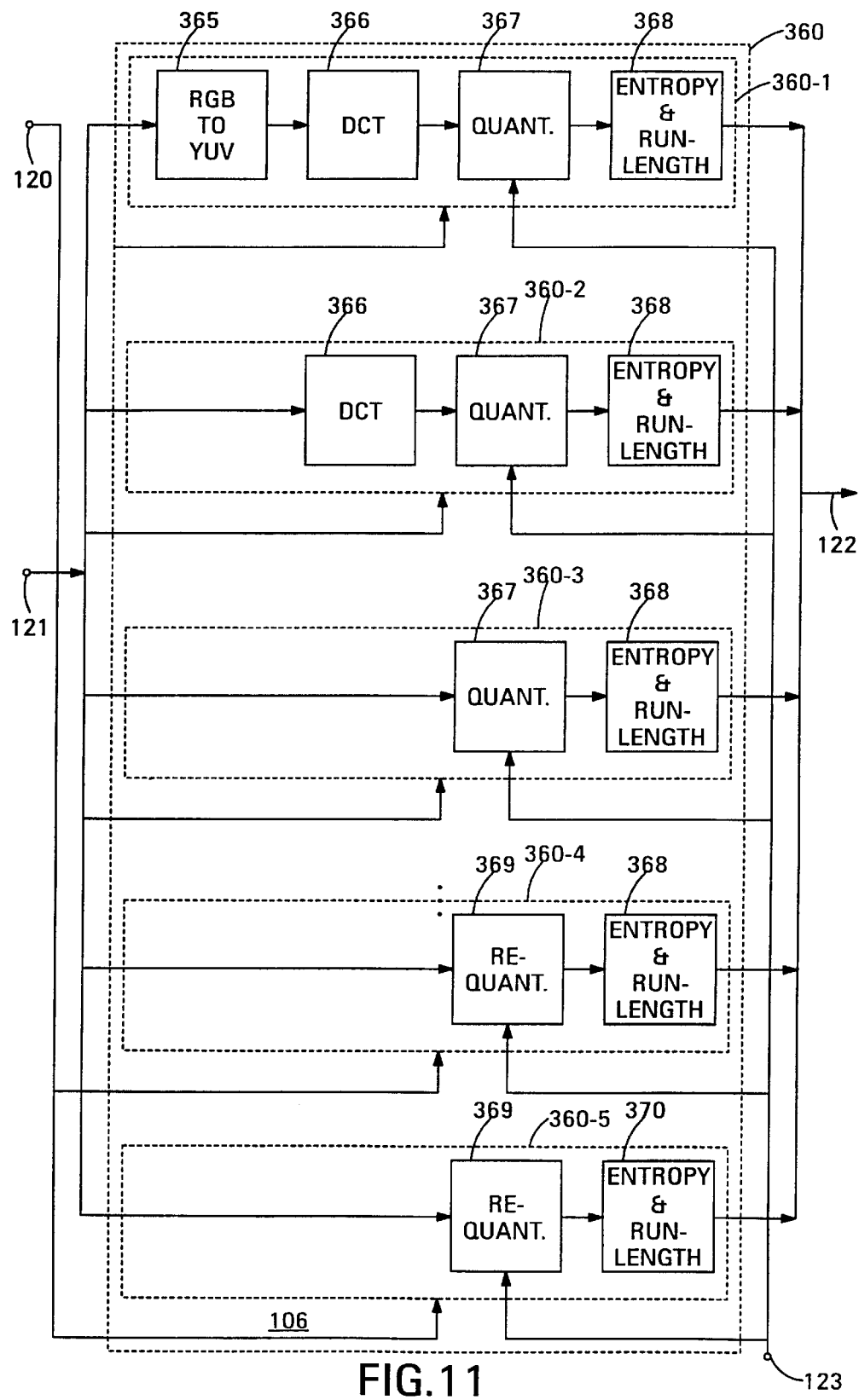
FIG. 11 is a block diagram of the re-encoding module of the first and second embodiments of the transcoders according to the invention.

FIG. 11 is a block diagram of an embodiment of the partial re-encoder 106. The partial re-encoder receives the processing selection signal 120 and the partially-coded block-based picture signal 121 from the block-based picture composer 105 (FIG. 4), and receives the step-size feedback signal 123 from the output buffer 107 (FIG. 4). The partial re-encoder generates the fully-coded block-based picture signal 122. This example of the partial re-encoder shown is composed of re-encoding modules 360-1, 360-2, 360-3, 360-4 and 360-5. The re-encoding modules correspond in number to the different decoding states in which the block-based picture composer 105 generates the partially-coded block-based picture signal. The examples of the processing modules shown in FIGS. 8A–8E and 10A–10E collectively generate the blocks of the partially-coded block-based picture signal in five different decoding states, namely, blocks of RGB pixel values, blocks of YUV pixel values, blocks of DCT coefficients, blocks of quantized DCT coefficients and non-zero DCT coefficients and runlengths. The partial re-encoder for use with such a block-based picture composer would be composed of five re-encoding modules, as shown in FIG. 11. The above list of decoding states is exemplary and not exhaustive, and if the block-based picture composer generated the partially-coded block-based picture signal in decoding states different from those illustrated, the partial re-encoder should include corresponding different re-encoding modules.

The partial re-encoder 106 receives the processing selection signal 120, the blocks of the partially-coded block based picture signal 121 and the quantizing step-size signal 123 and distributes the processing selection signal, the blocks and the quantizing step-size signal to the re-encoding modules 360. The state of the processing selection signal indicates the coding state of each of the blocks and activates the appropriate one of the re-encoding modules 360. The activated re-encoding module re-encodes the block to the extent required to change the coding state of the block to the common coding state of the blocks of the fully-coded block-based picture signal 122.

The re-encoding module 360-1 re-encodes the blocks of the partially-coded block-based picture signal generated by the processing modules illustrated in FIGS. 8A and 10A, which generate RGB pixel values. The re-encoding module 360-1 is composed of a serial arrangement of the RGB-to-YUV encoder 365, the DCT module 366, the quantizer 367 and the entropy and runlength coder 368. The DCT module and the entropy and runlength coder are all conventional and will not be described further.

The RGB-to-YUV encoder 365 is also conventional, and may generate full-resolution or sub-sampled YUV pixel values independently of whether the YUV-to-RGB decoder in the block-based picture composer 105 operates on full-resolution or sub-sampled YUV pixel values. The luminance/chrominance format generated by the RGB-to-YUV encoder is also independent of that decoded by the YUV-to-RGB decoder in the block-based picture composer. This enables conversion of the luminance/chrominance formatting between the object-based picture signal and the block-based picture signal.

The quantizer 367 is also conventional, and will not be described except to note that it quantizes the DCT coefficients generated by the DCT module with a quantizing step size determined in response to the step-size feedback signal 123. The quantizer sets the quantizing step size so that the fully-coded block-based picture signal 122 conforms with the desired MPEG-2 buffering requirements.

The re-encoding module 360-2 re-encodes the blocks of the partially-coded block-based picture signal generated by the processing modules illustrated in FIGS. 8B and 10B, which generate full-resolution or subsampled YUV pixel values. The re-encoding module 360-2 is composed of a serial arrangement of the DCT module 366, the quantizer 367 and the entropy and runlength coder 368. The DCT module and the entropy and runlength coder are both conventional and will not be described in further detail. The quantizer is also conventional and operates in response to the step-size feedback signal 123, as described above.

The re-encoding module 360-2 does not generate YUV pixel values from RGB pixel values and so performs simpler processing than the re-encoding module 360-1. The re-encoding module may additionally convert full-resolution YUV pixel values to sub-sampled YUV pixel values, or vice versa, may convert YUV pixel values to YIQ pixel values, or vice versa, and may additionally or alternatively convert the chrominance/luminance format of the partially-coded block-based picture signal to the desired chrominance/luminance format of the fully-coded block-based picture signal 122.

The re-encoding module 360-3 re-encodes the blocks of the partially-coded block-based picture signal generated by the processing modules illustrated in FIGS. 8C and 10C, which generate DCT coefficients. The re-encoding module 360-3 is composed of the quantizer 367 and the entropy and runlength coder 368. The entropy and runlength coder is conventional and will not be described further. The quantizer is also conventional and operates in response to the step-size feedback signal 123, as described above.

The re-encoding module 360-3 does not generate YUV pixel values from RGB pixel values and does not perform DCT transforms and so performs simpler processing than the re-encoding module 360-1.

The re-encoding module 360-4 re-encodes the blocks of the partially-coded block-based picture signal generated by the processing modules illustrated in FIGS. 8D and 10D, which generate quantized DCT coefficients. The re-encoding module 360-4 is composed of the re-quantizer 369 and the entropy and runlength coder 368. The entropy and runlength coder is conventional and will not be described in further detail. The re-quantizer is also conventional and operates to re-quantize the blocks of quantized DCT coefficients in response to the step-size feedback signal 123, as described above.

The re-encoding module 360-4 does not generate YUV pixel values from RGB pixel values and does not perform DCT transforms and so performs simpler processing than the re-encoding module 360-1.

The re-encoding module 360-5 re-encodes the blocks of the partially-coded block-based picture signal generated by the processing modules illustrated in FIGS. 8E and 10E, which generate non-zero quantized DCT coefficients and runlengths. The re-encoding module 360-4 is composed of the re-quantizer 369 and the entropy and run-length coder 370. The re-quantizer operates to re-quantize the quantized DCT coefficients in response to the step-size feedback signal 123, as described above. The entropy and run-length coder applies entropy coding to the re-quantized DCT coefficients and modifies, if necessary, the run length coding. Modification of the run-length coding is necessary when the re-quantizer re-quantizes one or more of the formerly non-zero DCT coefficients to zero. The re-quantizer and the entropy and runlength coder are otherwise conventional and will not be described further.

The re-encoding module 360-5 does not generate YUV pixel values from RGB pixel values and does not perform DCT transforms and so performs simpler processing than the re-encoding module 360-1.

The output buffer 107 is conventional and will not be described further.

Figure 12:
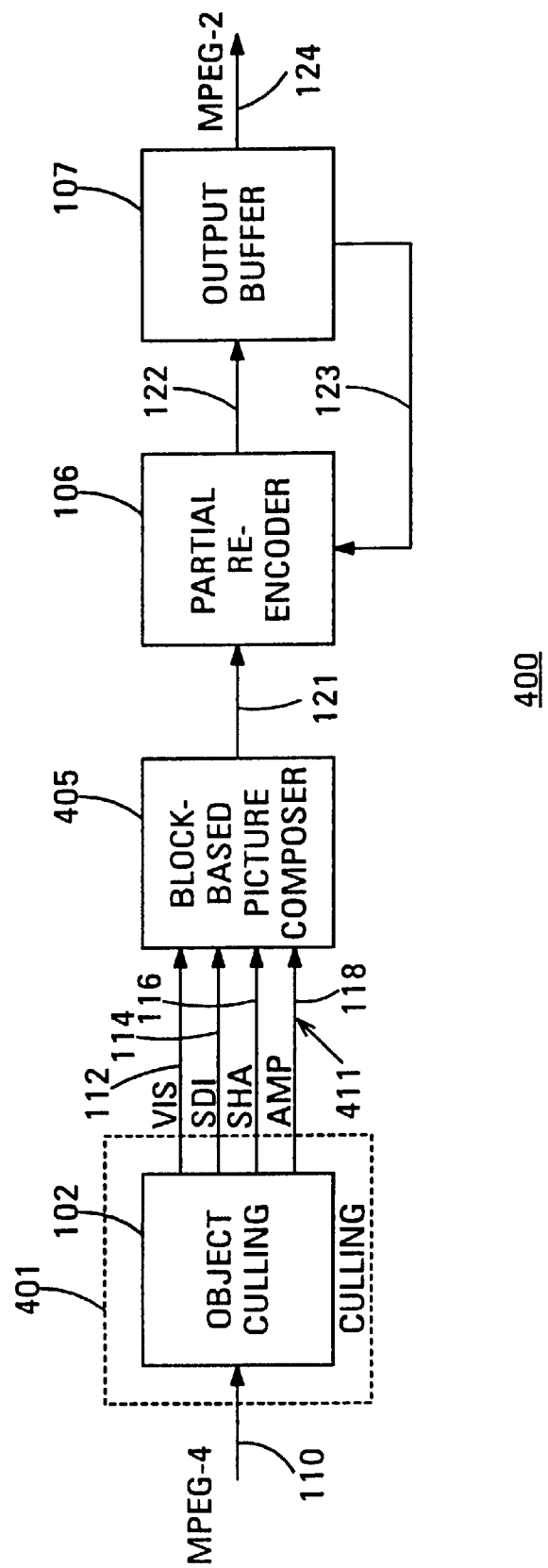
FIG. 12 is a block diagram of a second embodiment of a transcoder according to the invention.

FIG. 12 is a block diagram of a second embodiment 400 of the transcoder according to the invention. Elements of the transcoder 400 that correspond to elements of the transcoder 100 shown in FIG. 4 are indicated using the same reference numerals and will not be described again here. The transcoder 400 differs from the transcoder 100 in that its culling module 401 lacks a tile culling module and that its block-based picture composer 405 is block-oriented rather than tile-oriented. As in the embodiment shown in FIG. 4, the object culling module 102 included in the culling module 401 detects and discards the portions of the coded object-based picture signal 110 that represent objects not visible in the picture. The culling module feeds the resulting culled object-based picture signal 411 to the block-based picture composer 405.

Figure 13A:
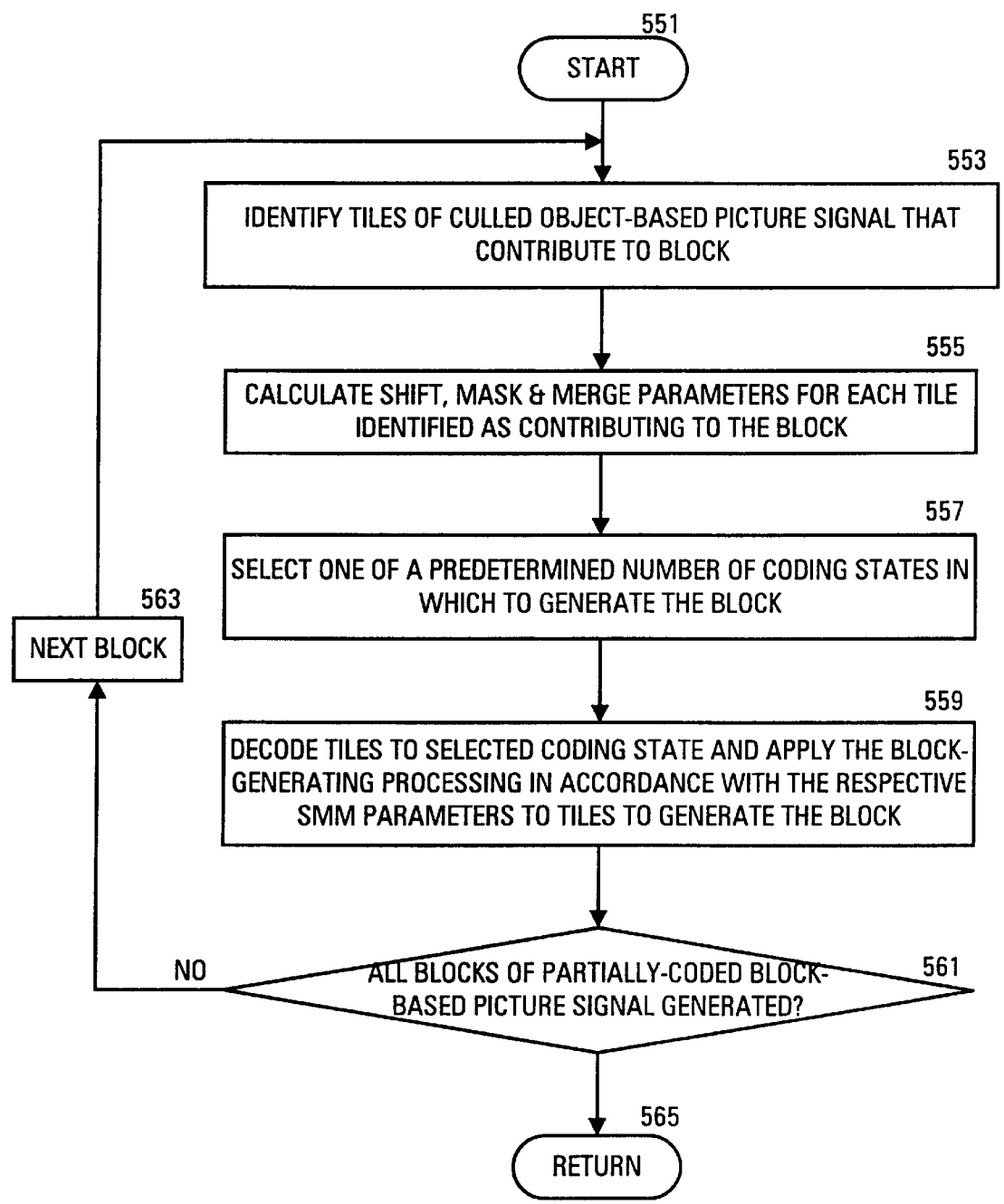
FIG. 13A is a flow chart illustrating the processing performed by the block-based picture composer of the second embodiment of the transcoder according to the invention.

FIG. 13A is a flow chart that illustrates the block-oriented processing performed by the block-based picture composer 405. Execution starts in step 551.

In step 553, the tile or tiles of the culled object-based picture signal 411 that contribute to a block of the block-based picture signal are identified.

In step 555, shift, mask and merge (SMM) parameters, as described above, are calculated for each tile identified as contributing to the block.

In step 557, one of a number of different coding states is selected in which to generate the block from the tiles identified in step 553. The coding state selected is that which involves the least decoding of the tiles, but allows the block-generating processing defined by the tiles' respective SMM parameters to be applied to the tiles to generate the block.

In step 559, the tiles identified in step 553 are decoded to the coding state selected in step 557 and the block-generating processing is applied to the tiles in accordance with the tiles' respective SMM parameters to generate the block. The block is generated in the selected coding state. The coding state of the block will normally differ from that of others of the blocks of the partially-coded block-based picture signal.

In step 561, a test is performed to determine whether all the blocks of the partially-coded block-based picture signal have been generated. If the test result is NO, execution returns to step 553 via step 563. Step 563 causes step 533 to be performed on the next block of the partially-coded block-based picture signal. If the test result is YES, execution advances to step 565, where it returns to the main routine.

Figure 13B:
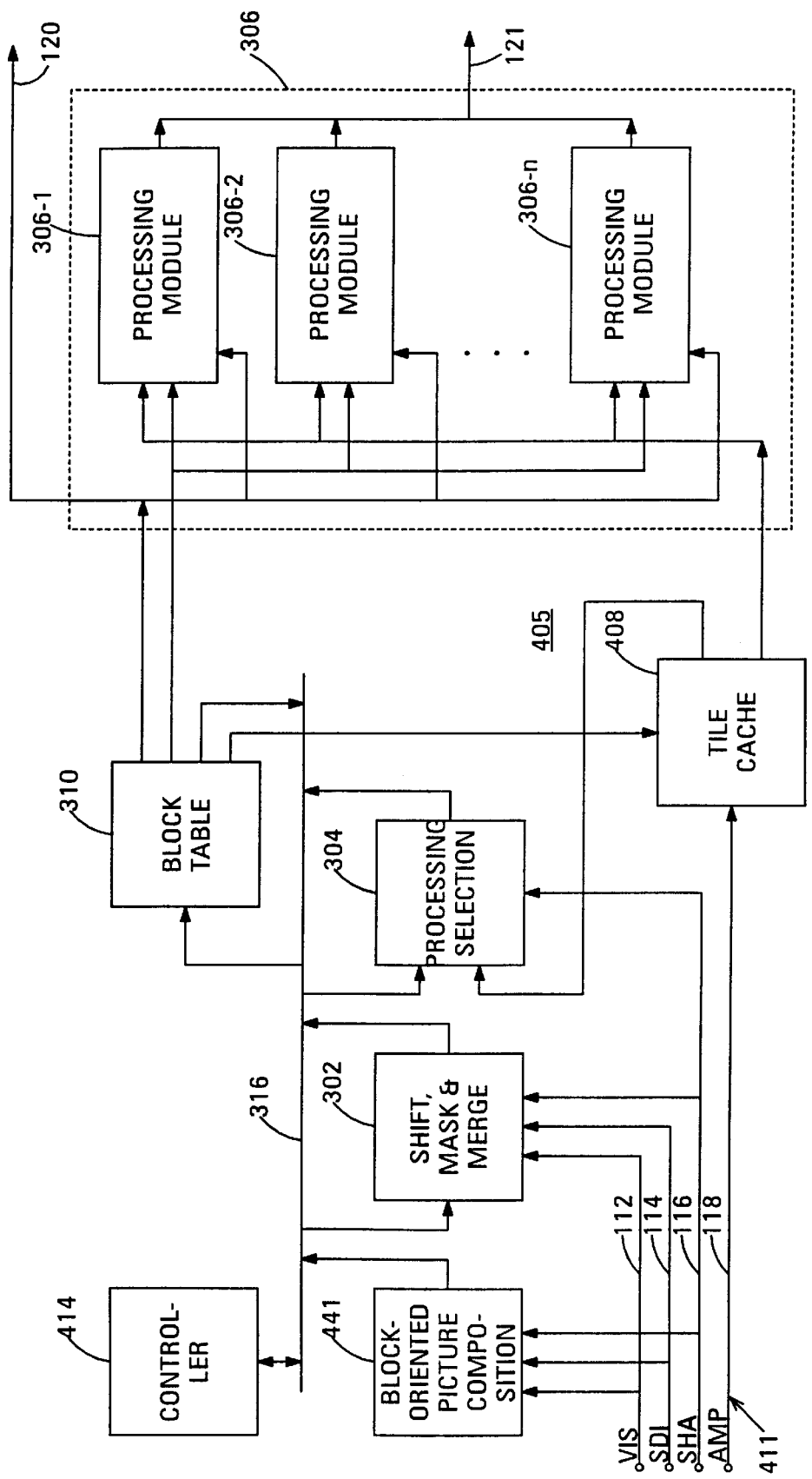
FIG. 13B is a block diagram of the block-based picture composer of the second embodiment of the transcoder according to the invention.

FIG. 13B is a block diagram of the block-based picture composer 405 of the transcoder 400. The block-based picture composer performs the method illustrated in FIG. 13A. Elements of the block-oriented block-based picture composer 405 that correspond to elements of the tile-oriented block-based picture composer 105 shown in FIG. 7B are indicated using the same reference numerals and will not be described again. The block-based picture composer includes the block-oriented picture composition module 441, the shift, mask and merge parameter module 302, the processing selection module 304, the processing modules 306, the tile cache 408, and the block table 310. The block-based picture signal is controlled by the controller 414, which may be shared with other modules of the transcoder 400. The bus 316 interconnects the controller and the modules so that data and commands can pass among the modules and between the controller and the modules. Exemplary the processing modules 306-1, 306-2 and 308-n are shown. The block-based picture composer may incorporate fewer or more processing modules than the number shown.

The block-based picture composer 405 receives the culled object-based picture signal 411 from the culling module 101. In this embodiment, the culled object-based picture signal includes the visibility table VIS, the scene descriptor SDI and the shape descriptors SHA and coded amplitude descriptors AMP of all the objects visible, at least in part, in the picture. The block-based picture composer temporarily stores the tiles constituting the coded amplitude descriptors in the tile cache 408.. Since the coded amplitude descriptors have not been subject to culling to remove tiles that are not visible in the picture, the tile cache should have a larger capacity than the tile cache 308 shown in FIG. 7B.

The block-oriented picture composition module 441 receives the visibility table VIS; the scene descriptor SDI; and the shape descriptors SHA of the objects visible in the picture. For each block of the block-based picture, the picture composition module examines the visibility table to identify the object or objects visible in the block. For each object identified as being at least partially visible in the block, the picture composition module also examines the shape descriptor of the object and the scene descriptor to identify each tile of the coded amplitude descriptor of the object that partly or wholly overlays the block, and therefore contributes to the block. The shape descriptor defines the arrangement of tiles in the boundary rectangle of the object, and the scene descriptor describes the location of the object in the scene. For each identified tile, the picture composition module generates a record for the block table 310 and feeds the record to the block table 310 via the bus 316. The record may include such information as the object number of the object to which the tile belongs, and the tile number of the tile, for example. The block table stores the record in the entry corresponding to the block number, as described above with reference to FIG. 7B.

Once the block-oriented picture composition module 441 has identified 30 the tiles contributing to each of the blocks of the partially-coded block-based picture signal 121, and has generated an entry in the block table 310 for each block, the shift, mask and merge module 302 and processing selection module 304 operate as described above to calculate shift, mask and merge parameters for each of the tiles identified as contributing to each block, and to select the one of the processing modules 306 that will be used to generate the block. The processing modules 306 then generate each block by decoding the tiles identified as contributing to the block to the extent that allows the block-generating processing to be applied to them, and by applying to the decoded tiles the block-generating processing, defined their respective SMM parameters, as described above.

Since the block-oriented picture composition module 441 identifies all of the tiles that contribute to each block of the partially-coded block-based picture signal 121 before it moves on to identify the tiles that contribute to the next block, the block-oriented picture composition module 441 can optionally perform additional processing that calculates the shift, mask and merge parameters for each of the identified tiles, and that selects the one of the processing modules 306 that will be used to generate the block from the identified tiles. In this case, the separate shift, mask and merge module 302 and processing selection module 304 can be omitted, and the block-oriented picture composition module 441 can generate a complete entry for the block. The entry includes an identifier for each identified tile, the SMM parameters for each identified tile, and the processing selection for the block.

Although this disclosure describes illustrative embodiments of the invention in detail, it is to be understood that the invention is not limited to the precise embodiments described, and that various modifications may be practiced within the scope of the invention defined by the appended claims.

I claim:

1. A method for transcoding a coded object-based picture signal representing a picture to a coded block-based picture signal representing the picture, the method comprising:

culling, from the coded object-based picture signal, signal portions that represent objects not visible in the picture to generate a culled object-based picture signal wherein the object-based picture signal includes, for each of the objects, an object descriptor comprising a coded amplitude descriptor including interior tiles and boundary tiles, in which culling signal portions that represent objects not visible in the picture includes:

culling signal portions that represent objects that are not present in the picture; and culling signal portions that represent objects that are present in the picture, but are hidden includes culling, from the object-based picture signal, signal portions that represent interior tiles and boundary tiles that are hidden in the picture;

partially decoding portions of the culled object-based picture signal and generating therefrom blocks of a partially-coded block-based picture signal, the blocks having differing coding states; and re-encoding the partially-coded block-based picture signal to generate the coded block-based picture signal in which the blocks have a uniform coding state.

2. The method of claim 1, in which:

the object-based picture signal includes:

a scene descriptor describing an arrangement of the objects in the picture, and a coded shape descriptor for each of the objects;

culling the signal portions that represent objects that are not present in the picture includes:

identifying, using the scene descriptor, the signal portions that represent the objects not present in the picture, and decoding the coded shape descriptors of the objects that the identifying operation identifies as present in the picture to generate respective shape descriptors; and in culling the signal portions that represent objects that are present in the picture, but are hidden, the shape descriptors are used to identify the signal portions that represent the objects that are present in the picture, but are hidden.

3. The method of claim 2, in which:

in culling the signal portions that represent the objects that are not present in the picture, the signal portions identified using the scene descriptor as representing the objects not present in the picture are culled;

culling the signal portions that represent the objects that are present in the picture but are hidden, includes:

constructing a visibility table from the shape descriptors, the visibility table indicating the objects present in each of the blocks of the picture, identifying, in response to the visibility table, the objects hidden in all of the blocks of the picture in which such objects are present, and culling from the object-based picture signal the signal portions that represent the objects identified using the shape descriptors as being hidden in all of the blocks of the picture in which such objects are present.

4. The method of claim 2, in which:

the object-based picture signal additionally includes, for each of the objects, an object descriptor comprising a coded amplitude descriptor including interior tiles and boundary tiles;

culling the signal portions that represent objects that are present in the picture, but are hidden, additionally includes:

constructing a visibility table from the shape descriptors, the visibility table indicating the objects present in each of the blocks of the picture, and in response to the visibility table, culling, from the object-based picture signal, signal portions that represent interior tiles and boundary tiles that are hidden in the picture.

5. The method of claim 1, in which:

the culled object-based picture signal includes, for each one of the objects visible in the picture, a culled amplitude descriptor comprising tiles representing portions of the one of the objects that are visible in the picture; and partially decoding portions of the culled object-based picture signal and generating therefrom blocks of the partially-coded block-based picture signal includes:

identifying, for each one of the tiles of the culled amplitude descriptors, at least one of the blocks of the partially-coded block-based picture signal to which the one of the tiles contributes, calculating shift, mask and merge parameters for each one of the tiles, selecting, for each one of the blocks of the partially-coded block-based picture signal, one of a predetermined number of coding states in which to generate the one of the blocks, the one of the predetermined number of coding states being a selected coding state, and decoding the at least one of the tiles contributing to the one of the blocks of the partially-coded block-based picture signal to the selected decoding state, and applying to the decoded tile block-generating processing defined by the respective shift, mask and merge parameters to generate the one of the blocks in the selected coding state.

6. The method of claim 5, in which, in selecting one of the predetermined number of coding states in which to generate the one of the blocks, the one of the predetermined number of coding states is selected taking account of available hardware and software resources, quality requirements, the number of the tiles contributing to the one of the blocks, and a complexity of each of the tiles.

7. The method of claim 1, in which:

the culled object-based picture signal includes, for each one of the objects visible in the picture, a culled amplitude descriptor comprising tiles representing portions of the one of the objects that are visible in the picture; and partially decoding portions of the culled object-based picture signal and generating therefrom blocks of the partially-coded block-based picture signal includes:

for each one of the tiles of the culled amplitude descriptors:

identifying a portion of the partially-coded block-based picture signal to be generated from the one of the tiles;

calculating shift, mask and merge parameters for the one of the tiles;

selecting one of a predetermined number of coding states in which to generate the portion of the partially-coded block-based picture from the one of the tiles, the one of the predetermined number of coding states being a selected coding state;

decoding the at least one of the tiles to the selected decoding state, and applying processing defined by the respective shift, mask and merge parameters thereto to generate the portion of the partially-coded block-based picture signal in the selected coding state; and storing the portion of the partially-coded block-based picture signal to form part of a stored partially-coded block-based picture signal, and reading out the stored partially-coded block-based picture signal in blocks as the blocks of the partially-coded block-based picture signal.

8. The method of claim 7, in which:
the one of the tiles has a depth value;
the method additionally comprises providing a frame store;
in storing the portion of the partially-coded block-based picture signal, the portion of the partially-coded block-based picture signal is stored in the frame store in a storage region corresponding to a spatial location of the tile in the picture, the portion being stored in such part of the storage region not occupied by a portion of the partially-coded block-based picture signal generated from another one of the tiles having a smaller depth value.

9. The method of claim 1, in which:
the culled object-based picture signal includes an amplitude descriptor for each of the objects visible in the picture, the amplitude descriptor comprising tiles; and
partially decoding selected portions of the culled object-based picture signal and generating therefrom blocks of the partially-coded block-based picture signal includes:
identifying, for each one of the blocks of the partially-coded picture signal, at least one of the tiles of the culled object-based picture signal that contributes to the one of the blocks,
calculating shift, mask and merge parameters for each of the at least one of the tiles that contributes to the one of the blocks,
selecting, for each one of the blocks of the partially-coded block-based picture signal, one of a predetermined number of coding states in which to generate the one of the blocks, the one of the predetermined number of coding states being a selected coding state; and
decoding the at least one of the tiles contributing to the one of the blocks of the partially-coded block-based picture signal the selected decoding state, and applying thereto block-generating processing defined by the respective shift, mask and merge parameters to generate the one of the blocks in the selected coding state.

10. The method of claim 9, in which, in selecting the one of the predetermined number of coding states in which to generate the one of the blocks, the one of the predetermined number of coding states is selected taking account of available hardware and software resources, quality requirements, the number of the tiles contributing to the one of the blocks, and a complexity of each of the tiles.

11. A transcoder for transcoding a coded object-based picture signal representing a picture to a coded block-based picture signal representing the picture, the transcoder comprising:
a culling module that receives the coded object-based picture signal, wherein the object-based picture signal includes, for each of the objects, an object descriptor comprising a coded amplitude descriptor including interior tiles and boundary tiles, and culls therefrom signal portions that represent objects not visible in the picture, signal portions that represent objects that are not present in the picture and signal portions that represent objects that are present in the picture but are hidden to generate a culled object-based picture signal, the culling module additionally includes a tile culling module that culls, from the object-based picture signal, signal portions that represent interior tiles and boundary tiles that are hidden in the picture;
a picture composer that receives the culled object-based picture signal and partially decodes selected portions thereof to generate blocks of a partially-coded block-based picture signal, the blocks having differing coding states; and
a partial encoder that receives the partially-coded block-based picture signal and encodes the blocks thereof to generate the block-based picture signal in which the blocks have a uniform coding state.

12. The transcoder of claim 11, in which:
the object-based picture signal includes:
a scene descriptor describing an arrangement of the objects in the picture, and
a coded shape descriptor for each of the objects; and
the object culling module uses the scene descriptor to identify the signal portions that represent the objects not present in the picture and decodes the coded shape descriptors of the objects identified as being present in the picture to identify the signal portions that represent the objects that are present in the picture, but are hidden.

13. The transcoder of claim 12, in which the object culling module includes:
an object present in picture detector that uses the scene descriptor to identify the objects not present in the picture, and that causes signal portions representing the objects identified as not present in the picture to be culled from the object-based picture signal;
a partial decoder that decodes the coded shape descriptor of each of the objects identified by the object present in picture detector as being present in the picture to generate a respective shape descriptor;
a visibility table constructed from the shape descriptors to indicate the objects present in each of the blocks of the picture; and
a visible object detector that operates in response to the visibility table to identify the objects hidden in all of the blocks of the picture in which the objects are present, and that causes the signal portions representing the objects identified as being hidden in all of the blocks to be culled from the object-based picture signal.

14. The transcoder of claim 12, in which:
the object-based picture signal additionally includes, for each of the objects, an object descriptor comprising a coded amplitude descriptor including interior tiles and boundary tiles;
the object culling module includes a partial decoder that decodes the coded shape descriptors of the objects identified as being present in the picture to construct a visibility table that indicates the objects present in each of the blocks of the picture; and
the culling module additionally includes a tile culling module that operates in response to the visibility table to cause signal portions of the object-based picture signal that represent interior tiles and boundary tiles that are hidden in the picture to be culled from the object-based picture signal.

15. The transcoder of claim 11, in which:
the culled object-based picture signal includes, for each one of the objects visible in the picture, a culled amplitude descriptor comprising tiles representing portions of the one of the objects that are visible in the picture; and
the picture composer includes:
a tile-oriented picture composition module that receives the culled object-based picture signal and identifies, for each one of the tiles of the culled amplitude descriptors, at least one of the blocks of the partially-coded block-based picture signal to which the one of the tiles contributes, a shift, mask and merge module that calculates shift, mask and merge parameters for each one of the tiles, processing modules each capable of receiving the at least one of the tiles contributing to each one of the blocks of the partially-coded block-based picture signal, decoding the at least one of the tiles to a coding state that differs among the processing modules and applying thereto block-generating processing defined by the respective shift, mask and merge parameters to generate the one of the blocks, and a processing selection module that selects one of the processing modules to generate the one of the blocks of the partially-coded block-based picture signal.

16. The transcoder of claim 15, in which the processing decision module identifies the one of the modules taking account of available hardware and software resources, quality requirements, the number of the tiles contributing to the one of the blocks, and a complexity of each of the tiles.

17. The transcoder of claim 11, in which:

the culled object-based picture signal includes an amplitude descriptor for each of the objects visible in the picture, the amplitude descriptor comprising tiles; and the picture composer includes:

a block-oriented picture composition module that receives the culled object-based picture signal and identifies, for each one of the blocks of the partially-coded picture signal, at least one of the tiles of the culled object-based picture signal that contributes to the one of the blocks, a shift, mask and merge module that calculates shift, mask and merge parameters for each of the at least one of the tiles that contributes to the one of the blocks, processing modules each capable of receiving the at least one of the tiles contributing to each one of the blocks of the partially-coded block-based picture signal and of decoding the at least one of the tiles to a coding state that differs among the processing modules and applying thereto block-generating processing using the respective shift, mask and merge parameters to generate the one of the blocks, and a processing selection module that selects one of the processing modules to generate the one of the blocks of the partially-coded block-based picture signal.

18. The transcoder of claim 17, in which the processing decision module identifies the one of the modules taking account of available hardware and software resources, quality requirements, the number of the tiles contributing to the one of the blocks, and a complexity of each of the tiles.

19. A computer-readable medium in which is fixed a computer program that instructs a computer to perform a transcoding operation in which a coded object-based picture signal representing a picture is transcoded to a coded block-based picture signal representing the picture, the transcoding operation comprising:

culling, from the coded object-based picture signal, signal portions that represent objects not visible in the picture to generate a culled object-based picture signal wherein the object-based picture signal includes, for each of the objects, an object descriptor comprising a coded amplitude descriptor including interior tiles and boundary tiles, in which culling signal portions that represent objects not visible in the picture includes:

culling signal portions that represent objects that are not present in the picture; and culling signal portions that represent objects that are present in the picture, but are hidden includes culling, from the object-based picture signal, signal portions that represent interior tiles and boundary tiles that are hidden in the picture;

partially decoding portions of the culled object-based picture signal and generating therefrom blocks of a partially-coded block-based picture signal, the blocks having differing coding states; and re-encoding the partially-coded block-based picture signal to generate the coded block-based picture signal in which the blocks have a uniform coding state.

20. The computer-readable medium of claim 19, in which:

the object-based picture signal includes:

a scene descriptor describing an arrangement of the objects in the picture, and a coded shape descriptor for each of the objects;

culling the signal portions that represent objects that are not present in the picture includes:

identifying, using the scene descriptor, the signal portions that represent the objects not present in the picture, and decoding the coded shape descriptors of the objects that the identifying operation identifies as present in the picture to generate respective shape descriptors; and culling the signal portions that represent objects that are present in the picture but are hidden includes using the shape descriptors to identify the signal portions that represent the objects that are present in the picture but are hidden.

21. The computer-readable medium of claim 19, in which:

the culled object-based picture signal includes, for each one of the objects visible in the picture, a culled amplitude descriptor comprising tiles representing portions of the one of the objects that are visible in the picture; and partially decoding selected portions of the culled object-based picture signal includes:

identifying, for each one of the tiles of the culled amplitude descriptors, at least one of the blocks of the partially-coded block-based picture signal to which the one of the tiles contributes, calculating shift, mask and merge parameters for each one of the tiles, selecting, for each one of the blocks of the partially-coded block-based picture signal, one of a predetermined number of coding states in which to generate the one of the blocks as a selected coding state;

decoding the at least one of the tiles identified as contributing to the one of the blocks of the partially-coded block-based picture signal to an extent that allows block-based processing to be applied and applying thereto the block-based processing defined by the respective shift, mask and merge parameters to generate the one of the blocks of the partially-coded block-based picture signal in the selected coding state.

22. The computer-readable medium of claim 19, in which:

the culled object-based picture signal includes an amplitude descriptor for each of the objects visible in the picture, the amplitude descriptor comprising tiles; and partially decoding selected portions of the culled object-based picture signal includes:

identifying, for each one of the blocks of the partially-coded picture signal, at least one of the tiles of the culled object-based picture signal that contributes to the one of the blocks, calculating shift, mask and merge parameters for each of the at least one of the tiles that contribute to the one of the blocks, selecting, for each one of the blocks of the partially-coded block-based picture signal, one of a predetermined number of coding states in which to generate the one of the blocks as a selected coding state; and decoding the at least one of the tiles identified as contributing to the one of the blocks of the partially-coded block-based picture signal to an extent that allows block-based processing to be applied and applying thereto the block-based processing defined by the respective shift, mask and merge parameters to generate the one of the blocks of the partially-coded block-based picture signal in the selected coding state.

* * * * *